United States Patent
Zee et al.

(10) Patent No.: US 10,932,306 B2
(45) Date of Patent: Feb. 23, 2021

(54) MULTIPLE SCTP ASSOCIATIONS PER S1AP CONNECTION AND MOVING S1AP SIGNALING CONNECTION BETWEEN SCTP ASSOCIATIONS

(71) Applicant: TELEFONAKTIEBOLAGET LM ERICSSON (PUBL), Stockholm (SE)

(72) Inventors: Oscar Zee, Stockholm (SE); Angelo Centonza, Stockholm (SE); Gunnar Mildh, Sollentuna (SE); Claudio Porfiri, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 141 days.

(21) Appl. No.: 16/092,897

(22) PCT Filed: Apr. 5, 2017

(86) PCT No.: PCT/IB2017/051957
§ 371 (c)(1),
(2) Date: Oct. 11, 2018

(87) PCT Pub. No.: WO2017/178929
PCT Pub. Date: Oct. 19, 2017

(65) Prior Publication Data
US 2019/0208555 A1    Jul. 4, 2019

Related U.S. Application Data

(60) Provisional application No. 62/321,530, filed on Apr. 12, 2016, provisional application No. 62/321,570, filed on Apr. 12, 2016.

(51) Int. Cl.
*H04W 8/08* (2009.01)
*H04W 76/12* (2018.01)
(Continued)

(52) U.S. Cl.
CPC .............. *H04W 76/12* (2018.02); *H04W 8/08* (2013.01); *H04W 76/15* (2018.02); *H04W 80/12* (2013.01); *H04W 92/045* (2013.01)

(58) Field of Classification Search
CPC ....... H04W 8/08; H04W 76/12; H04W 76/15; H04W 80/12; H04W 92/045
See application file for complete search history.

(56) References Cited

U.S. PATENT DOCUMENTS 8,307,097 B2 * 11/2012 Bovo ...................... H04L 41/12
370/392
8,972,588 B2 * 3/2015 Bovo ...................... H04L 41/12
370/392

(Continued)

OTHER PUBLICATIONS

Alcatel-Lucent, Alternative solution for the SCTP endpoint failure issue, R3-080672, 3GPP TSG RAN3#59bis, Shenzhen, China Mar. 31-Apr. 3, 2008.

(Continued)

*Primary Examiner* — Alpus Hsu

(57) ABSTRACT

Certain embodiments disclose a method for use in a first network node. The method comprises establishing a first Stream Control Transmission Protocol (SCTP) association and a second SCTP association for an S1 Application Protocol (S1AP) connection between the first network node and a second network node.

17 Claims, 39 Drawing Sheets

(51) Int. Cl.
*H04W 76/15* (2018.01)
*H04W 80/12* (2009.01)
*H04W 92/04* (2009.01)

(56) References Cited

U.S. PATENT DOCUMENTS

| | | | |
|---|---|---|---|
| 9,071,962 B2* | 6/2015 | Janakiraman | H04W 12/0013 |
| 9,198,032 B2* | 11/2015 | Serravalle | H04W 76/10 |
| 9,288,686 B2* | 3/2016 | Wilkinson | H04L 41/12 |
| 9,467,822 B2* | 10/2016 | Li | H04B 7/155 |
| 9,467,926 B2* | 10/2016 | Sirotkin | H04W 40/246 |
| 9,668,160 B2* | 5/2017 | Wilkinson | H04L 41/12 |
| 9,756,667 B2* | 9/2017 | Xu | H04W 76/10 |
| 9,844,081 B2* | 12/2017 | Serravalle | H04W 72/04 |
| 9,877,211 B2* | 1/2018 | Godin | H04W 76/32 |
| 9,992,240 B2* | 6/2018 | Campbell | H04L 65/1069 |
| 10,004,103 B2* | 6/2018 | Kawaguchi | H04W 24/02 |
| 10,104,704 B2* | 10/2018 | Sharma | H04W 76/12 |
| 10,129,805 B2* | 11/2018 | Purohit | H04L 67/1008 |
| 10,143,019 B2* | 11/2018 | Xu | H04W 76/10 |
| 10,327,137 B2* | 6/2019 | Molina | H04W 12/06 |
| 10,349,313 B2* | 7/2019 | Chen | H04W 36/0022 |
| 2005/0117529 A1* | 6/2005 | Ramos-Escano | H04L 69/169 370/282 |
| 2010/0008293 A1* | 1/2010 | Gupta | H04W 92/20 370/328 |
| 2014/0029513 A1* | 1/2014 | Takahashi | H04W 36/0066 370/328 |
| 2015/0016306 A1* | 1/2015 | Masini | H04L 41/0809 370/255 |
| 2015/0109999 A1* | 4/2015 | Godin | H04L 45/74 370/328 |
| 2016/0262069 A1* | 9/2016 | Parsay | H04W 28/00 |
| 2017/0279723 A1* | 9/2017 | Vedam | H04L 43/062 |

OTHER PUBLICATIONS

Institute for Information Industry (III), et al., Investigating head-of-line blocking issue among four relay alternatives, R3-092735, 3GPP TSG-RAN WG3 #66, Jeju, Korea, Nov. 9-13, 2009.

3rd Generation Partnership Project; Technical Specification Group Radio Access Network; Evolved Universal Terrestrial Radio Access Network (E-UTRAN); S1 Application Protocol (S1AP) (Release 12), 3GPP TS 36.413 V12.7.0, Mar. 2016.

* cited by examiner

3200

3204 — Associating a first set of one or more user equipment (UE) associated signaling streams with the first SCTP association and a second set of one or more UE associated signaling streams with the second SCTP association, each UE associated signaling stream associated with a respective UE.

3208 — Associating a first non-UE associated signaling stream with the first SCTP association and a second non-UE associated signaling stream with the second SCTP association.

FIGURE 32

MULTIPLE SCTP ASSOCIATIONS PER S1AP CONNECTION AND MOVING S1AP SIGNALING CONNECTION BETWEEN SCTP ASSOCIATIONS

This application is a 371 of International Application No. PCT/IB2017/051957, filed Apr. 5, 2017, the disclosure of which is fully incorporated herein by reference. The present application claims the benefit of priority from U.S. Provisional Application No. 62/321,530 entitled "MULTIPLE SCTP ASSOCIATIONS PER S1AP CONNECTION" filed Apr. 12, 2016, the disclosure of which is hereby incorporated herein in its entirety by reference.

TECHNICAL FIELD

Certain embodiments of the present disclosure relate to a method, node, apparatus, and/or system for supporting multiple Stream Control Transmission Protocol (SCTP) associations per S1 Application Protocol (S1AP) connection and control thereof.

BACKGROUND

The third generation partnership project (3GPP) is currently working on standardization of Release 13 of the Long Term Evolution (LTE) concept. An example LTE system is shown in FIG. 1. The LTE architecture shown in FIG. 1 includes radio access nodes, such as enhanced Node Bs (eNBs), Home eNBs (HeNBs), and an HeNB Gateway (GW). The LTE architecture shown in FIG. 1 also includes evolved packet core nodes, such as Mobility Management Entities/Serving Gateways (MME/S-GW). FIG. 1 further shows logical interfaces between the various nodes. As shown, an S1 interface connects HeNBs/eNBs to the MME/S-GW. An S1 interface is also shown connecting HeNBs to the HeNB GW. As shown, an X2 interface connects peer eNBs/HeNBs, optionally via an X2 GW. The radio access nodes may communicate wirelessly with user equipment (UEs) (not shown), as further discussed below.

FIG. 2 illustrates an example of a management system that may be assumed for purposes of discussing certain embodiments of the solutions proposed herein. The node elements (NE), also referred to as eNodeB, for example, are managed by a domain manager (DM), also referred to as the operation and support system (OSS). A DM may further be managed by a network manager (NM). Two NEs are interfaced by X2, whereas the interface between two DMs is referred to as Itf-P2P. The management system may configure the network elements and may receive observations associated with features in the network elements. For example, the DM observes and configures NEs. The NM observes and configures the DM. The NM can also configure the NE via the DM. The configuration performed via the DM, NM, and related interfaces allow for carrying out functions over the X2 and S1 interfaces in a coordinated way throughout the RAN, eventually involving the Core Network, i.e., Mobility Management Entity (MME) and Serving Gateways (S-GWs).

FIG. 3 illustrates an example of an S1 Interface Control Plane stack. The S1 Control Plane interface is defined between MME and eNB, and is described in 3GPP specifications TS36.300, TS36.410, TS36.411, TS36.412 and TS36.413. The transport network layer is based on Internet Protocol (IP) transport with an SCTP layer added on top of IP. The SCTP layer provides reliable transport of signaling messages. According to the existing 3GPP specifications, only one single SCTP association is established between one MME and eNB pair. Within the SCTP association established between one MME and eNB pair, one single pair of stream identifiers shall be reserved for the sole use of S1AP elementary procedures that utilize non UE-associated signaling, at least one (and up to a few) pair of stream identifiers are reserved for the sole use of S1AP elementary procedures that utilize UE-associated signaling. Also, a single UE-associated signaling shall use one SCTP stream and the stream should not be changed during the communication of the UE-associated signaling.

FIG. 4 shows a state transition diagram of S1AP. In case the SCTP layer notifies the S1AP layer that the signaling connection broke, the entire S1AP will then be reset on both endpoints. That is, the MME locally changes the state of the UEs which used this signaling connection to the ECM-IDLE state, and the eNB releases the Radio Resource Control (RRC) connection with those UEs. This is reflected in the state diagram as arrow from S1AP CONNECTED to S1AP DISCONNECTED with action "Broken lower layer."

FIG. 5 illustrates the S1 setup procedure (successful operation). During the procedure, the endpoints (MME and eNB) will erase all existing application level configuration data and replace it by the one received in the procedure. This procedure also re-initializes the E-UTRAN S1AP UE-related contexts (if any) and erases all related signaling connections for the endpoints. This is reflected in the state diagram of FIG. 4 as the arrow from S1AP DISCONNECTED to S1AP CONNECTED with action "S1 SETUP" (in case of no application level configuration data, or transport layer has been broken before), or as the arrow from S1AP CONNECTED to S1AP CONNECTED with action "S1 SETUP" (in case of previous application level configuration data and transport layer is not broken).

Currently, there is no procedure to tear down an S1AP connection. In practice this means S1AP may be torn down only by breaking the signaling connection. This is reflected in the state diagram as arrow from S1AP CONNECTED to S1AP DISCONNECTED with action "Broken lower layer."

As discussed above with respect to FIG. 3, the S1 Interface Control Plane stack includes an SCTP layer. Stream Control Transmission Protocol (SCTP) is a reliable transport protocol operating on top of a connectionless packet network such as IP. SCTP offers a number of services to its users. For example, SCTP offers acknowledged error-free non-duplicated transfer of user data. As another example, SCTP offers data fragmentation to conform to discovered path MTU size. As another example, SCTP offers sequenced delivery of user messages within multiple streams, with an option for order-of-arrival delivery of individual user messages. As yet another example, SCTP offers optional bundling of multiple user messages into a single SCTP packet. As a final example, SCTP offers network-level fault tolerance through supporting of multi-homing at either or both ends of an association. The design of SCTP also includes appropriate congestion avoidance behavior and resistance to flooding and masquerade attacks.

FIG. 6 illustrates an example SCTP association initialization procedure. More particularly, FIG. 6 is a signal-flow diagram of an initialization of SCTP association between endpoints (client 602 and server 604). At step 606, client 602 sends an initialization (INIT) message to server 604. At step 608, server 604 sends an initialization acknowledgement message (INIT-ACK) message to client 602. At step 610, client 602 sends a COOKIE-ECHO message to server 604. At step 612, server 604 sends a COOKIE-ACK message to client 602.

During the four-way handshake performed during initialization, the following SCTP specific information is exchanged between the endpoints (i.e., client 602 and server 604). The exchanged information includes an initiated tag, an advertised receiver window credit, a number of outbound streams, a number of inbound streams, an initial transmission sequence number (TSN), and a state cookie.

The Initiated Tag is used for packet validation of the SCTP session. A tag value (initial tag) is chosen by each end of the association during association initialization. This value will be assigned to field "Verification Tag" on all upcoming packets. Packets received without the expected Verification Tag value in the session are discarded, as a protection against blind masquerade attacks and against stale SCTP packets from previous sessions.

The Advertised Receiver Window Credit parameter represents the dedicated buffer space, in number of bytes, the endpoints have reserved in association with this window. During the life of the association, this buffer space should not be lessened (i.e., dedicated buffers taken away from this association).

The number of outbound streams defines the number of outbound streams the sender endpoint wishes to create in this association. The final number of outbound streams will be the minimum value of "Number of Outbound Streams" from the sender endpoint and the "Number of Inbound Streams" from the receiver endpoint.

The number of inbound streams defines the maximum number of streams the sender endpoint allows the peer end to create in this association. The final number of inbound streams will be the minimum value of "Number of Inbound Streams" from the sender endpoint and the "Number of Outbound Streams" from the receiver endpoint.

The Initial TSN is the initial TN of the sender of the association.

The state cookie is used for session authentication for protection against attack.

For multi-homing, in the current SCTP standard, multiple transport addresses on the end-points can be setup during the association initialization procedure. Modification of addresses after SCTP establishment can be done with an INIT message and a new address list parameter, the receiving endpoint responds with an ABORT message with cause of error "restart of an association with new addresses." The signal flow for address changes is described in more detail below in relation to FIG. 7.

FIG. 7 illustrates an example of address changes on an existing association. More particularly, FIG. 7 is a signal-flow diagram of an address change between endpoints (Endpoint A 702 and Endpoint Z 704). At step 706, Endpoint A 702 sends an INIT message to Endpoint Z 704. The INIT message includes a new address list parameter (reflected in the example of FIG. 7 as "address list=<differ from previous INIT/INIT-ACK>"). At step 708, Endpoint Z 704 sends an ABORT message to Endpoint A 702. The ABORT message includes a cause of error "restart of an association with new addresses" (reflected in the example of FIG. 7 as "Error Cause="Restart of an association with new addresses").

FIG. 8 illustrates a simplified procedure for a (graceful) termination of SCTP association. In FIG. 8, Endpoint A wants to terminate the association. Endpoint A will stop accepting new data from its upper layer. Endpoint A will wait (and retransmit outstanding data if needed) until all outstanding data has been acknowledged by Endpoint Z. Endpoint A then transmits a SHUTDOWN chunk to Endpoint Z. When Endpoint Z receives the SHUTDOWN chunk, it will stop accepting new data from its upper layer. Endpoint Z will wait (and retransmit outstanding data if needed) until all outstanding data has been acknowledged by Endpoint A. Endpoint Z then transmits a SHUTDOWN-ACK chunk to Endpoint A. When Endpoint A receives the SHUTDOWN-ACK chunk, it will remove all record of the association and will transmit a SHUTDOWN-COMPLETE chunk to Endpoint Z. When Endpoint Z receives the SHUTDOWN-COMPLETE chunk, it will remove all record of the association.

The present disclosure proposes solutions that may be applied to an S1 interface, such as the S1 interface in the LTE architecture. The LTE architecture may evolve over time. The overall principles of the solutions proposed herein would work for both an LTE-like architecture and a new architecture based on an evolution of the S1 interface, for example, an architecture with evolved counterparts of the S1, X2 and Uu interfaces and which further provides that any new Radio Access Technology (RAT) would be integrated with the LTE radio interface at RAN level in a similar fashion as the way LTE Dual Connectivity is defined. An example of an evolved architecture is a 5G architecture.

LTE and evolutions thereof (such as 5G) may support various features and functionality. As an example, the concept of network slicing applies to both LTE Evolution and new 5G RAT (also referred to as "NX" herein). Network slicing is about creating logically separated partitions of the network, addressing different business purposes. These "network slices" are logically separated to a degree that they may be regarded and managed as networks of their own. A key driver for introducing network slicing is business expansion, such as improving the cellular operator's ability to serve a number of different industries, e.g., by offering connectivity services with different network characteristics (performance, security, robustness, and complexity).

FIG. 9 illustrates an example of an architecture with network slicing. As shown, a shared Radio Access Network (RAN) infrastructure connects to several Evolved Packet Core (EPC) instances (one EPC instance per network slice). As the EPC functions are virtualized, an operator may instantiate a new Core Network (CN) when it is determined that a new slice should be supported. Slice 0, for example, may be a Mobile Broadband slice and Slice 1, may be, for example, be a Machine Type Communication network slice.

SUMMARY

Certain problems may occur as a result of using previous techniques for establishing an SCTP association. As discussed above, previous techniques establish only a single SCTP association between an eNB and MME. As a result, a first problem that may be associated with previous techniques for establishing an SCTP association is that UEs supported by the single SCTP association may lose connectivity to the network if a failure occurs on the single SCTP association.

A second problem that may be associated with previous techniques for establishing an SCTP association is an inability to provide a graceful redundancy switch of hardware (HW) in the case of a hardware swap. It is desired that during hardware maintenance and/or expansion, the ongoing traffic in the network should be maintained without disturbance (e.g., without packet loss). However, with the current limitation of S1AP/SCTP relationship, and the current S1AP protocol, it is not possible to swap the hardware where the SCTP/S1AP software is located without disconnecting all the UEs connected to the S1AP connection. Unfortunately Multi-homing is not a solution as it does not solve the problem if the SCTP process instance that needs to be swapped is located in hardware.

A third problem that may be associated with previous techniques for establishing an SCTP association occurs when a single UE handling failure causes a domino crash of SCTP. During SCTP association initialization, a common receiving buffer is assigned (reflected by parameter Advertised Receiver Window Credit). This receiving buffer will be the shared resource between the SCTP user application (i.e., S1AP) and SCTP transport service. As the receiving buffer is the shared resource between SCTP transport service and S1AP service, communication crash between an MME and an eNB will occur as soon as crash occurs on one single process in SCTP user application or SCTP transport service (e.g., one of the UE handling processes). Unfortunately, introduction of streams within SCTP instance will not solve this problem as the receiving buffer is shared among the streams. This lack of robustness is especially serious when the eNB has a big configuration with contains a lot of connecting UEs.

A fourth problem that may be associated with previous techniques for establishing an SCTP association occurs during high S1 signaling intensity. It is possible that an eNB or future evolutions of it may cover wide areas with its cells. With this evolution of eNBs, it may occur that an eNB may serve a large number of UEs and therefore generate a large amount of S1AP traffic towards connected MMEs. One problem that may occur in such scenario is that a single SCTP association between the eNB and one of the connected MME will have to carry a very large amount of S1AP traffic, resulting in scalability problems. Namely the nodes terminating the SCTP association supporting the S1AP traffic may become overloaded with the large amount of S1AP signaling.

Certain embodiments of the present disclosure may provide solutions to one or more problems associated with previous techniques for establishing an SCTP association. For example, certain embodiments introduce procedures in which multiple SCTP association instances are allowed to be associated to a single S1AP. These multiple SCTP association instances may be dynamically added and removed during the lifetime of S1AP. To apply the proposed solution to the current S1AP interface would require changes to the current S1AP interface. The solution may also be applied to other interfaces, such as the X2AP interface or other 3GPP interfaces that use single SCTP association instance as Transport Network Layer (TNL).

Certain embodiments disclose a method for use in a first network node. The method comprises establishing a first Stream Control Transmission Protocol (SCTP) association for an S1AP connection between the first network node and a second network node and connecting the S1AP connection between the first network node and the second network node. The method further comprises establishing a second SCTP association for the S1AP connection between the first network node and the second network node.

Certain embodiments disclose a network node. The network node comprises an interface operable to facilitate communications with a second network node, a memory operable to store instructions, and processing circuitry operable to execute the instructions that cause the node to connect an S1AP connection between the first network node and the second network node and to establish first and second SCTP associations for the S1AP connection. In certain embodiments, the network node further comprises a determining module, a communication module, and a receiving module. The determining module determines to establish the first and second SCTP associations. The determination may be initiated by the network node itself, or may be made in response to a request from the second network node to establish an SCTP association. In certain embodiments, the determining module also determines to move traffic from the first SCTP association to the second SCTP association, for example, in response to a load balancing determination, in connection with hardware maintenance or hardware expansion, or in response to a determination to perform network slicing. The determining module sends signals or messages to the communication module to facilitate establishing the SCTP associations and/or moving the traffic, and the communication module communicates the signals or messages to the second network node. The receiving module receives signals or messages from the second network node and may communicate the received signals or messages to the determining module for use in further determinations.

Certain embodiments disclose a computer program product comprising a non-transitory computer readable storage medium having computer readable program code embodied in the medium. The computer readable program code, when executed by a first network node, is operable to connect an S1AP connection between the first network node and a second network node and to establish first and second SCTP associations for the S1AP connection.

The first and second SCTP associations in the above-described method, network node, and computer program product can be used to carry traffic. The traffic can be carried on a plurality of signaling streams, and the signaling streams can be allocated among the SCTP associations in any suitable manner. For example, in certain embodiments, the above-described method, network node, or computer program product dedicates the first SCTP association to one or more user equipment (UE) associated signaling streams and dedicates the second SCTP association to a non-UE associated signaling stream. In the example, each UE associated signaling stream is associated with a respective UE. As an alternative example, the above-described method, network node, or computer program product associates a first non-UE associated signaling stream and a first set of one or more UE associated signaling streams with the first SCTP association, and associates a second non-UE associated signaling stream and a second set of one or more UE associated signaling streams with the second SCTP association.

An advantage of the above-described method, network node, and computer program product is that by allowing multiple SCTP associations per S1AP connection, the proposed solution can eliminate resetting of all UEs associated to S1AP in case of re-establishment of S1AP transport layer (SCTP) during e.g., hardware (HW) maintenance/expansion, as the SCTP association may now be disconnected and reconnected to S1AP without removal of existing S1AP configuration data. An additional advantage is that the proposed solution increases S1AP robustness in case of software failure (SW_failure), that is, the number of affected UEs will be decreased when a SCTP instance fails. A further advantage of the proposed solution is that is allows for S1AP signaling load distribution by spreading signaling load over multiple SCTP connections eventually served by different processors.

In further embodiments of the above-described method, network node, and computer program product, traffic is moved from the first SCTP association to the second SCTP association. The traffic comprises user equipment (UE) associated S1AP control signaling and/or non-UE associated S1AP control signaling. The ability to move from one SCTP association to another may provide additional technical advantages. For example, traffic can be moved in response to a load balancing determination, in connection with hardware maintenance or hardware expansion, or in response to a determination to perform network slicing.

Another technical advantage of certain embodiments allows for graceful shutdown of an SCTP association, which may allow for graceful moving of S1AP signaling between SCTP associations. As an example, the above-described method, network node, and computer program product can send outgoing S1AP messages on the second SCTP association after stopping outgoing S1AP messages on the first SCTP association and confirming that incoming S1AP messages on the first SCTP association have stopped.

As a more specific example, from the perspective of a network node that initiates moving the traffic, the method, network node, or computer program product can stop all outgoing S1AP messages on the first SCTP association and, after stopping all the outgoing S1AP messages, send the second network node a request to move from the first SCTP association to the second SCTP association. The request comprises a first stop marker indicating the last message being transmitted by the first network node on the first SCTP association. The method, network node, or computer program product then receives from the second network node a confirmation to move the first SCTP association to the second SCTP association. The confirmation comprises a second stop marker indicating the last message being transmitted by the second network node on the first SCTP association. After receiving the confirmation, the method, network node, or computer product uses the second SCTP association to send the outgoing S1AP messages occurring after the first stop marker and to receive incoming S1AP messages occurring after the second stop marker.

As a more specific example, from the perspective of a network node that does not initiate moving the traffic, the method, network node, or computer program product receives from the second network node a request to move from the first SCTP association to the second SCTP association. The request comprises a first stop marker indicating the last message being transmitted by the second network node on the first SCTP association. In response, the method, network node, or computer program product stops all outgoing S1AP messages on the first SCTP association and then sends the second network node a confirmation to move the first SCTP association to the second SCTP association. The confirmation comprises a second stop marker indicating the last message being transmitted by the first network node on the first SCTP association. The method, network node, or computer program product receives an indication from the second network node that the move to the second SCTP association is complete. The indication can comprise a completion message or the receipt of incoming S1AP messages via the second SCTP association. The incoming S1AP messages received on the second SCTP association comprise messages occurring after the first stop marker.

In certain embodiments having an S1AP connection with multiple SCTP associations, it is desirable that only some of the S1AP signalings mapped on a SCTP association be moved without causing disturbance on other signaling any of the SCTP associations, for example, in the case of load balancing.

Certain embodiments of the above-described solutions introduces procedures that allow a single S1AP signaling connection (both UE-associated and non UE-associated) to be moved between SCTP associations for an S1AP signaling connection with multiple SCTP associations. To stop the S1AP signaling for an SCTP association, "Stop Marker" messages (one originated from eNB, and one originated from MME) are introduced on S1AP. The usage of the "stop marker" messages is summarized as follows. First, the originating endpoint stops all the outgoing messages for an individual UE-associated signaling instance or non UE-associated signaling instance. Second, in some embodiments, the originating endpoint also transmits a "stop marker" message to the destination endpoint using the same "signaling identity" through the same stream the individual signaling instance. These "stop marker" messages acts as the last message for the SCTP signaling before the signaling flow has been stopped on the old SCTP association. As SCTP guarantees in-order delivery of S1AP messages, after the "stop marker" message has been received, subsequent messages from the S1AP signaling may then be moved to a new SCTP association which still guarantees in-order delivery of messages without loss. For resuming the stopped S1AP signaling, "Start marker" message is introduced on S1AP layer in some embodiments. This "start marker" message informs the endpoints that the S1AP message may be resumed on the new SCTP association. The procedure prevents disturbance on any levels of S1AP interface, i.e., S1AP signaling and SCTP association.

An advantage of including stop and/or start markers when moving traffic include increased flexibility of load distribution capability in a S1AP with multiple SCTP associations, where a single S1AP signaling connection may be freely moved between SCTP association without causing any disturbance on the interface in terms of in-order delivery, lost message, or reset of any SCTP association.

The above-described procedures may allow for moving some or all traffic from the first SCTP association. In an embodiment, all of the traffic from the first SCTP association is moved to the second SCTP association and/or other SCTP association(s) between the first network node and the second network node. The first SCTP association may then be deleted after moving all of the traffic from the first SCTP association. An advantage of this embodiment allows for performing maintenance on the hardware that was carrying the first SCTP association. In another embodiment, some of the traffic remains on the first SCTP association (i.e., the first SCTP association is not deleted), for example, in the case of load balancing.

In certain embodiments, the traffic comprises a plurality of streams. The messaging between the first network node and the second network node identifies one or more of the streams to move from the first SCTP association to the second SCTP association. As an example, the traffic may comprise a plurality of user equipment (UE) associated signaling streams, and the messaging between the first network node and the second network node comprises a list identifying at least two of the UE associated signaling streams to move from the first SCTP association to the second SCTP association.

An advantage of certain embodiments is that the traffic is moved from the first SCTP association to the second SCTP association without having to tear down the S1AP connection.

In certain embodiments, identifiers are used to establish, delete, or reset the first SCTP association or to establish, delete, or move a signaling stream. The method, network node, or computer program product can determine any suitable identifiers. In certain embodiments, the identifiers include a first configuration identifier that the first network node associates with the S1AP connection, a second configuration identifier that the second network node associates with the S1AP connection, a first bundle identifier that the first network node associates with the first SCTP association, and a second bundle identifier that the second network node associates with the first SCTP association. In certain other embodiments, the identifiers include a first configuration identifier that the first network node associates with the S1AP connection, a second configuration identifier that the second network node associates with the S1AP connection, a first bundle identifier that the first network node associates with a signaling stream of the first SCTP association, and a second bundle identifier that the second network node associates with the signaling stream of the first SCTP association.

As further discussed below, the proposed solutions requires changes in the S1AP interface defined in the existing 3GPP specification. The proposed solution may also be applied to X2 Application Protocol (X2AP) interface or other 3GPP RAN interface using SCTP as Transport Network Layer or evolutions thereof.

Certain embodiments may have all, some, or none of the technical advantages discussed above. Other advantages will be apparent to those of ordinary skill in the art.

BRIEF DESCRIPTION

FIG. 32 is a flow chart illustrating an example of a method for associating UE-associated signaling streams and non-UE associated signaling streams with SCTP associations, in accordance with certain embodiments of the present disclosure.

DETAILED DESCRIPTION

Certain embodiments of the present disclosure relate to establishing multiple SCTP associations per S1AP Connection. For example, the present disclosure describes methods, network nodes, and computer program products for adding, (gracefully) deleting, and handling of a broken SCTP association to an existing S1AP. Further embodiments relate to moving UE-associated signaling and/or non-UE associated signaling between SCTP Associations. In addition, the present disclosure describes identifiers that can be used to identify a mapping of individual SCTP association to S1AP. Particular embodiments are described with respect to FIGS. 10-39 of the drawings, like numerals being used for like and corresponding parts of the various drawings.

Figure 1:
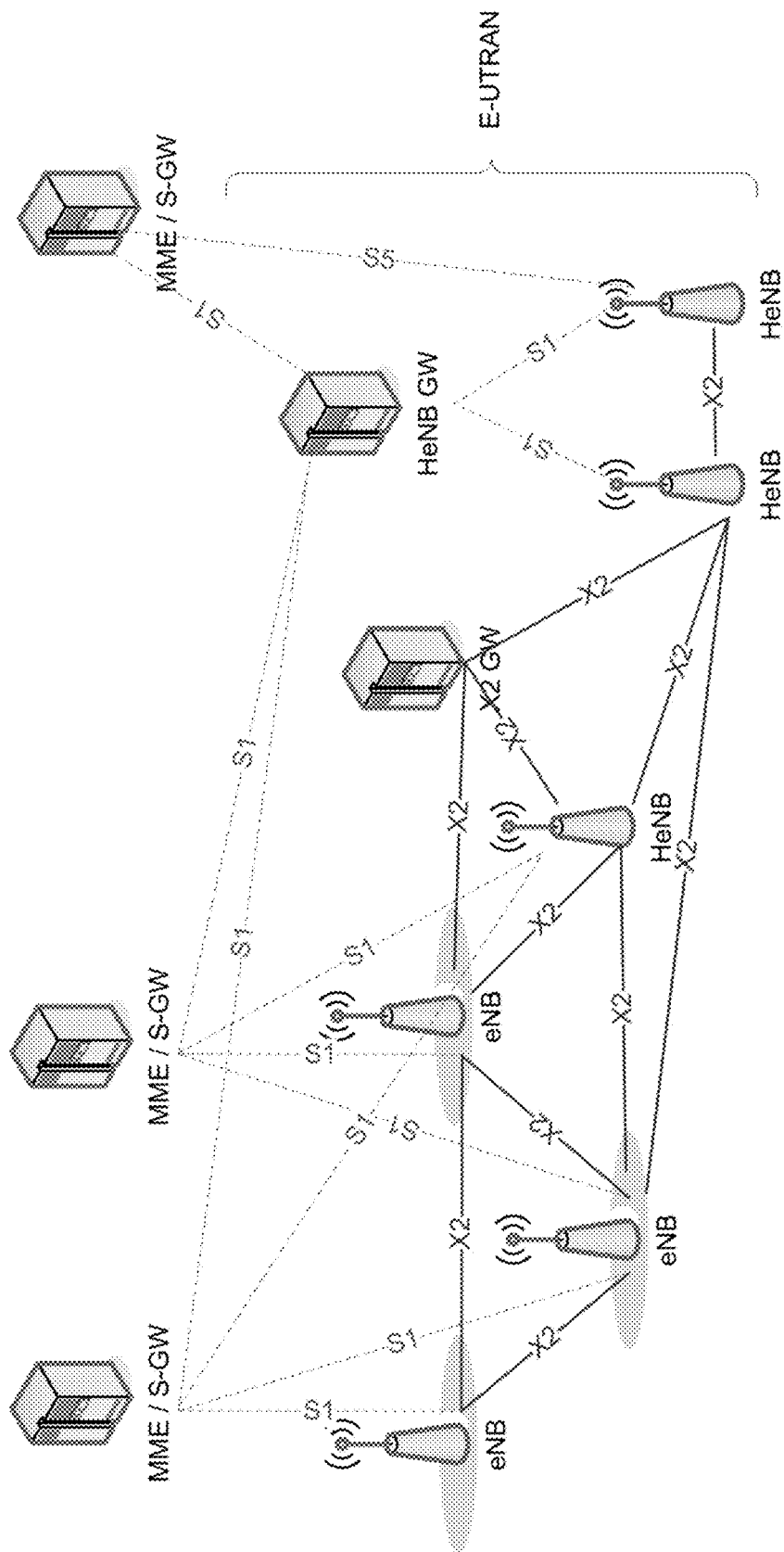
FIG. 1 is a block diagram illustrating an example of an LTE network architecture that includes S1 interfaces.
Figure 2:
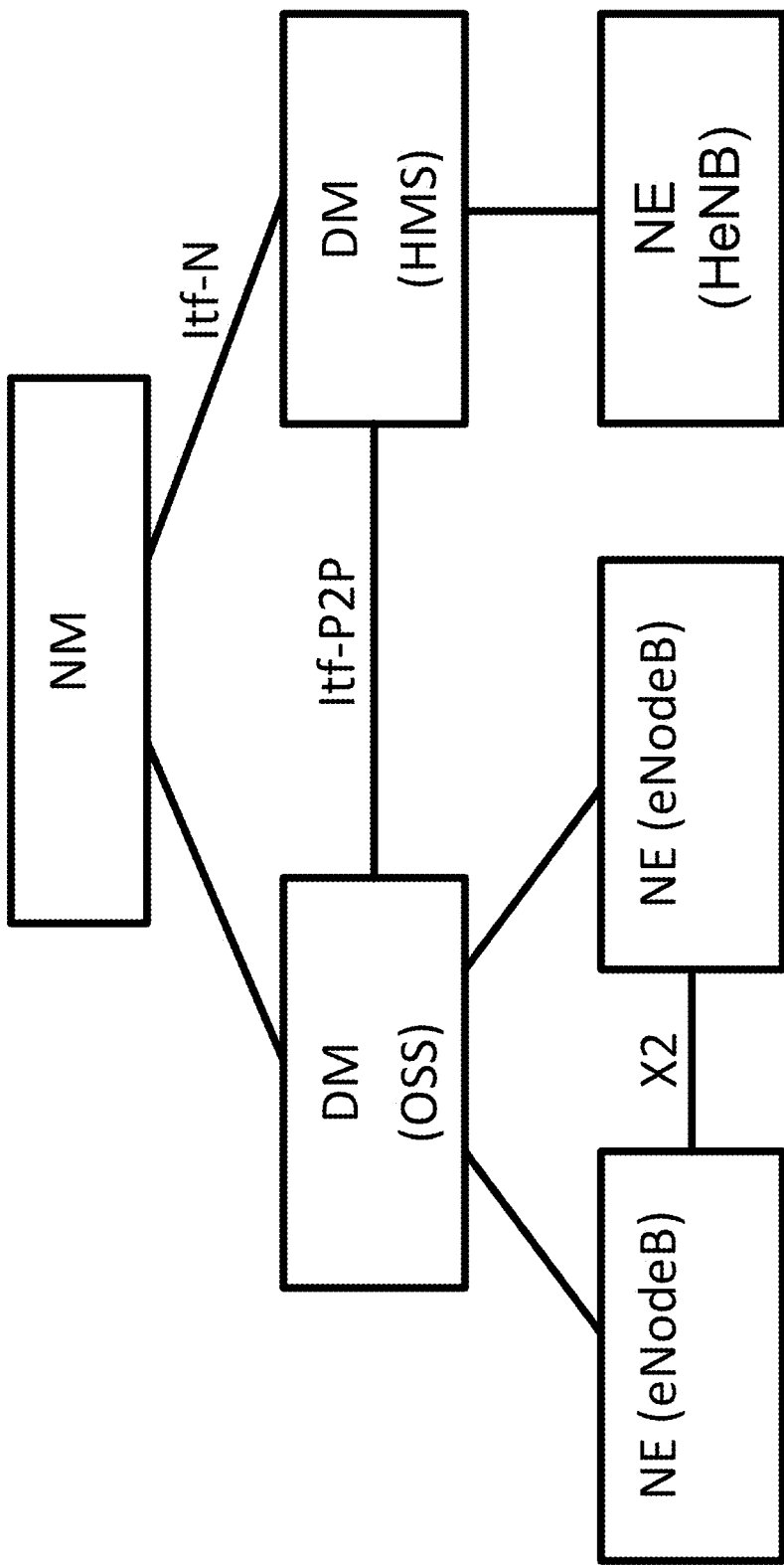
FIG. 2 is a block diagram illustrating an example of a management system architecture that may be used to configure elements of a network.
Figure 3:
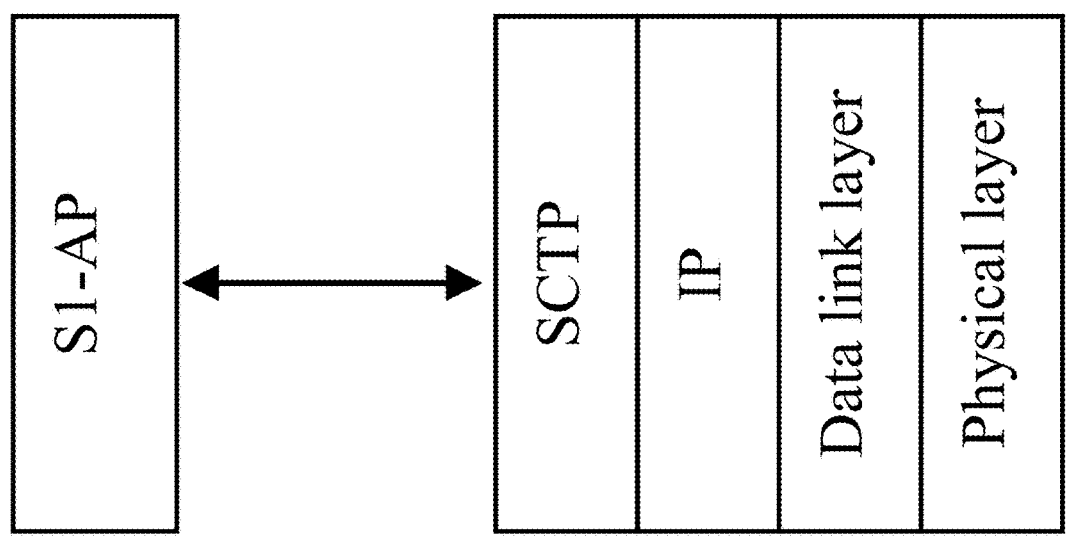
FIG. 3 is a block diagram illustrating an example of an S1 Interface Control Plane stack that includes an SCTP layer.
Figure 4:
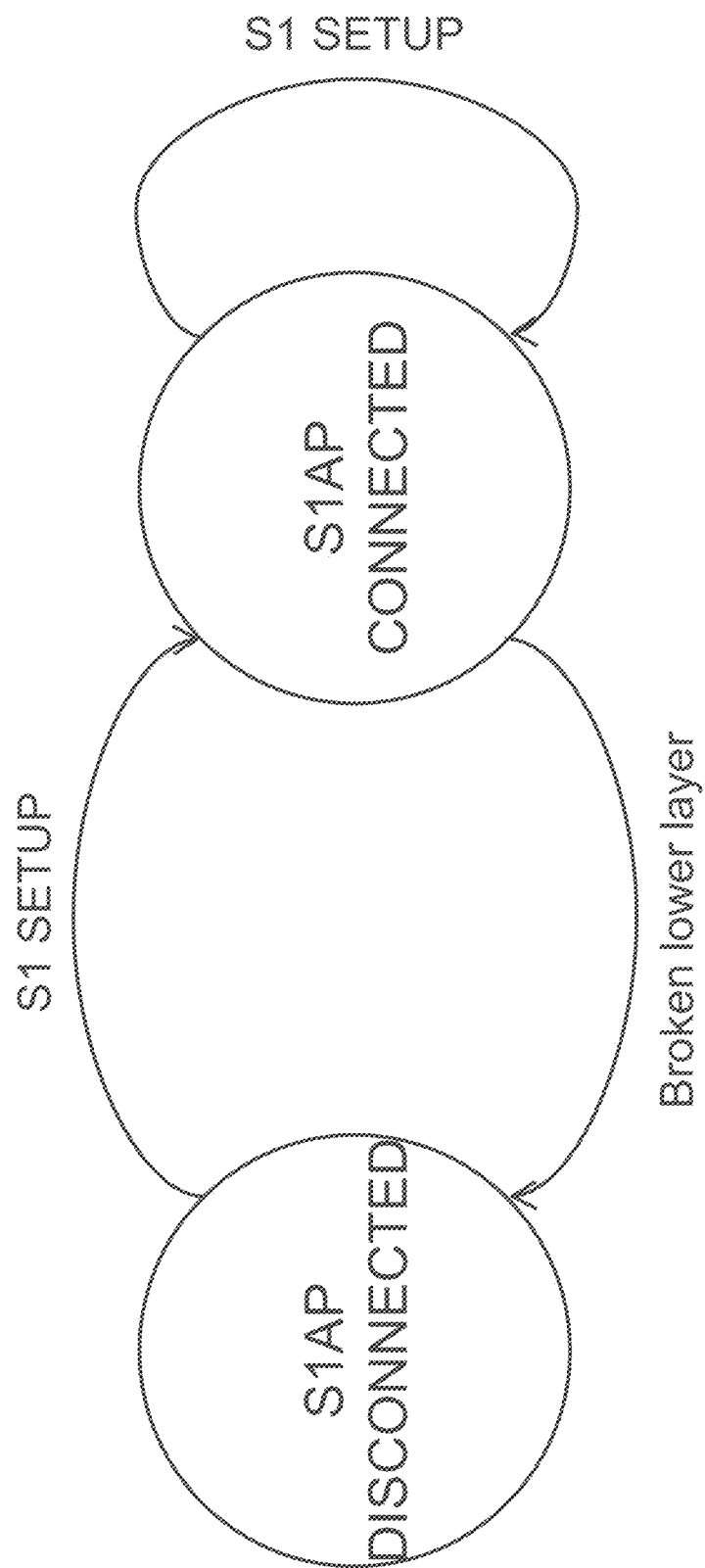
FIG. 4 is a state diagram illustrating an example of S1AP state transitions.
Figure 5:
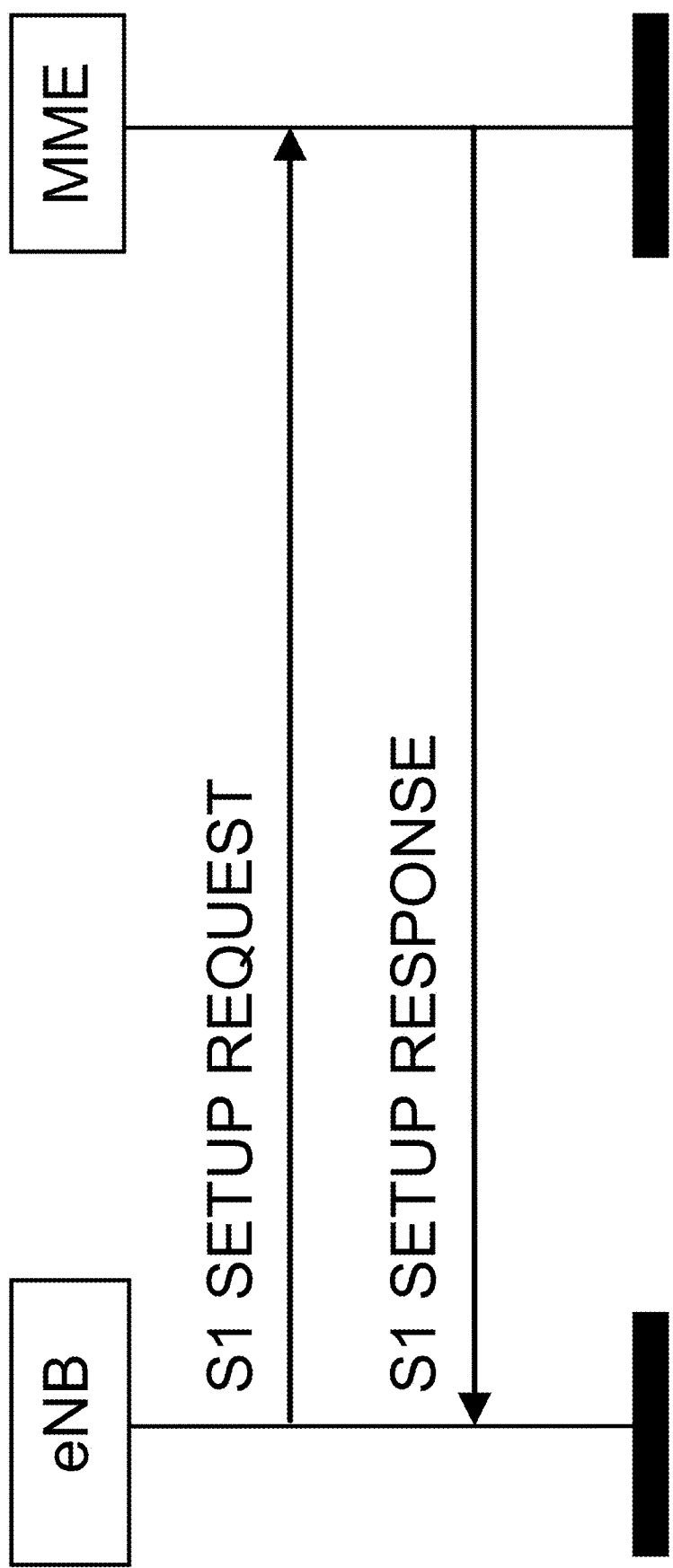
FIG. 5 is a signal diagram illustrating an S1 setup procedure.
Figure 6:
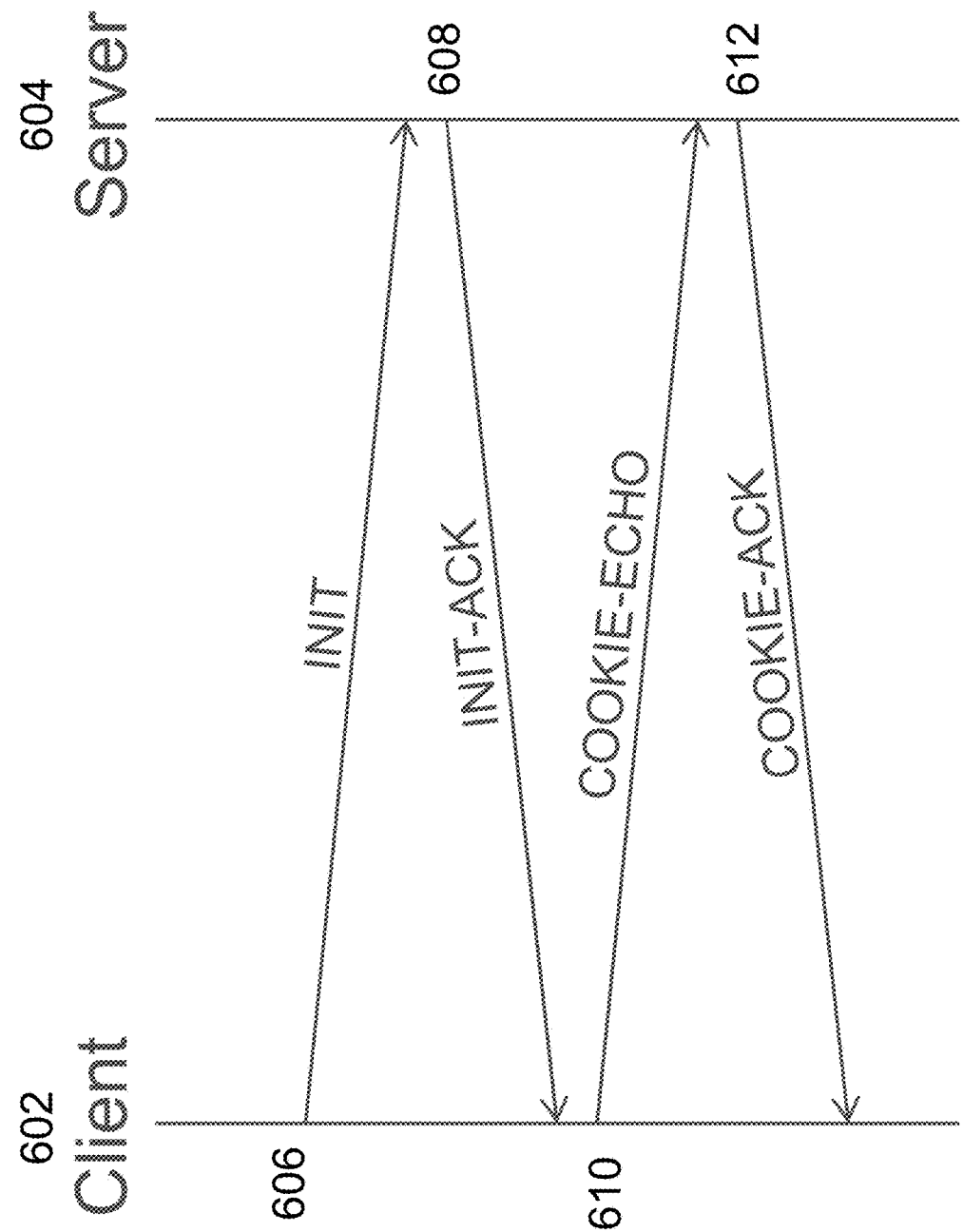
FIG. 6 is a signal diagram illustrating an SCTP association initialization procedure.
Figure 7:
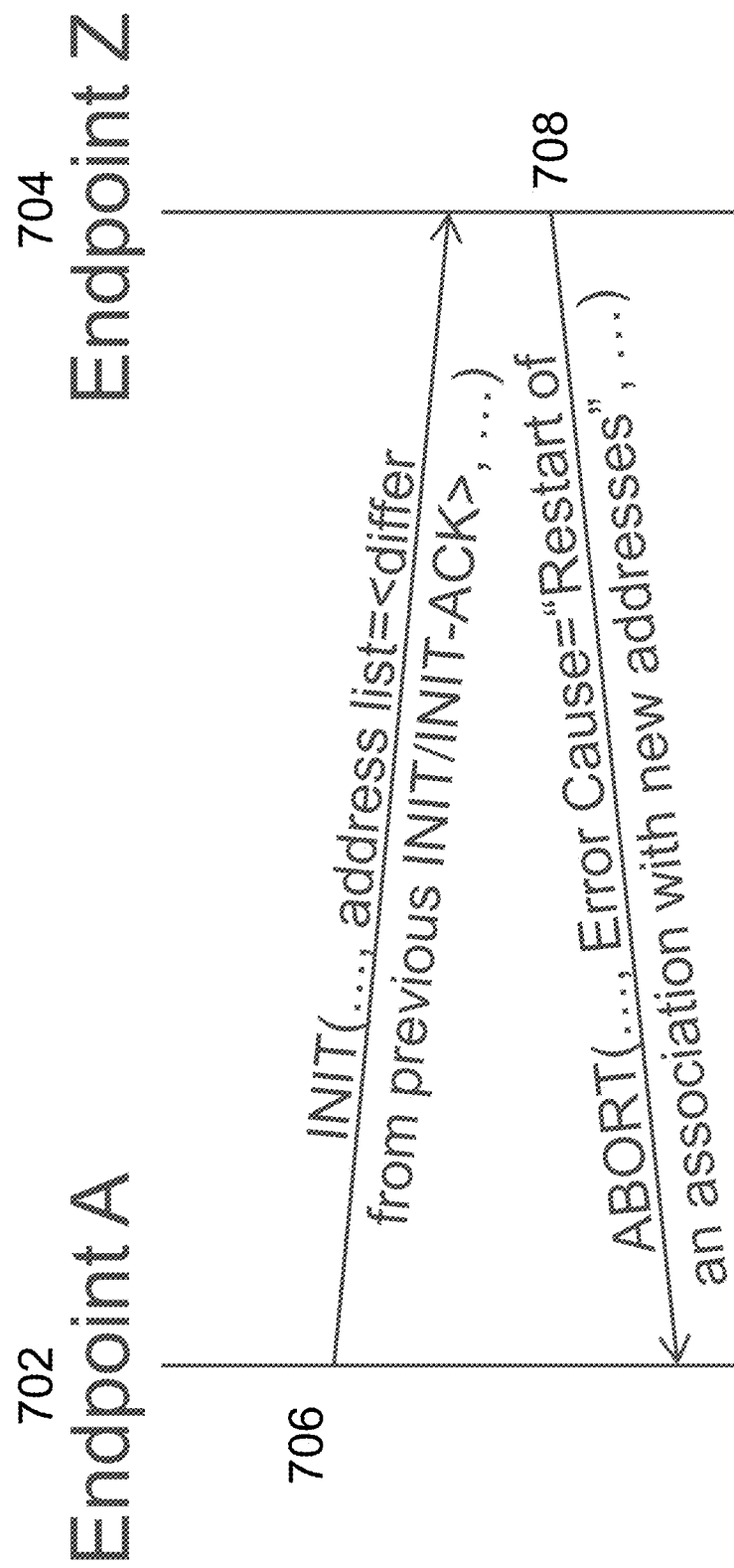
FIG. 7 is a signal diagram illustrating an address change on an existing SCTP association.
Figure 8:
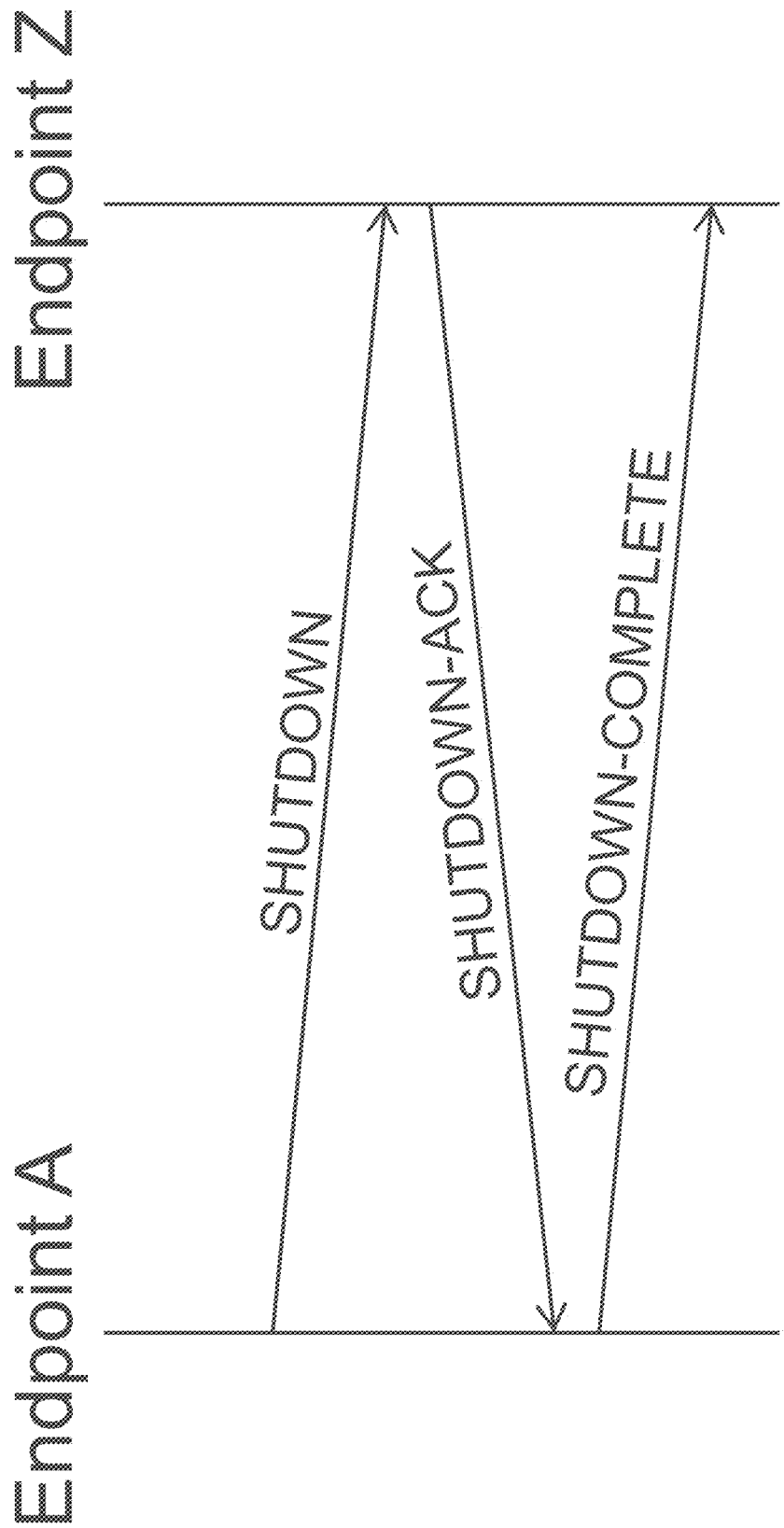
FIG. 8 is a signal diagram illustrating a graceful termination of an SCTP association.
Figure 9:
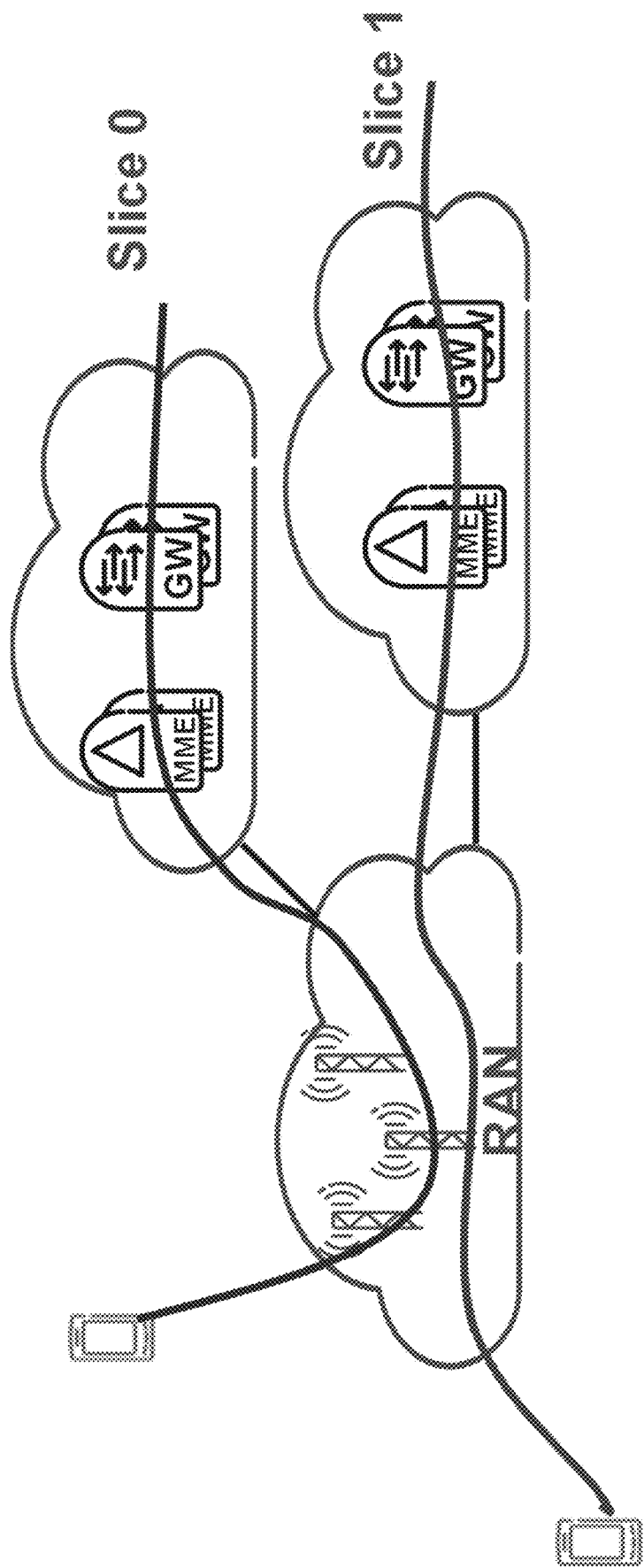
FIG. 9 is a block diagram illustrating an example of network slicing.
Figure 10:
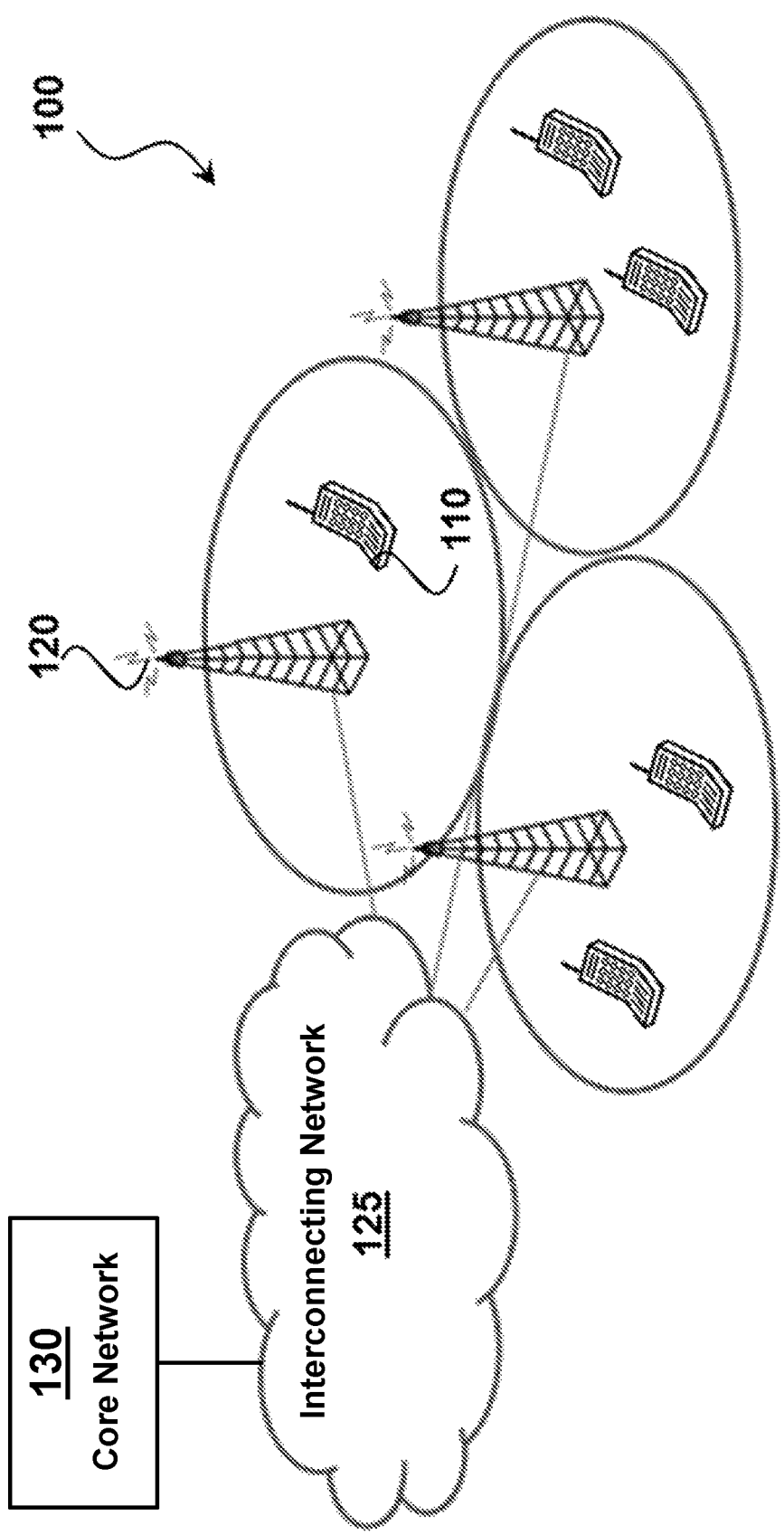
FIG. 10 is a block diagram illustrating an example of a wireless network, in accordance with certain embodiments of the present disclosure.

FIG. 10 illustrates an example of a wireless network 100 in which the proposed solutions may be implemented, in accordance with certain embodiments. Network 100 includes one or more UE(s) 110 (which may be interchangeably referred to as wireless devices 110) and one or more network node(s), such as radio access nodes 120 (e.g., access point, a radio access point, a base station, a base station controller, an eNodeB (eNB), a Home eNB (HeNB), a HeNB Gateway (HeNB GW), etc.) and core network nodes 130 (e.g., MMEs, S-GWs, or other device that supports one or more SCTP-S1AP connections). Examples of interfaces between network nodes are described above (e.g., FIG. 1 and FIG. 3).

UEs 110 may communicate with radio network nodes 120 over a wireless interface. For example, a UE 110 may transmit wireless signals to one or more of network nodes 120, and/or receive wireless signals from one or more of network nodes 120. The wireless signals may contain voice traffic, data traffic, control signals, and/or any other suitable information. In some embodiments, an area of wireless signal coverage associated with a network node 120 may be referred to as a cell. In some embodiments, UEs 110 may have device-to-device (D2D) capability. Thus, UEs 110 may be able to receive signals from and/or transmit signals directly to another UE.

In certain embodiments, radio access nodes 120 may interface with a radio network controller. The radio network controller may control radio access nodes 120 and may provide certain radio resource management functions, mobility management functions, and/or other suitable functions. In certain embodiments, functions of the radio network controller may be included in radio access node 120, core network node 130, or both. Radio access node 120 may interface with core network node 130 via an interconnecting network 125. Interconnecting network 125 may refer to any interconnecting system capable of transmitting audio, video, signals, data, messages, or any combination of the preceding. Interconnecting network 125 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 130 may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network.

As described above, example embodiments of network 100 may include one or more wireless devices 110, and one or more different types of network nodes capable of communicating (directly or indirectly) with wireless devices 110. In some embodiments, the non-limiting term UE is used. UEs 110 described herein can be any type of wireless device capable of communicating with network nodes or other UEs over radio signals. UE 110 may also be a radio communication device, target device, D2D UE, machine-type-communication UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc.

The term network node can be any kind of network node, such as radio access node 120 or core network node 130. Examples of network nodes include a base station (BS), radio base station, Node B, multi-standard radio (MSR) radio node such as MSR BS, eNB, gNB, network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, or any other suitable network node.

The terminology does not imply a certain hierarchical relation between the nodes. For example, certain embodiments may be described in terms of a first network node and a second network node, these network nodes may be any suitable network node. For example, in certain embodiments the first network node may be a radio access node 120 (e.g., eNB or gNB) and the second network node may be a core network node (e.g., MME or S-GW). As another example, in other embodiments the first network node may be a core network node (e.g., MME or S-GW) and the second network node may be a radio access node 120 (e.g., eNB or gNB).

Example embodiments of UE 110 and network nodes 120 and 130 are described in more detail below with respect to FIGS. 35-39.

Although FIG. 10 illustrates a particular arrangement of network 100, the present disclosure contemplates that the various embodiments described herein may be applied to a variety of networks having any suitable configuration. For example, network 100 may include any suitable number of UEs 110 and network nodes 120 and 130, as well as any additional elements suitable to support communication between UEs or between a UE and another communication device (such as a landline telephone). Furthermore, although certain embodiments may be described as implemented in an LTE network, the embodiments may be implemented in any appropriate type of telecommunication system supporting any suitable communication standards (including 5G standards) and using any suitable components, and are applicable to any RAT or multi-RAT systems in which a UE receives and/or transmits signals (e.g., data). For example, the various embodiments described herein may be applicable to LTE, LTE-Advanced, 5G, NR, UMTS, HSPA, GSM, cdma2000, WCDMA, WiMax, UMB, WiFi, another suitable radio access technology, or any suitable combination of one or more RATs.

Figure 11:
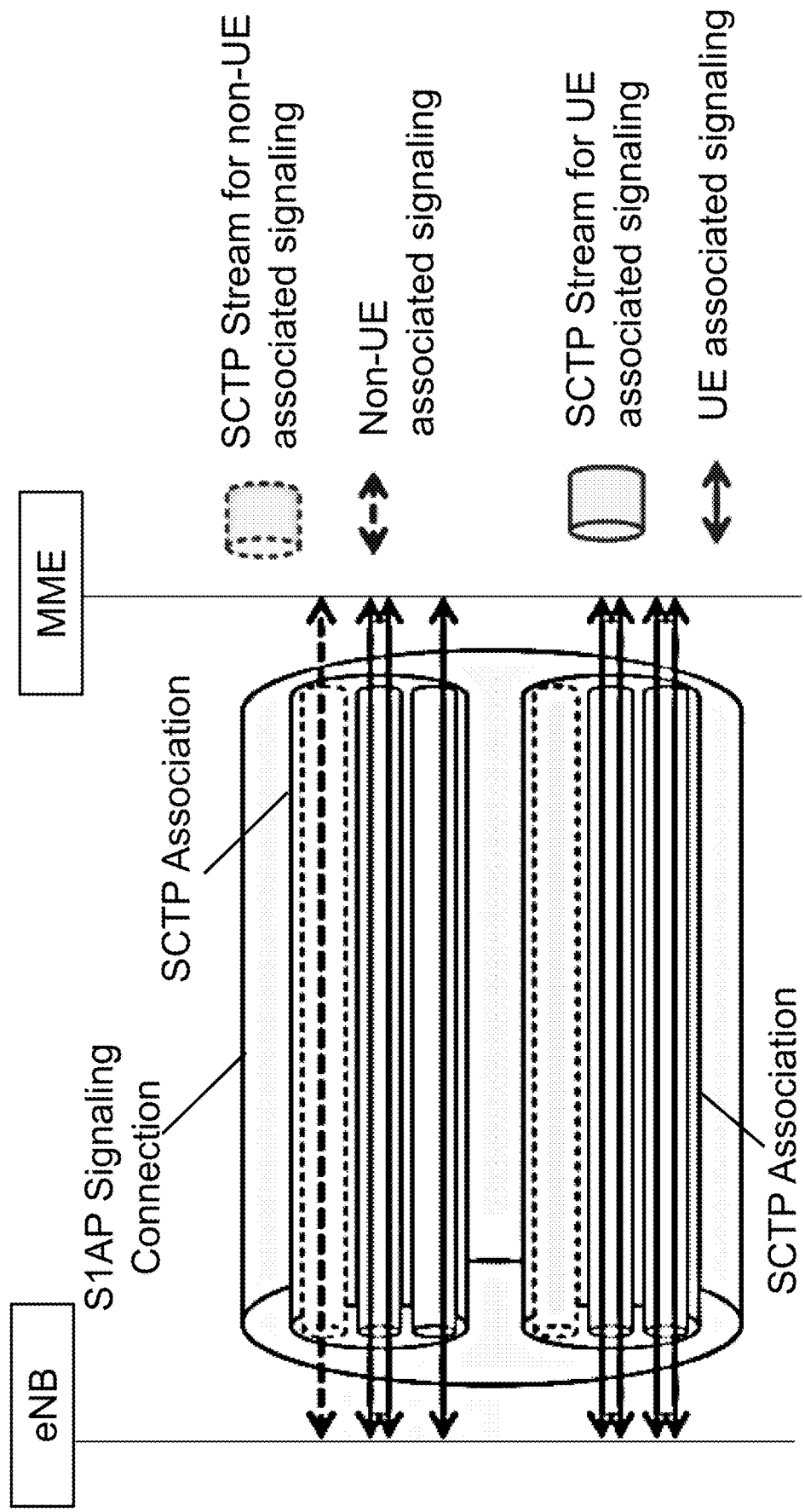
FIGS. 11-12 are diagrams illustrating examples of establishing multiple SCTP Associations per S1AP Connection and mapping non UE-associated procedures and UE-associated procedures to the SCTP associations, in accordance with certain embodiments of the present disclosure.
Figure 12:
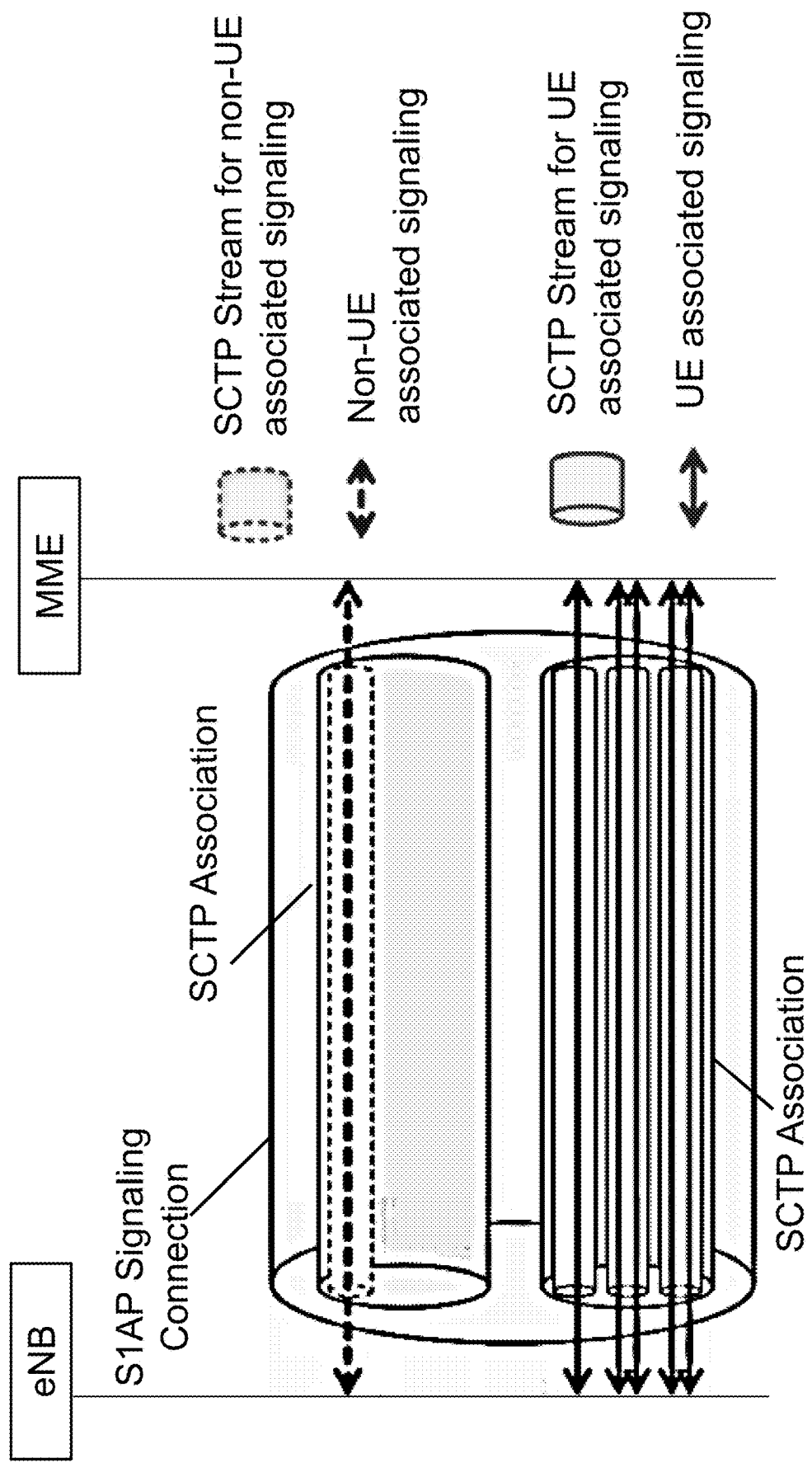

Multiple SCTP Associations Per S1AP Connection 1.1 New Requirement on Additional SCTP Associations As discussed above, existing 3GPP specifications only define one single SCTP association per MME and eNB pair. As a result, problems can arise, for example, because all UEs supported by the single SCTP association may lose connectivity to the network if a failure occurs on the single SCTP association. To address this problem, certain embodiments of the present disclosure introduce a new requirement to provide additional SCTP associations between the MME and eNB. FIGS. 11-12 illustrate examples of mapping S1 signaling to multiple SCTP connections.

There are several possibilities to map S1 signaling to multiple SCTP connections. However, as an example, a distinction can be made between non-UE associated S1AP procedures and UE associated S1AP procedures.

FIG. 11 illustrates a first example of mapping in which all the SCTP associations mapped to a single S1AP connection are setup in a way that they may carry both non UE-associated signaling procedures and UE-associated signaling. In certain embodiments, certain non UE-associated signaling uses only one of the SCTP associations at a time. That is, one SCTP association for non-UE associated signaling would be in use while the other SCTP association(s) for non-UE associated signaling would be idle. In other embodiments, specific non-UE associated signaling will be sent on an "idle" SCTP association.

FIG. 12 illustrates a second example of mapping of non UE-associated procedures and UE-associated procedures. One SCTP connection could carry non-UE associated signaling procedures and other SCTP connections could carry UE-associated signaling procedures. This arrangement of S1AP signaling split is beneficial to guarantee that at least one SCTP connection remains active to carry essential procedures like Paging, while other SCTP procedures may be suspended or removed.

For the first mapping example described above (FIG. 11), one proposed solution provides for the following conditions on SCTP associations established between one MME and eNB pair:
- For each SCTP association, a single pair of stream identifiers shall be reserved for the sole use of S1AP elementary procedures that utilize non UE-associated signaling.
- For each SCTP association, at least one pair of stream identifiers shall be reserved for the sole use of S1AP elementary procedures that utilize UE-associated signaling. However a few pairs (i.e., more than one) should be reserved.
- Non UE-associated signaling shall be transmitted on only one of the active SCTP associations, and should not be changed unless a controlled switching of SCTP instance is performed. Exceptions apply in connection to SCTP association addition (and deletion) to an existing S1AP.
- A single UE-associated signaling shall use one SCTP stream on any active SCTP associations, and the stream should not be changed during the communication of the UE-associated signaling, unless a controlled switching of SCTP association is performed.

For the second mapping example described above (FIG. 12), one proposed solution could involve the following conditions on SCTP associations established between one MME and eNB pair:
- In at least one dedicated SCTP association, where a single pair of stream identifiers shall be reserved for the sole use of S1AP elementary procedures that utilize non UE-associated signaling.
- In at least one dedicated SCTP association, where at least one pair of stream identifiers shall be reserved for the sole use of S1AP elementary procedures that utilize UE-associated signalings. However a few pairs (i.e., more than one) should be reserved.
- Non UE-associated signaling and UE-associated signaling shall be transmitted on separate SCTP associations.
- Non UE-associated signaling shall be transmitted on only one SCTP associations, and should not be changed unless a controlled switching of SCTP instance is performed. Exceptions apply in connection to SCTP association addition (and deletion) to an existing S1AP.
- A single UE-associated signaling shall use one SCTP stream on any active SCTP associations, and the stream should not be changed during the communication of the UE-associated signaling, unless a controlled switching of SCTP association is performed.

1.2 Identification for Mapping of Individual SCTP Association to S1AP

In certain embodiments, several SCTP associations may be dynamically attached and detached from the S1AP instance. Thus, there is a need for identification and mapping of SCTP association to the S1AP context on both endpoints. For each SCTP association and S1AP signaling bundle running over it, a single S1AP identifier may be assigned. Such identifier identifies the portion of the S1 signaling connection between eNB and MME running on the specific SCTP connection. In one embodiment of this proposed solution, the identifier could be made of a common part (e.g., made of a number of left most bits) identifying the overall eNB-MME S1 signaling connection, plus a specific part (e.g., made of a number of right most bits) that identifies the S1AP signaling bundle ongoing on the specific SCTP connection in question. In the example above such configuration would assign a separate SCTP connection for the S1AP signaling bundle carrying non-UE associated procedures and one or more separate SCTP connections for the S1AP signaling bundles carrying UE-associated procedures. Each S1AP signaling bundle is assigned a unique identifier and all procedures related to one UE will be kept within the same SCTP connection.

Figure 13:
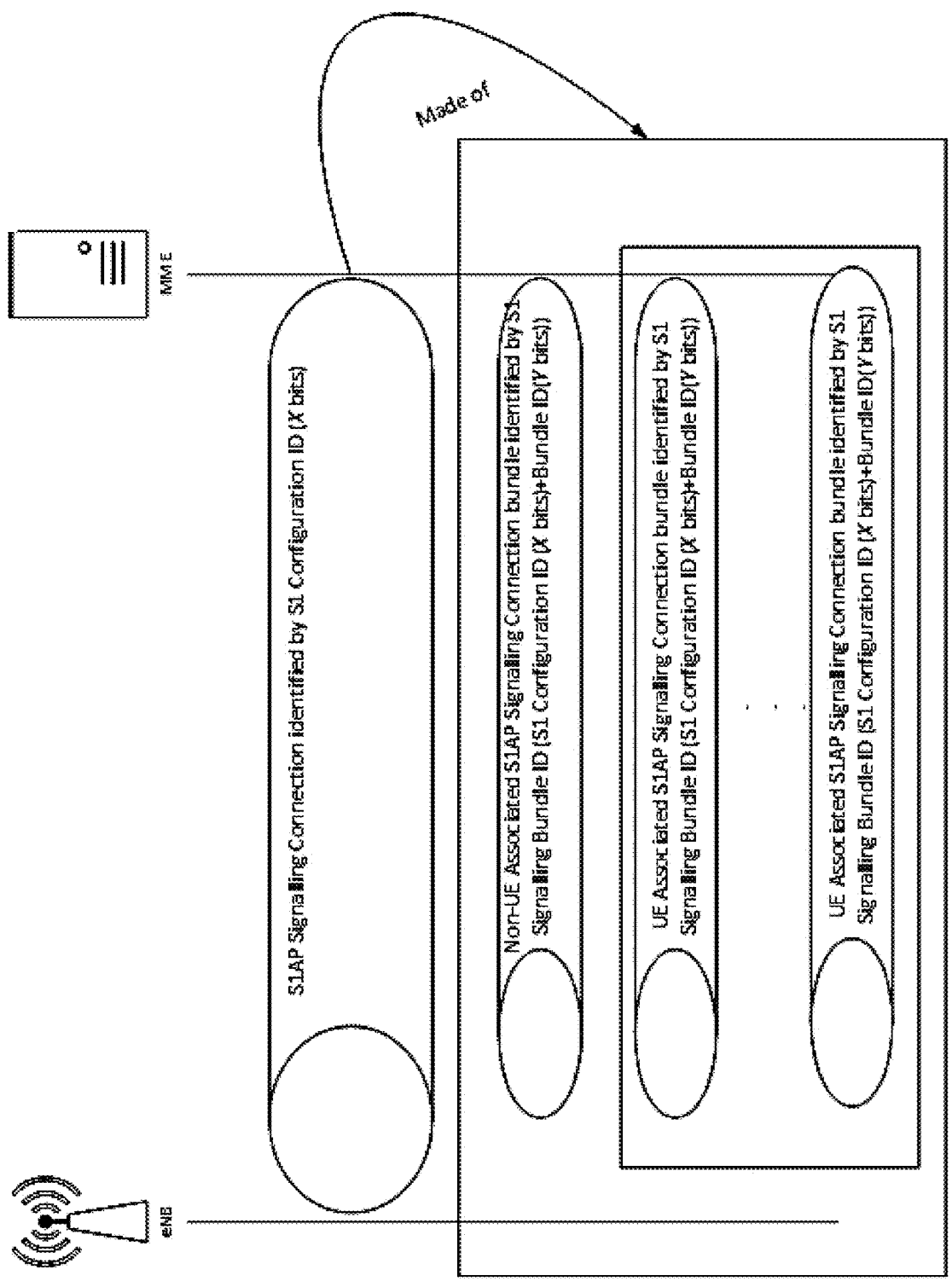
FIG. 13 is a diagram illustrating assignment of S1AP identifiers to distinguish between main S1AP signaling connection and S1 signaling bundles on different SCTP instances, in accordance with certain embodiments of the present disclosure.

FIG. 13 illustrates an example assignment of S1AP identifiers to distinguish between main S1AP signaling connection and S1 signaling bundles on different SCTP instances. In the example embodiment depicted in FIG. 13, the S1 signaling connection established between the eNB and the MME is split into a number of sub bundles. Each sub bundle carries part of the signaling for the overall signaling connection. Each sub bundle is associated to a separate SCTP connection. In the example explained above one sub bundle is in charge of carrying non-UE associated signaling, while one or more sub bundles are in charge of carrying UE associated signaling.

FIG. 13 provides a further example in which the S1 signaling connection is assigned an identifier, named S1 Configuration ID and assumed to be X bits long, that is unique between eNB and MME. Such identifier identifies the specific configurations for the S1 connection. For example, such identifier is able to identify a context for the signaling connection in which are stored details like Tracking Area Codes (TACs) and PLMN IDs supported by the eNB; PLMN IDs, MME Group IDs and MME Codes (MMECs) served by the MME. Each S1AP bundle, i.e., signaling portion of the main S1 signaling connection, may be identified by a parameter that is herein named S1 Signaling Bundle ID and that is made of the S1 Configuration ID (X bits) plus a Bundle ID (y bits). The bundle ID is unique within the eNB and MME pair.

For assigning bundle ID to the endpoints, one example method (i.e., "method 1") exchanges additional identifiers during S1 setup procedure, and during SCTP association addition procedure. After the procedure is completed, the initial/added SCTP association is assigned a unique S1 Signaling Bundle ID, and this mapping information is stored in the S1AP context on both endpoints.

For example, during S1 Setup procedure, in S1 SETUP REQUEST, eNB provides two (for eNB) unique identifiers to MME. One identifier for the S1AP instance "eNB S1 Configuration ID" and one identifier for the SCTP association "eNB S1 Signaling Bundle ID". In S1 SETUP RESPONSE, MME provides two corresponding unique (for MME) identifiers to MME, "MME S1 Configuration ID" and "MME S1 Signaling Bundle ID" to eNB. These S1AP/SCTP association identities are stored in S1AP context in both sides after the S1 setup and/or S1 association addition procedure is completed. By these identifiers, both endpoints may then be able to select the correct SCTP instance in S1AP context for e.g., deletion of SCTP instance. An example of these additional parameters, with MME S1 Configuration ID, MME S1 Signaling Bundle ID, eNB S1 Configuration ID and eNB S1 Signaling Bundle ID, with value range between 1 and $2^{32}-1$, can be found in Table 1 and Table 2 below.

TABLE 1

S1 SETUP REQUEST with eNB S1 Configuration ID and eNB S1 Signaling Bundle ID.

| IE/Group Name | Presence | Range | IE type and reference | Semantics | Criticality | Assigned Criticality |
|---|---|---|---|---|---|---|
| Message Type | M | | 9.2.1.1 | | YES | reject |
| Global eNB ID | M | | 9.2.1.37 | | YES | reject |
| eNB Name | O | | PrintableString (SIZE (1 . . . 150, . . . )) | | YES | ignore |
| Supported TAs | | 1 . . . <maxnoofTACs> | | Supported TAs in the eNB. | GLOBAL | reject |
| >TAC | M | | 9.2.3.7 | Broadcast TAC. | — | |
| >Broadcast PLMNs | | 1 . . . <maxnoofBPLMNs> | | Broadcast PLMNs. | — | |
| >>PLMN Identity | M | | 9.2.3.8 | | | |
| Default Paging DRX | M | | 9.2.1.16 | | YES | ignore |
| CSG Id List | | 0 . . . 1 | | | GLOBAL | reject |
| >CSG Id | | 1 . . . <maxnoofCSGIds> | 9.2.1.62 | | | |
| eNB S1 Configuration ID | O | 1 . . . $2^{32}-1$ | | eNB S1 Configuration ID for re-establishment | | |
| eNB S1 Signaling Bundle ID | O | 1 . . . $2^{32}-1$ | | eNB SCTP association ID for the S1AP instance | | |

TABLE 2

S1 SETUP RESPONSE with MME S1 Configuration ID and MME S1 Signaling Bundle ID

| IE/Group Name | Presence | Range | IE type and reference | Semantics | Criticality | Assigned Criticality |
|---|---|---|---|---|---|---|
| Message Type | M | | 9.2.1.1 | | YES | reject |
| MME Name | O | | PrintableString (SIZE (1 . . . 150, . . . )) | | YES | ignore |
| Served GUMMEIs | | 1 . . . <maxnoofRATs> | | The LTE related pool configuration is included on the first place in the list. | GLOBAL | reject |
| >Served PLMNs | | 1 . . . <maxnoofPLMNsPerMME> | | | — | |
| >>PLMN Identity | M | | 9.2.3.8 | | — | |
| >Served GroupIDs | | 1 . . . <maxnoofGroupIDs> | | | — | |
| >>MME Group ID | M | | OCTET STRING (SIZE(2)) | | — | |
| >Served MMECs | | 1 . . . <maxnoofMMECs> | | | — | |
| >>MME Code | M | | 9.2.3.12 | | — | |
| Relative MME Capacity | M | | 9.2.3.17 | | YES | ignore |
| MME Relay Support Indicator | O | | 9.2.1.82 | | YES | ignore |
| Criticality Diagnostics | O | | 9.2.1.21 | | YES | Ignore |
| MME S1 Configuration ID | O | 1 . . . $2^{32} - 1$ | | MME S1AP Configuration ID for re-establishment | | |
| MME S1 Signaling Bundle ID | O | 1 . . . $2^{32} - 1$ | | MME SCTP association ID for the S1AP instance | | |

For backward compatibility, the eNB may omit eNB SCTP S1AP ID in S1 SETUP REQUEST signal if it has no multiple SCTP association capability. MME may ignore eNB SCTP S1AP ID if it is a legacy node or it has no multiple SCTP association capability, and MME returns S1 SETUP RESPONSE without MME SCTP S1AP ID to inform eNB its lack of capability.

Another example method (i.e., "method 2") for assigning bundle ID to the endpoints only assigns the identifier during S1 Setup and S1 signaling bundle addition procedure, and mapping between SCTP association and the signaling bundle ID is done first when the S1AP signal is transmitted through the SCTP. In this example method, the identifiers may be assigned according to the scheme shown in FIG. 12. Table 3 shows how such identifiers may be used in the current message structure.

TABLE 3

S1 SETUP REQUEST with S1 signaling Connection IDs.

| IE/Group Name | Presence | Range | IE type and reference | Semantics | Criticality | Assigned Criticality |
|---|---|---|---|---|---|---|
| Message Type | M | | 9.2.1.1 | | YES | reject |
| Global eNB ID | M | | 9.2.1.37 | | YES | reject |
| eNB Name | O | | PrintableString (SIZE (1 . . . 150, . . . )) | | YES | ignore |

TABLE 3-continued

S1 SETUP REQUEST with S1 signaling Connection IDs.

| IE/Group Name | Presence | Range | IE type and reference | Semantics | Criticality | Assigned Criticality |
|---|---|---|---|---|---|---|
| Supported TAs | | 1 ... <maxnoofTACs> | | Supported TAs in the eNB. | GLOBAL | reject |
| >TAC | M | | 9.2.3.7 | Broadcast TAC. | — | |
| >Broadcast PLMNs | | 1 ... <maxnoofBPLMNs> | | Broadcast PLMNs. | — | |
| >>PLMN Identity | M | | 9.2.3.8 | | | |
| Default Paging DRX | M | | 9.2.1.16 | | YES | ignore |
| CSG Id List | | 0 ... 1 | | | GLOBAL | reject |
| >CSG Id | | 1 ... <maxnoofCSGIds> | 9.2.1.62 | | | |
| S1 Configuration ID | O | | Enumerated (0 ... 127) | Identifier for the S1 signaling configuration | | |
| S1 Bundle List | O | 0 ... 1 | | List of signaling bundles forming the S1 signaling connection | | |
| >S1 Signaling Bundles | | 1 ... <maxnoofS1SignalingBundles> | | | | |
| >> S1 Signaling Bundle ID | M | | Enumerated (0 ... 255) | Identifier for each signaling bundle forming the S1 signaling connection between eNB and MME. The X leftmost bits consist of the S1 Configuration ID IE | | |

In this example, the S1 SETUP REQUEST eNB will provide S1 Signaling Bundle ID for all the SCTP associations which will be mapped to the S1AP connection. In the S1 SETUP RESPONSE the MME may reply by adding an optional flag with value "supported" or "not supported" that specifies whether the received new IDs in the S1 SETUP REQUEST are supported and correctly received. If the flag is set to "not supported" or it is missing, the MME has no support for sub bundling of the S1 signaling connection and the eNB should fold back to legacy S1 connection configuration, namely to a scheme where the S1 signaling connection is mapped to only one SCTP connection.

As part of this example embodiment, an S1 Signaling Bundle ID may be added to each S1 signaling message or to some of them. When a S1AP message is transmitted through any of the related SCTP association after S1 Setup procedure has been executed, this S1 Signaling Bundle ID will be used in order to identify the signaling bundle to which the message belongs, and which bundle ID this SCTP association is mapped to the S1AP. As part of the embodiment some or all S1 signaling messages may include also the S1 configuration ID, to identify the S1 signaling context to which the messages belong, and to which S1AP the message carrying SCTP association belongs.

In an alternative embodiment of the proposed solution, the S1 Signaling Bundle IDs may be omitted and only the S1 Configuration ID may be used, after the initial UE associated procedure has been executed. This example embodiment assumes that the UE-associated signaling for a UE is sent all within the same SCTP connection. The embodiment provides that the MME UE S1AP ID and eNB UE S1AP ID included in each UE associated S1 signaling message may identify the association between the UE associated signaling and the SCTP connection used by such signaling.

These example embodiments may also be applied to the X2 interface. For the X2 interface, the S1 Configuration ID and S1 Signaling Bundle ID may be named X2 Configuration ID and X2 Signaling Bundle ID, while the UE IDs that may be used in replacement for the X2 Signaling Bundle ID are the MME UE X2AP ID and eNB UE X2AP ID. The embodiments for the X2 interface foresee, as per the S1 interface, that the X2 interface signaling may be distributed over multiple SCTP connections.

1.3 Adding, (Gracefully) Deleting, and Handling of Broken SCTP Association to Existing S1AP 1.3.1 Adding SCTP Association In case of method 1 for assigning S1 Signaling Bundle ID to the endpoints, the adding procedure applies when S1AP wants to add a new SCTP association. An example on sequence diagram for addition is shown in FIG. 14 (i.e., add SCTP association to existing S1AP for method 1).

Figure 14:
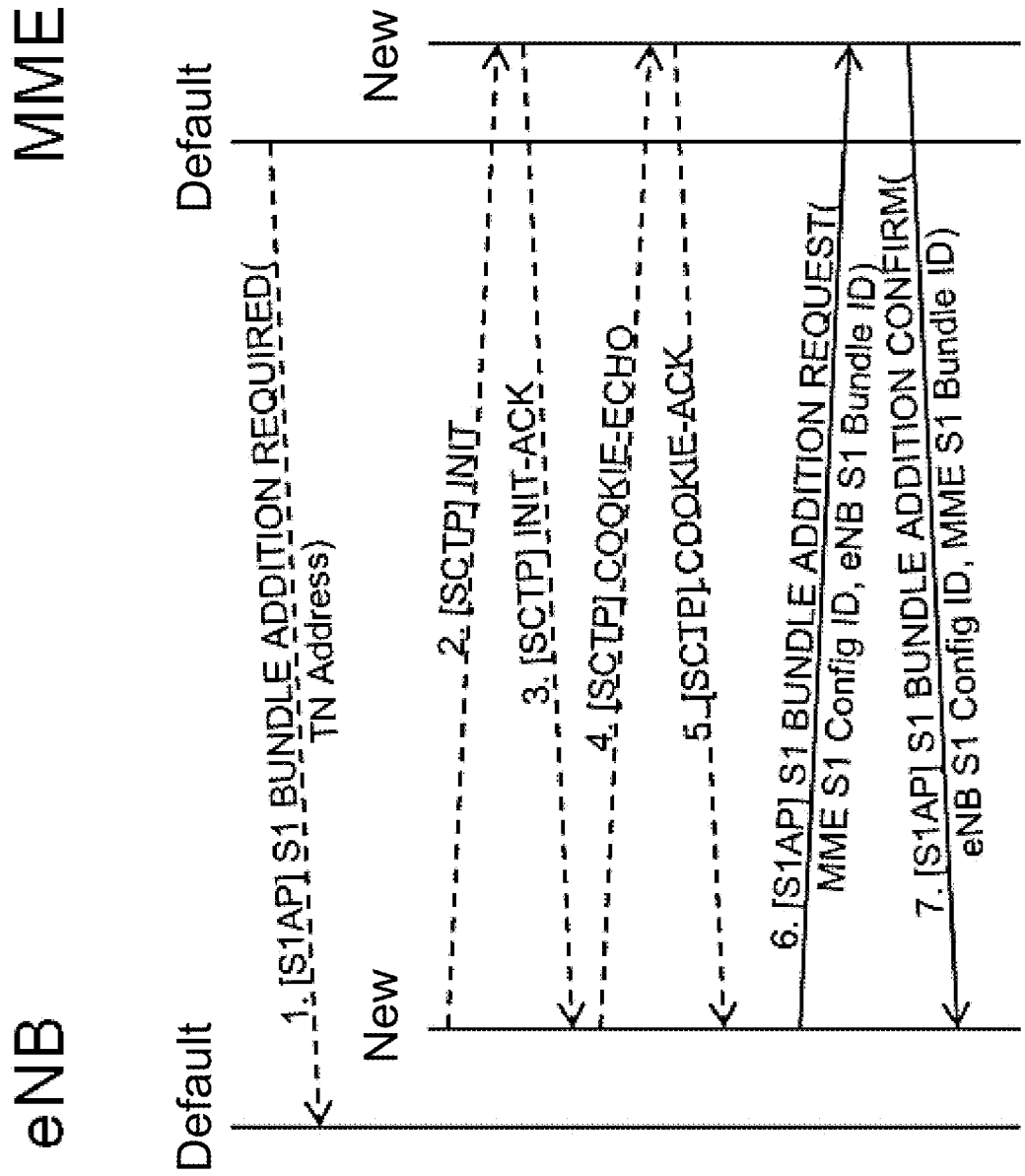
FIG. 14 is a signal diagram illustrating an example method for adding an SCTP association to an existing S1AP connection, in accordance with certain embodiments of the present disclosure.

In step 1 of FIG. 14, in case MME wants to add a SCTP association to S1AP, it transmits a non UE-associated S1AP message "S1 BUNDLE ADDITION REQUIRED" to eNB. An optional parameter "Transport Network (TN) address" may be added in the message if MME wants eNB to establish SCTP in a specific MME interface.

In steps 2-5 of FIG. 14, in case eNB wants to add a SCTP association to S1AP, or after receiving "S1 BUNDLE ADDITION REQUIRED" from MME, eNB will establish a new SCTP association towards MME according to current standard. The new SCTP association may be distinct from the existing SCTP associations by e.g., different eNB IP address, different eNB IP port, different MME IP address etc.

In step 6 of FIG. 14, after the new SCTP association has been established between eNB and MME, eNB will map this SCTP association to the corresponding S1AP instance, assign a new identity "eNB S1 Signaling Bundle ID" to the new SCTP association, and transmit a non UE-associated S1AP message S1 BUNDLE ADDITION REQUEST through this newly established SCTP association and on the stream dedicated for non UE-associated signaling. In this message, parameter "MME S1 Config ID" has been received from S1 SETUP procedure earlier and parameter "eNB S1 Signaling Bundle ID" is the new identity mentioned earlier in this step.

In step 7 of FIG. 14, after S1 BUNDLE ADDITION REQUEST has been received, MME will map the SCTP association with the correct S1AP instance according to parameter "MME S1 Config ID", store "eNB S1 Signaling Bundle ID" to the S1AP instance for identifying this new SCTP association, assign a new identity "MME S1 Signaling Bundle ID" to the new SCTP association, and transmit a non UE-associated S1AP message S1 BUNDLE ADDITION CONFIRM through this newly established SCTP association and on the stream dedicated for non UE-associated signaling. In this message, parameter "eNB S1 Configuration ID" has been received from S1 SETUP procedure earlier, and parameter "MME S1 Signaling Bundle ID" is the new identity mentioned earlier in this step.

After S1 BUNDLE ADDITION CONFIRM has been received, eNB will store "MME S1 Signaling Bundle ID" to the S1AP instance for identifying this new SCTP association. UE associated signaling may from now on be assigned to the streams in this new SCTP association.

Figure 15:
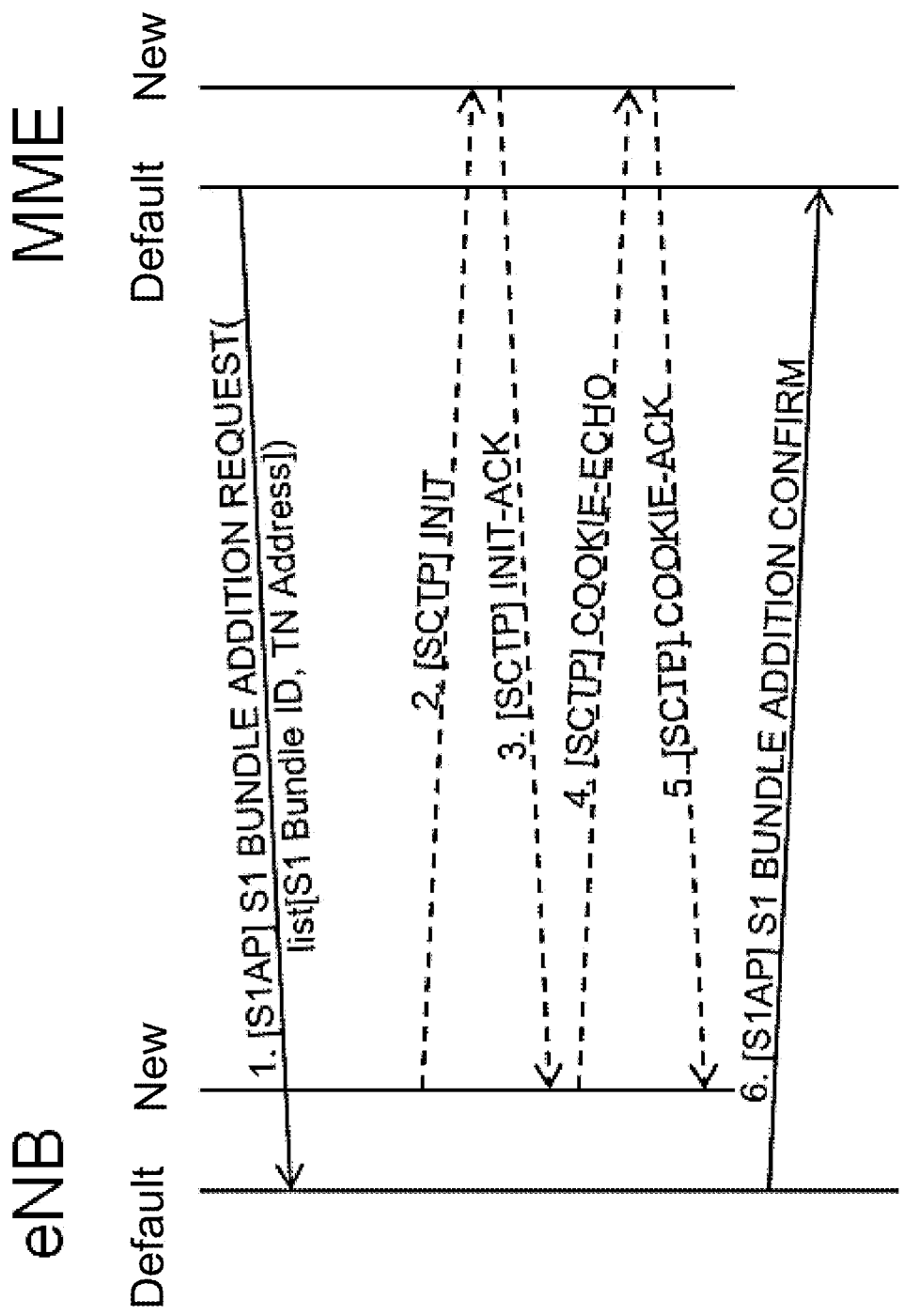
FIG. 15 is a signal diagram illustrating an example of an MME-initiated method for adding an SCTP association to an existing S1AP connection, in accordance with certain embodiments of the present disclosure.

In case of method 2 for assigning S1 Signaling Bundle ID to the endpoints, the adding procedure applies when additional bundle ID is needed besides those bundle IDs which are defined during S1 SETUP procedure. FIG. 15 shows the sequence diagram when this addition is initiated by MME (i.e., add SCTP association to existing S1AP for method 2, MME initiated).

In step 1 of FIG. 15, in case MME wants to add a SCTP association to S1AP, it transmits a non UE-associated S1AP message "S1 BUNDLE ADDITION REQUEST" to eNB. This message includes a list of S1 Signaling Bundle ID, which identifies the signaling bundle over the new SCTP associations to be established, an optional parameter "TN address" may be added for each element in the list if MME wants eNB to establish SCTP in a specific MME interface.

In steps 2-5 of FIG. 15, after receiving "S1 BUNDLE ADDITION REQUEST" from MME, eNB will establish new SCTP associations towards MME according to current standard. The new SCTP association may be distinct from the existing SCTP associations by e.g., different eNB IP address, different eNB IP port, different MME IP address etc. The SCTP associations establishment may be executed in parallel with step 6 below.

In step 6 of FIG. 15, after receiving "S1 BUNDLE ADDITION REQUEST" from MME, eNB will store the list of "S1 Signaling Bundle ID"s, and transmit a non UE-associated S1AP message S1 BUNDLE ADDITION CONFIRM.

Figure 16:
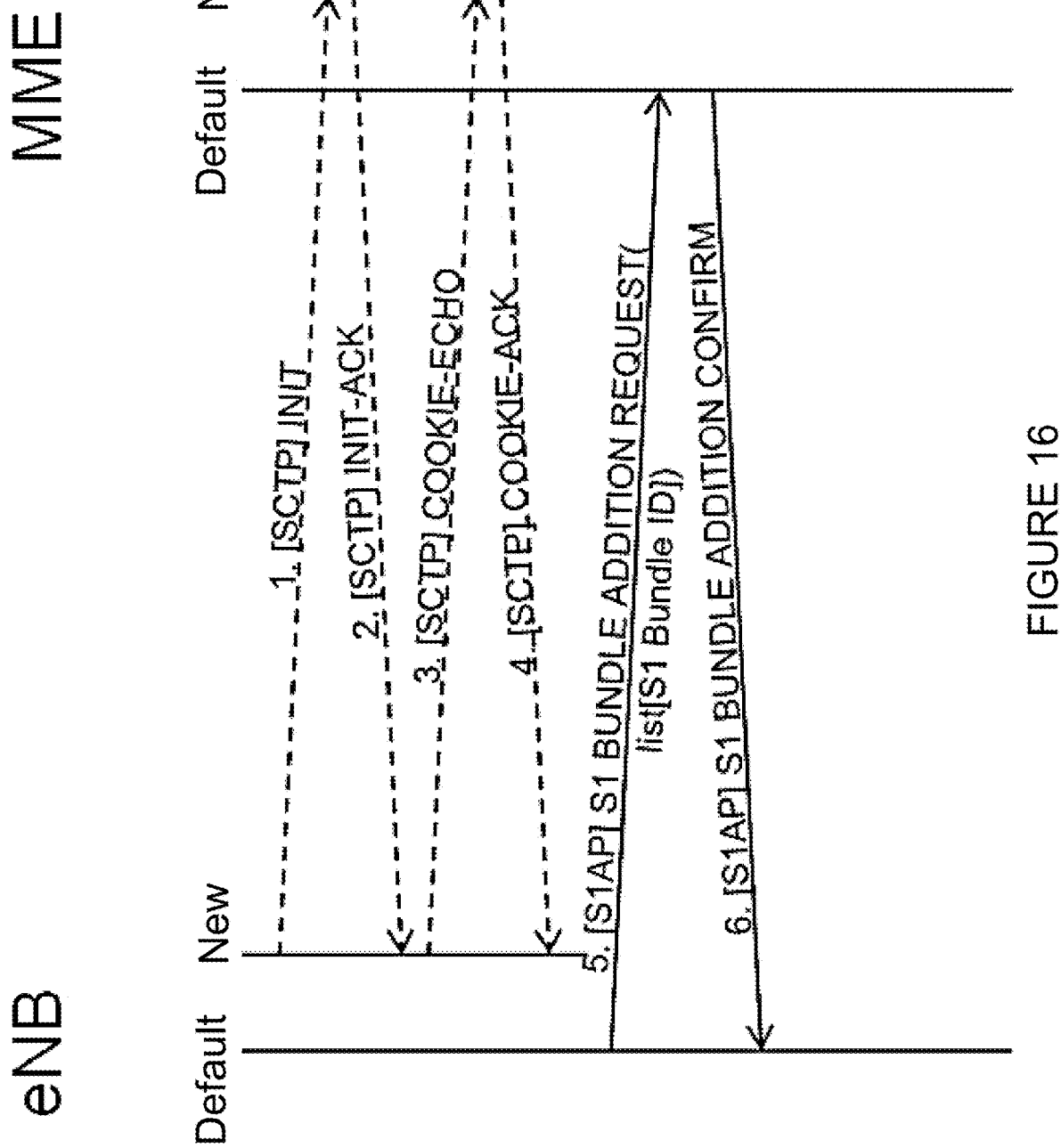
FIG. 16 is a signal diagram illustrating an example of an eNB-initiated method for adding an SCTP association to an existing S1AP connection, in accordance with certain embodiments of the present disclosure.

FIG. 16 shows the sequence diagram when this addition is initiated by eNB (i.e., add SCTP association to existing S1AP for method 2, eNB initiated).

In steps 1-4 of FIG. 16, eNB establishes new SCTP associations towards MME according to current standard. The new SCTP association may be distinct from the existing SCTP associations by e.g., different eNB IP address, different eNB IP port, different MME IP address etc. The SCTP associations establishment may be executed in parallel with step 5 below.

In step 5 of FIG. 16, in case eNB wants to add a SCTP association to S1AP, it may transmit a non UE-associated S1AP message "S1 BUNDLE ADDITION REQUEST" to MME. This message includes a list of S1 Signaling Bundle ID, which identifies the signaling bundle over the new SCTP associations to be established.

In step 6 of FIG. 16, after receiving "S1 BUNDLE ADDITION REQUEST" from eNB, MME will store the list of "S1 Signaling Bundle ID"s, and transmit a non UE-associated S1AP message S1 BUNDLE ADDITION CONFIRM.

For method 2l for assigning S1 Signaling Bundle ID to the endpoints, as part of this embodiment an S1 Signaling Bundle ID may be added to each S1 signaling message or to some of them. When a S1AP message is transmitted through any of the related SCTP association after S1 Setup procedure has been executed, this S1 Signaling Bundle ID will be used in order to identify the signaling bundle to which the message belongs, and which bundle ID this SCTP association is mapped to the S1AP. As part of the embodiment some or all S1 signaling messages may include also the S1 configuration ID, to identify the S1 signaling context to which the messages belong, and which S1AP the message carrying SCTP association belongs to.

For all examples for mapping of S1 signaling, and all methods for assigning S1 Signaling Bundle ID to the endpoints, the procedure above allows to add SCTP connections for the purpose of redistributing S1AP signaling traffic. The procedure may also be applied to the X2 interface.

1.3.2 (Gracefully) Deleting SCTP Association

Figure 17:
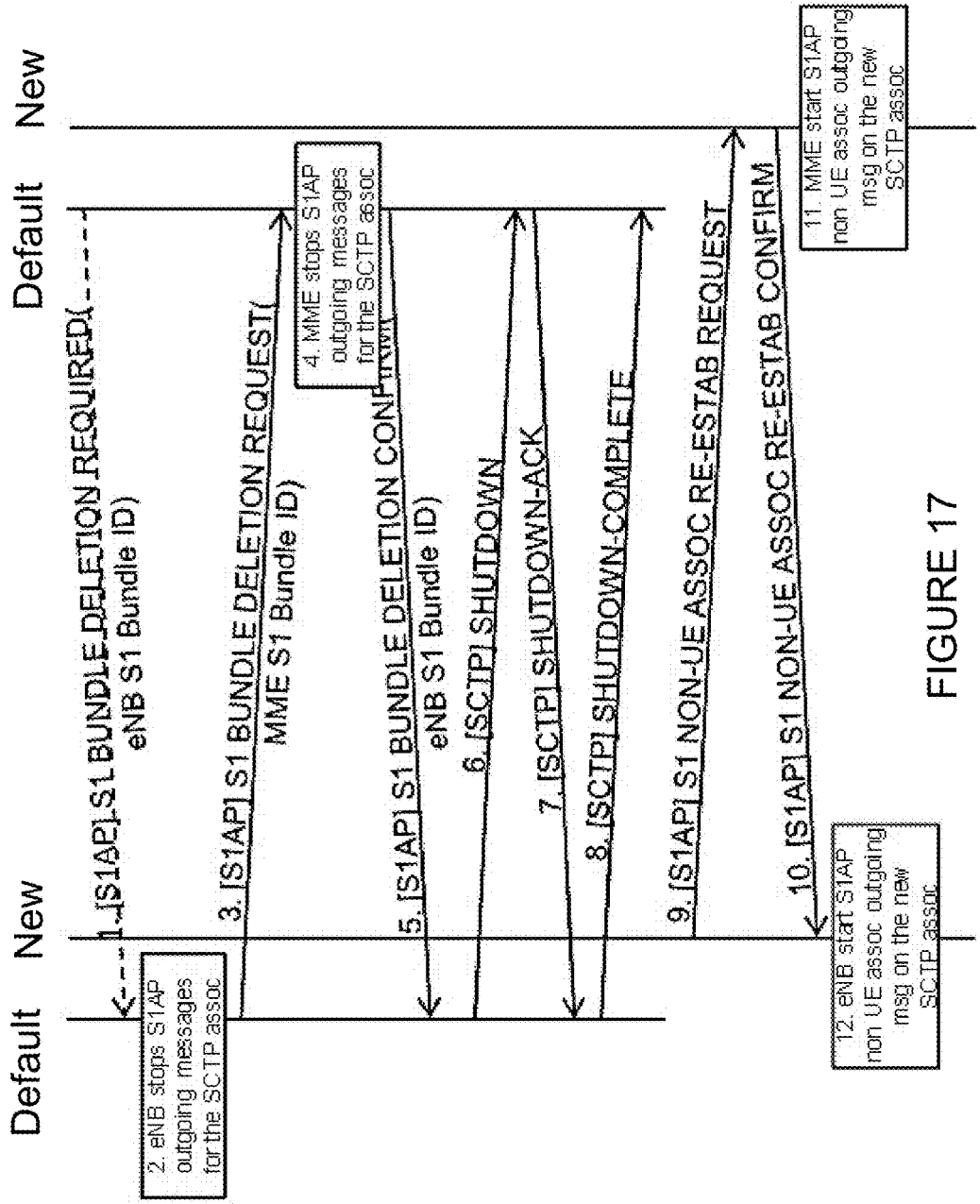
FIG. 17 is a signal diagram illustrating an example of a method for gracefully deleting an SCTP association carrying non-UE associated signaling from S1AP, in accordance with certain embodiments of the present disclosure.

In case of method 1 for assigning S1 Signaling Bundle ID to the endpoints, an example sequence diagram for graceful deletion of existing SCTP association which is carrying non UE-associated signaling from S1AP is shown in FIG. 17 (graceful deletion of SCTP association carrying non-UE associated signaling from S1AP for method 1).

In step 1 of FIG. 17, in case MME wants to delete an existing SCTP association from S1AP, it transmits a non UE-associated S1AP message "S1 BUNDLE DELETION REQUIRED" to eNB. This message may either be transmitted through the SCTP association which should be deleted (not shown in the figure), or through the SCTP association assigned for non UE-associated signaling (shown in the figure). In case of the latter case, an extra parameter "eNB S1 Signaling Bundle ID" is provided for pointing out which SCTP association should be deleted.

In step 2 of FIG. 17, in case eNB wants to delete a SCTP association from S1AP, or after receiving "S1 BUNDLE DELETION REQUIRED" from MME, eNB will stop all outgoing non UE-associated signaling and all outgoing UE-associated signaling if applicable, which are assigned to the deleting SCTP association by informing the higher layer.

In step 3 of FIG. 17, after all related outgoing signaling has been stopped from eNB, eNB will transmit "S1 BUNDLE DELETION REQUEST" to MME. This message may either be transmitted through the SCTP association which should be deleted (not shown in the figure), or through the SCTP association assigned for non UE-associated signaling (shown in the figure). In case of the latter case, an extra parameter "MME S1 Signaling Bundle ID" is needed for pointing out which SCTP association should be deleted.

In step 4 of FIG. 17, after receiving "S1 BUNDLE DELETION REQUEST" from eNB, MME will stop all outgoing non UE-associated signaling and all outgoing UE-associated signaling if applicable, which are assigned to the deleting SCTP association by informing the higher layer.

In step 5 of FIG. 17, after all related outgoing signaling has been stopped from MME, MME will transmit "S1 BUNDLE DELETION CONFIRM" to eNB. This message may either be transmitted through the SCTP association which should be deleted (not shown in the figure), or through the SCTP association assigned for non UE-associated signaling (shown in the figure). In case of the latter case, an extra parameter "eNB S1 Signaling Bundle ID" is needed for pointing out which SCTP association should be deleted.

In steps 6-8 of FIG. 17, after receiving "S1 BUNDLE DELETE CONFIRM" from MME, eNB will initiate SCTP closure of the SCTP association according to current standard. As all non UE-associated and eventually UE-associated connections have been stopped for the SCTP association, S1AP packet delivery can be guaranteed.

In step 9 of FIG. 17, after receiving SHUTDOWN-ACK from the deleting SCTP association, eNB will transmit message S1 NON UE-ASSOCIATED RE-ESTABLISH REQUEST to MME through one of the remaining SCTP association which eNB assigns it for non UE associated signaling.

In step 10 of FIG. 17, after receiving S1 NON UE-ASSOCIATED RE-ESTABLISH REQUEST, MME maps the non UE associated signaling to the SCTP association where the message come from, and transmit S1 NON UE-ASSOCIATED RE-ESTABLISH CONFIRM through the same SCTP association.

In step 11 of FIG. 17, after transmitting S1 NON UE-ASSOCIATED RE-ESTABLISH CONFIRM, MME informs higher layer that non UE-associated signaling may be resumed, and all the outgoing signals will be directed to the new SCTP association.

In step 12 of FIG. 17, after receiving S1 NON UE-ASSOCIATED RE-ESTABLISH CONFIRM, eNB informs higher layer that non UE-associated signaling may be resumed, and all the outgoing signals will be directed to the new SCTP association.

Figure 18:
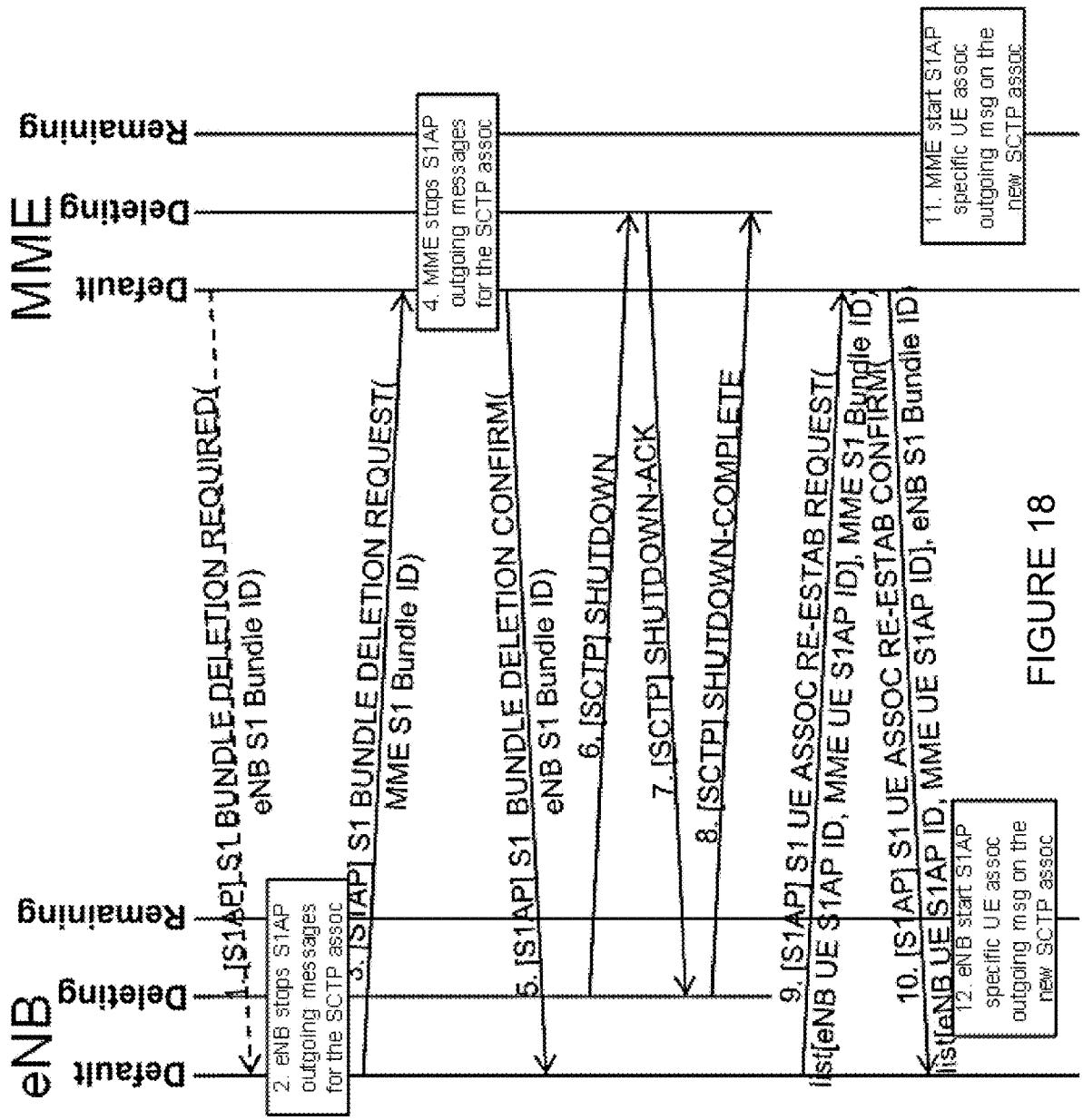
FIG. 18 is a signal diagram illustrating an example of a method for gracefully deleting an SCTP association carrying UE associated signaling from S1AP, in accordance with certain embodiments of the present disclosure.

An example sequence diagram for graceful deletion of existing SCTP association which is carrying UE-associated signaling from S1AP for method 1 is shown in FIG. 18 (graceful deletion of SCTP association carrying UE associated signaling from SlAP for method 1).

In step 1 of FIG. 18, In case MME wants to delete an existing SCTP association from S1AP, it transmits a non UE-associated S1AP message "S1 BUNDLE DELETION REQUIRED" to eNB. This message may either be transmitted through the SCTP association which should be deleted (not shown in the figure), or through the SCTP association assigned for non UE-associated signaling (shown in the figure). In case of the latter case, an extra parameter "eNB S1 Signaling Bundle ID" is provided for pointing out which SCTP association should be deleted.

In step 2 of FIG. 18, in case eNB wants to delete a SCTP association from S1AP, or after receiving "S1 BUNDLE DELETION REQUIRED" from MME, eNB will stop all outgoing UE-associated signaling and all outgoing non UE-associated signaling if applicable, which are assigned to the deleting SCTP association by informing the higher layer.

In step 3 of FIG. 18, after all related outgoing signaling has been stopped from eNB, eNB transmits "S1 BUNDLE DELETION REQUEST" to MME. This message may either be transmitted through the SCTP association which should be deleted (not shown in the figure), or through the SCTP association assigned for non UE-associated signaling (shown in the figure). In case of the latter case, an extra parameter "MME S1 Signaling Bundle ID" is provided for pointing out which SCTP association should be deleted.

In step 4 of FIG. 18, after receiving "S1 BUNDLE DELETION REQUEST" from eNB, MME stops all outgoing UE-associated signaling and all outgoing non UE-associated signaling if applicable, which are assigned to the deleting SCTP association by informing the higher layer.

In step 5 of FIG. 18, after all related outgoing signaling has been stopped from MME, MME transmits "S1 BUNDLE DELETION CONFIRM" to eNB. This message may either be transmitted through the SCTP association which should be deleted (not shown in the figure), or through the SCTP association assigned for non UE-associated signaling (shown in the figure). In case of the latter case, an extra parameter "eNB S1 Signaling Bundle ID" is provided for pointing out which SCTP association should be deleted.

In steps 6-8 of FIG. 18, after receiving "S1 BUNDLE DELETE CONFIRM" from MME, eNB initiates SCTP closure of the SCTP association according to current standard. As all non UE-associated and eventually UE-associated connections have been stopped for the SCTP association, S1AP packet delivery can be guaranteed.

In step 9 of FIG. 18, after receiving SHUTDOWN-ACK from the deleting SCTP association, and if there are any S1AP UE associated signaling was assigned to the deleted SCTP association, eNB maps the UE association to the remaining SCTP associations, and transmits message S1 UE-ASSOCIATED RE-ESTABLISH REQUEST to MME with the new mapping. This signal is transmitted with one of the follow alternatives:

a) (As shown in the figure) Through SCTP association assigned for non UE-associated signaling, in this case this message is a non UE-associated signal. Parameter consisting of mapping between eNB UE S1AP ID/MME UE S1AP ID and MME S1 Signaling Bundle ID is provided for each UE association. This signal may be sent per UE association, or for all UE associations which need re-establishment.

b) (Not shown in the figure) Through SCTP association where the UE associated signaling will be re-established as a non UE-associated signal. Parameter consisting of a list of eNB UE S1AP ID/MME UE S1AP ID is provided.

c) (Not shown in the figure) Through SCTP association where the UE associated signaling will be re-established as a UE-associated signal. Parameter consisting of eNB UE S1AP ID/MME UE S1AP ID is provided.

In step 10 of FIG. 18, after receiving S1 UE-ASSOCIATED RE-ESTABLISH REQUEST, MME maps the corresponding UE association to the new SCTP association, and transmits S1 UE-ASSOCIATED RE-ESTABLISH CONFIRM with the same alternative according to previous step.

In step 11 of FIG. 18, MME informs higher layer that the corresponding UE-associated signaling may be resumed, and all the outgoing signals will be directed to the new SCTP association.

In step 12 of FIG. 18, after receiving S1 UE-ASSOCIATED RE-ESTABLISH CONFIRM, eNB informs higher layer that the corresponding UE-associated signaling may be resumed, and all the outgoing signals will be directed to the new SCTP association.

Figure 19:
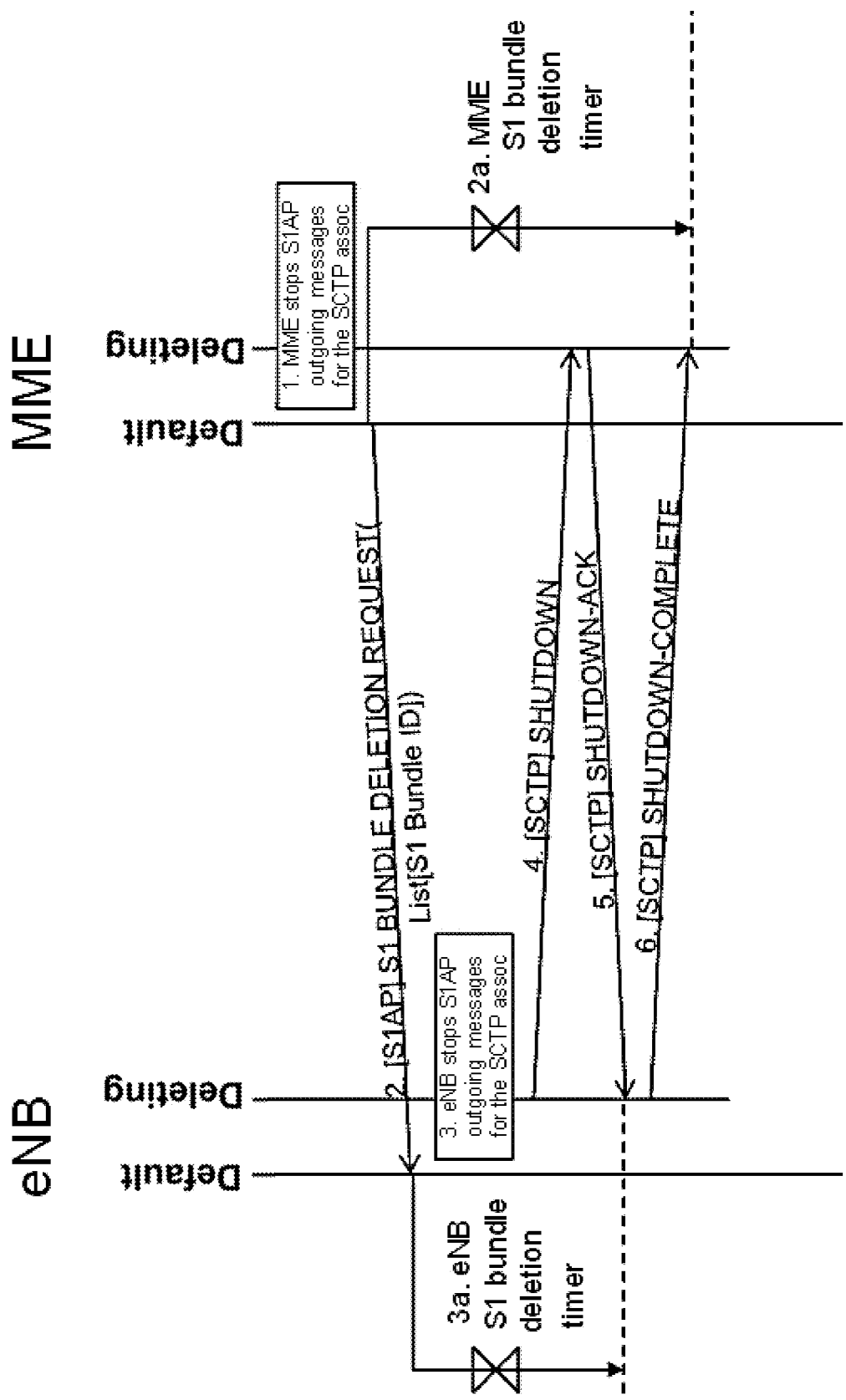
FIG. 19 is a signal diagram illustrating an example of an MME-initiated method for gracefully deleting an SCTP association from S1AP, in accordance with certain embodiments of the present disclosure.

In case of method 2 for assigning S1 Signaling Bundle ID to the endpoints, an example on sequence diagram for graceful deletion of existing SCTP association initiated by MME is shown in FIG. 19 (graceful deletion of SCTP association from S1AP initiated by MME for method 2).

In step 1 of FIG. 19, in case MME wants to delete one or several SCTP association from S1AP, MME stops all outgoing UE-associated signaling and all outgoing non UE-associated signaling, which are assigned to the deleting SCTP associations by informing the higher layer.

In step 2 of FIG. 19, after all related outgoing signaling has been stopped from MME, MME transmits "S1 BUNDLE DELETION REQUEST" to eNB through the SCTP association assigned for non UE-associated signaling with parameter consists of a list of "S1 Signaling Bundle ID" pointing out which SCTP associations should be deleted. MME will also start MME S1 Bundle deletion timer (2a).

In step 3 of FIG. 19, after receiving "S1 BUNDLE DELETION REQUEST" from MME, eNB stops all outgoing UE-associated signaling and all outgoing non UE-associated signaling, which are assigned to the deleting SCTP associations by informing the higher layer. eNB also starts eNB S1 Bundle deletion timer (3a).

In steps 4-6 of FIG. 19, after stopping all related S1AP signaling, eNB initiates SCTP closure of the SCTP association according to current standard. As all non UE-associated and eventually UE-associated connections have been stopped for the SCTP association, S1AP packet delivery can be guaranteed. When eNB receives SHUTDOWN-ACK it stops the eNB S1 Bundle deletion timer, and when MME receives SHUTDOWN-COMPLETE it stops the MME S1 Bundle deletion timer.

Figure 20:
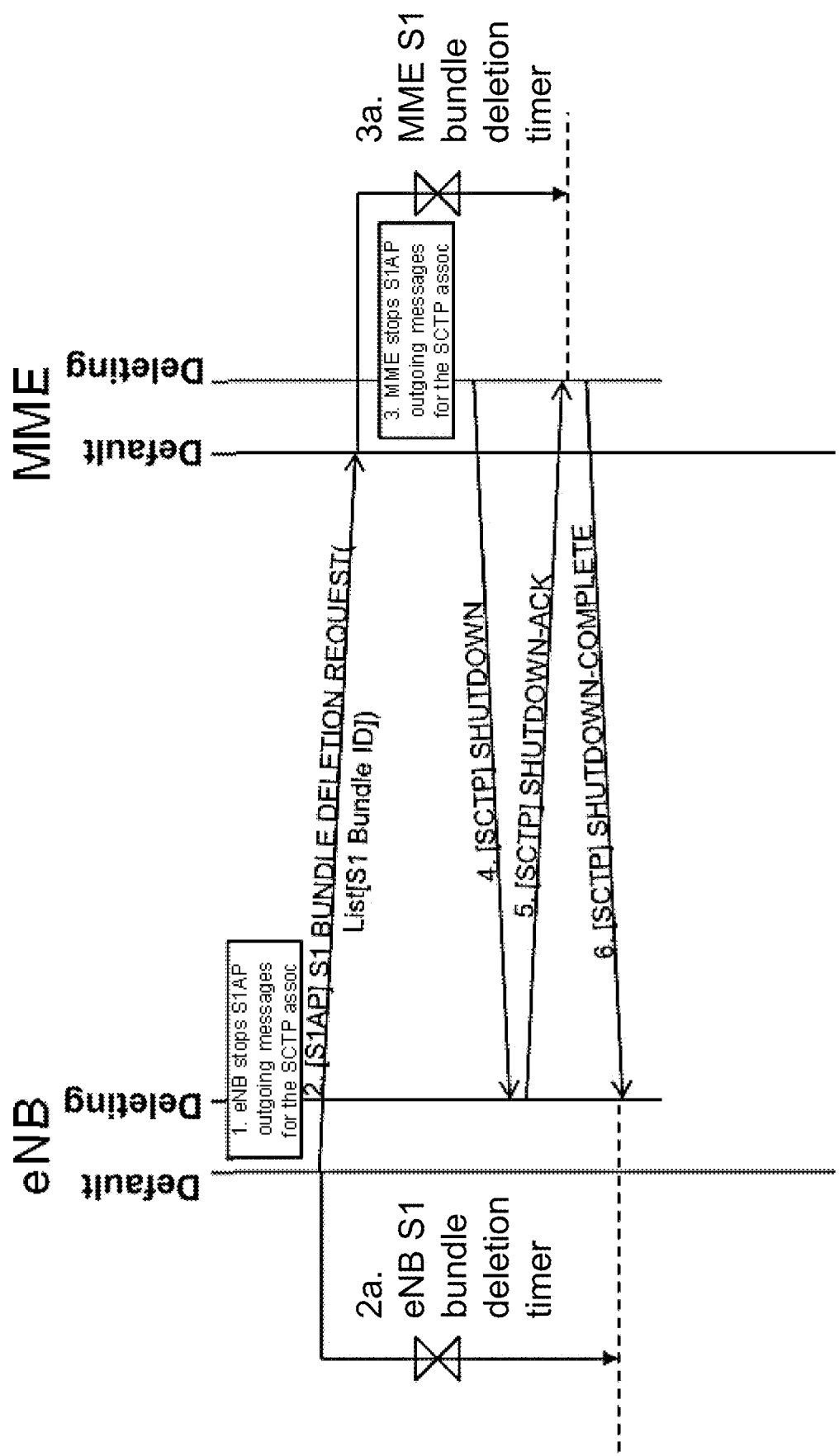
FIG. 20 is a signal diagram illustrating an example of an eNB-initiated method for gracefully deleting an SCTP association from S1AP, in accordance with certain embodiments of the present disclosure.

An example on sequence diagram for graceful deletion of existing SCTP association from S1AP initiated by eNB for method 2 is shown in FIG. 20 (graceful deletion of SCTP association from S1AP initiated by eNB for method 2).

In step 1 of FIG. 20, in case eNB wants to delete one or several SCTP association from S1AP, eNB stops all outgoing UE-associated signaling and all outgoing non UE-associated signaling, which are assigned to the deleting SCTP associations by informing the higher layer.

In step 2 of FIG. 20, after all related outgoing signaling has been stopped from eNB, eNB transmits "S1 BUNDLE DELETION REQUEST" to MME through the SCTP association assigned for non UE-associated signaling with parameter consists of a list of "S1 Signaling Bundle ID" pointing out which SCTP associations should be deleted. eNB will also start eNB S1 Bundle deletion timer (2a).

In step 3 of FIG. 20, after receiving "S1 BUNDLE DELETION REQUEST" from eNB, MME stops all outgoing UE-associated signaling and all outgoing non UE-associated signaling, which are assigned to the deleting SCTP associations by informing the higher layer. MME also starts MME S1 Bundle deletion timer (3a).

In steps 4-6 of FIG. 20, after stopping all related S1AP signaling, MME initiates SCTP closure of the SCTP association according to current standard. As all non UE-associated and eventually UE-associated connections have been stopped for the SCTP association, S1AP packet delivery can be guaranteed. When MME receives SHUTDOWN-ACK it stops the MME S1 Bundle deletion timer, and when eNB receives SHUTDOWN-COMPLETE it stops the eNB S1 Bundle deletion timer.

In case of method 2 for assigning S1 Signaling Bundle ID to the endpoints, mapping to new SCTP connections of procedures for which the SCTP connection has been removed is achieved by simply triggering such procedures and adding to the procedures messages the S1 Connection Bundle ID, and optionally, the S1 Configuration ID. This mechanism allows the receiving node to understand that signaling for the affected procedure shall be mapped to the SCTP connection corresponding to the S1 Connection Bundle ID flagged. Also, the receiver may deduce that mapping of non-UE associated signaling procedures to a specific SCTP connection, or mapping of UE associated signaling for a specific UE to a given SCTP connection, by analyzing the S1 Connection Bundle ID of the first signaling message received (of the UE associated or non UE associated nature) and based on the analysis, may assume that remaining signaling will be sent over the identified SCTP connection.

1.3.3 Handling of Broken SCTP Association

Figure 21:
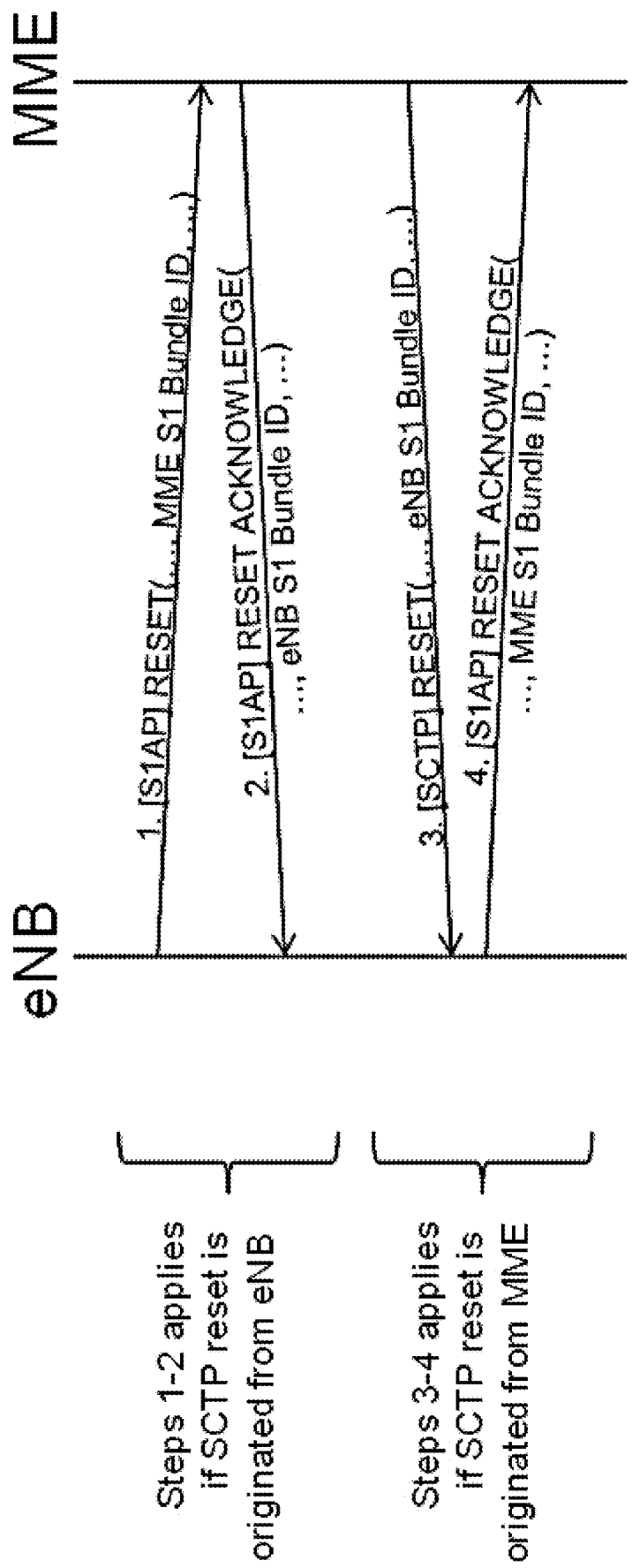
FIG. 21 is a signal diagram illustrating an example of a method for broken SCTP association handling to existing S1AP, in accordance with certain embodiments of the present disclosure.

An example of a sequence diagram for handling of broken SCTP association where non UE-associated signaling is not assigned is shown in FIG. 21 (broken SCTP association handling to existing S1AP). FIG. 21 shows an example modification of existing RESET and RESET ACKNOWLEDGE, by adding "MME S1 Signaling Bundle ID", "eNB S1 Signaling Bundle ID" parameters to the messages. In an alternative example modification, of existing RESET, the parameters S1 Connection Bundle ID and optionally the S1 Context ID (not shown in the figure) are added to the messages.

In case of an endpoint which detects the SCTP association is broken, this endpoint should transmit RESET with parameter "<xx> S1 Signaling Bundle ID" to the destination endpoint, where <xx> is the name of the destination endpoint (shown in the figure). Alternatively, the endpoint may transmit RESET with parameter S1 Connection Bundle ID and optionally the S1 Context ID (not shown in the figure).

After receiving RESET, the destination endpoint shall reply with RESET ACKNOWLEDGE with parameter "<yy> S1 Signaling Bundle ID", where <yy> is the name of the originating endpoint (shown in the figure). Alternatively, the endpoint should transmit RESET with parameter S1 Connection Bundle ID and optionally the S1 Context ID (not shown in the figure).

All of the UE associations mapped to the broken SCTP association shall be reset and handled as the current standard.

If the broken SCTP association is assigned for non UE-associated signaling, the entire S1AP shall be reset according to current standard.

2 Moving S1AP Signaling Connection Between SCTP Associations

The above-described solutions allow for establishing multiple SCTP associations on S1AP. Once multiple SCTP associations have been established, S1AP signaling connections can be moved between SCTP associations.

In a first example embodiment, eNB is always used as the initiating endpoint, and explicitly provides the destination SCTP association identity (S1 connection bundle ID) during the moving procedure.

In a second example embodiment, both eNB and MME may be used as the initiating endpoint, and implicitly provides the destination identity during the moving procedure.

Examples of methods for moving non-UE associated signaling and UE-associated signaling are described separately below.

Figure 22:
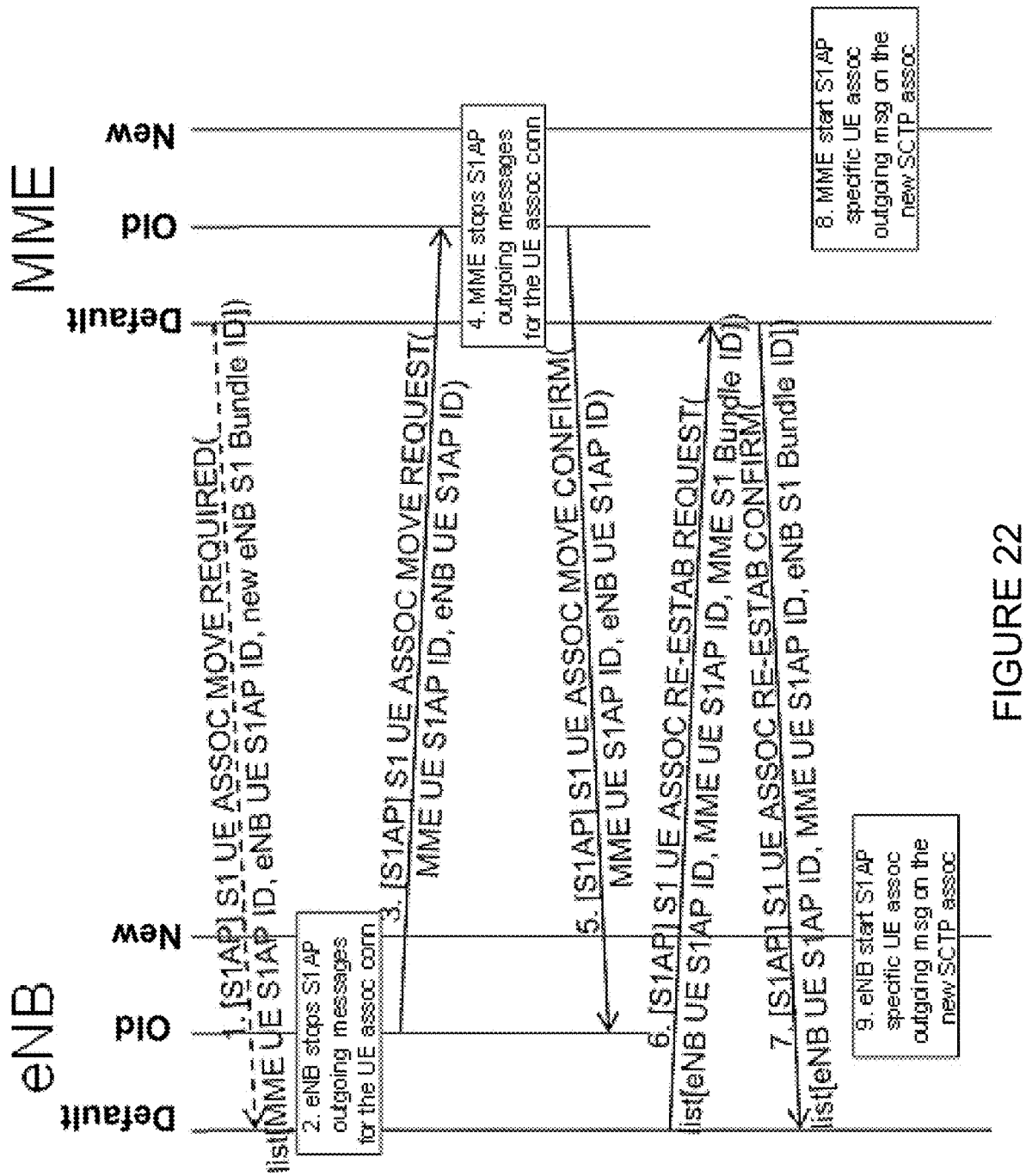
FIG. 22 is a signal diagram illustrating an example of a method for moving multiple UE-associated signaling connections between SCTP associations (successful case), in accordance with certain embodiments of the present disclosure.

2.1 Moving UE-Associated Signaling Between SCTP Associations, Successful Case, First Embodiment A sequence diagram on how multiple UE-associated signaling connections are successfully moved between SCTP associations is shown in FIG. 22 (move multiple UE-associated signaling connections between SCTP associations, first embodiment, successful case).

In step 1 of FIG. 22, in case MME wants to move existing UE-associated signaling connections to another SCTP association, it may transmit an UE-associated S1AP message "S1 UE-ASSOCIATED MOVE REQUIRED" to eNB, with a list of "MME UE S1AP ID", "eNB UE S1AP ID" as parameter for identifying the UE-associated signaling connections, for each element in the list, optional "eNB S1 connection bundle ID" may be added for identifying which SCTP association each individual UE-associated signaling connection is moving to.

In step 2 of FIG. 22, in case eNB wants to move existing UE-associated signaling connections to another SCTP association, or after receiving "S1 UE-ASSOCIATED MOVE REQUIRED" from MME, eNB stops all outgoing signaling from each UE-associated signaling connection by informing the higher layer. It is possible that the eNB may deliver S1AP messages that were pending transmission, buffered on SCTP layer or below, before the decision to move the signaling connection to a different SCTP instance was taken.

In step 3 of FIG. 22, after all related outgoing signaling has been stopped from eNB, for each individual UE-associated signaling connection, eNB transmits a UE-associated signal "S1 UE-ASSOCIATED MOVE REQUEST" to MME. This message has the role of a "stop marker", indicates the last message from eNB transmitted on the old SCTP association for the specific UE-associated signaling connection identified by eNB S1AP ID and MME S1AP ID, before move. As this "stop marker" signal is transmitted after all pending S1AP messages, this "stop marker" message will be the last message received by the destination before the outgoing messages is stopped for the signaling connection.

In step 4 of FIG. 22, after receiving "S1 UE-ASSOCIATED MOVE REQUEST" from eNB, MME stops all outgoing signaling from each UE-associated signaling connections by informing the higher layer. It is possible that the MME may deliver S1AP messages that were pending transmission, buffered on SCTP layer or below, before the decision to move the signaling connection to a different SCTP instance was taken.

In step 5 of FIG. 22, after all related outgoing signaling has been stopped from MME, for each individual UE-associated signaling connection, MME transmits UE-associated signal "S1 UE-ASSOCIATED MOVE CONFIRM" to eNB. This message has the role of a "stop marker", indicates the last message from MME transmitted on the old SCTP association for the specific UE-associated signaling connection identified by eNB S1AP ID and MME S1AP ID, before move. As this "stop marker" signal is transmitted after all pending S1AP messages, this "stop marker" message will be the last message received by the destination before the outgoing messages is stopped for the signaling connection.

In step 6 of FIG. 22, after receiving S1 UE-ASSOCIATED MOVE CONFIRM over the old SCTP association from all the involving UE-associated signaling connections, eNB maps each UE-associated signaling connection to a new SCTP association either decided by eNB or by MME via parameter "eNB S1 connection bundle ID" from step 1 if applicable, and transmit message S1 UE-ASSOCIATED RE-ESTABLISH REQUEST to MME with the new mapping. This signal has a role of "start marker" and may be transmitted with one of the follow alternatives:

a) Transmits as non UE-associated signal(s) through the default SCTP association assigned for non UE-associated signaling. Mapping between eNB UE S1AP ID/MME UE S1AP ID and MME S1 Signaling Bundle ID is needed for each UE-associated signaling connection. This signal may be sent per UE-associated signaling, or for all UE-associated signalings which need re-establishment.

b) Transmits as non UE-associated signal(s) through each SCTP associations where the UE associated signaling connections will be re-established. This signal may be sent per UE-associated signaling, or for all UE-associated signalings which need re-establishment Parameter of the signal(s) consists of (a list of) eNB UE S1AP ID/MME UE S1AP ID and S1 Signaling bundle ID.

c) Transmits as an UE-associated signal for each UE-associated signaling connection through the SCTP association where the UE associated signaling connection will be re-established. Parameter consists of eNB UE S1AP ID/MME UE S1AP ID.

For purposes of example, FIG. 22 shows alternative (a) of step 6, while alternatives (b) and (c) are not shown in the figure. However, alternative (b) or (c) could be used in other embodiments.

In step 7 of FIG. 22, after receiving S1 UE-ASSOCIATED RE-ESTABLISH REQUEST, MME maps the corresponding UE-associated signaling connections to the new SCTP association, and transmit S1 UE-ASSOCIATED RE-ESTABLISH CONFIRM with the same alternative according to previous step.

In step 8 of FIG. 22, MME informs higher layer that the corresponding UE-associated signaling connections may be resumed, and all the outgoing signals will be directed to the new SCTP association.

In step 9 of FIG. 22, after receiving S1 UE-ASSOCIATED RE-ESTABLISH CONFIRM, eNB informs higher layer that the corresponding UE-associated signaling connections may be resumed, and all the outgoing signals will be directed to the new SCTP association.

2.2 Successful Case, Second Embodiment

Figure 23:
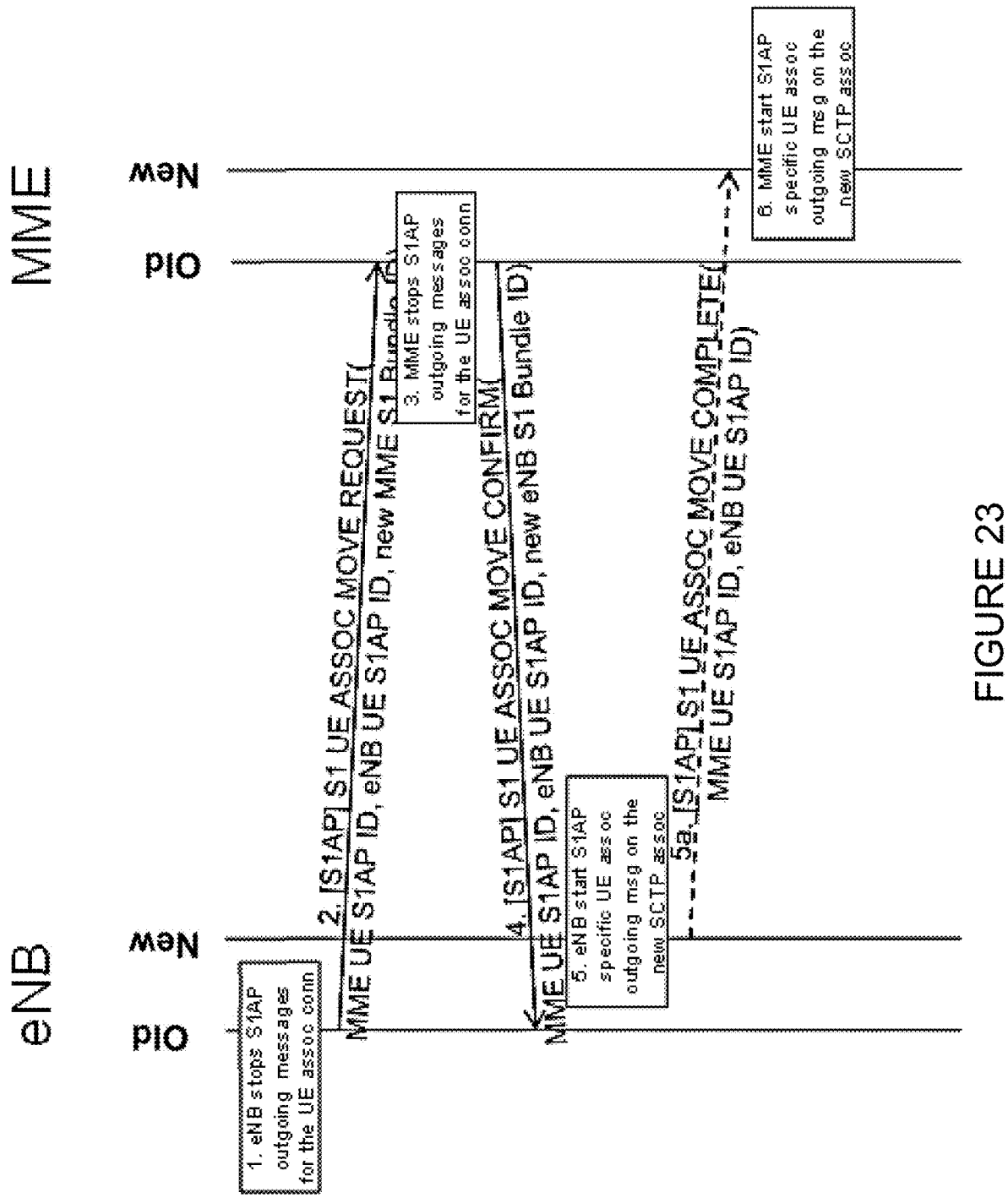
FIG. 23 is a signal diagram illustrating an example of an eNB-initiated method for moving a single UE-associated signaling connection between SCTP associations (successful case), in accordance with certain embodiments of the present disclosure.
Figure 24:
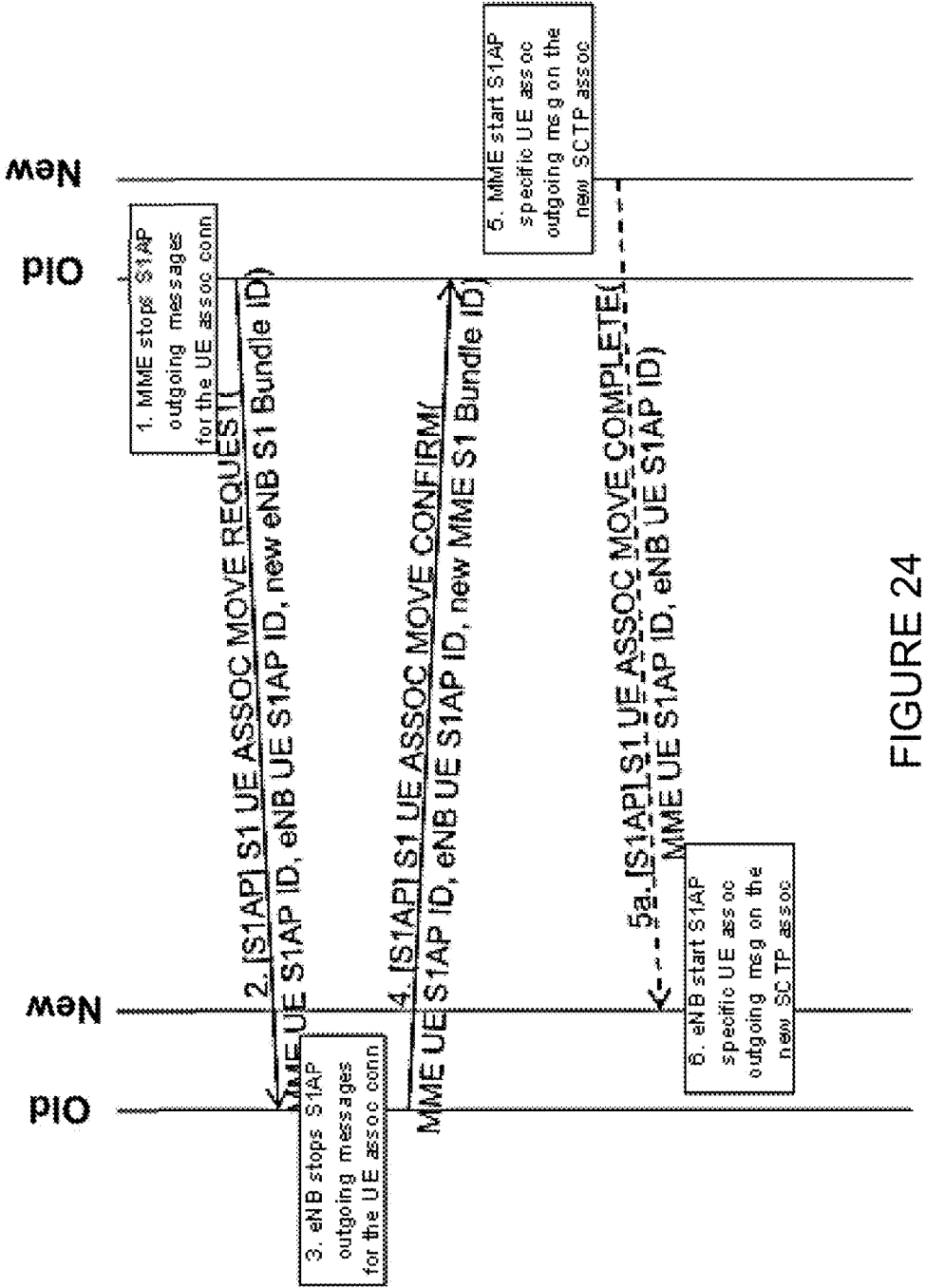
FIG. 24 is a signal diagram illustrating an example of an MME-initiated method for moving a single UE-associated signaling connection between SCTP associations (successful case), in accordance with certain embodiments of the present disclosure.

Sequence diagrams on how a single UE-associated signaling connection is successfully moved between SCTP associations are shown in FIG. 23 (eNB initiated) and FIG. 24 (MME initiated). That is, FIG. 23 illustrates moving a single UE-associated signaling connection between SCTP associations (second embodiment, successful case, eNB initiated), and FIG. 24 illustrates moving a single UE-associated signaling connection between SCTP associations (second embodiment, successful case, MME initiated).

The below description is valid for both the eNB-initiated case (FIG. 23) and MME-initiated case (FIG. 24).

In step 1, if the originating node wants to move an existing UE-associated signaling connection to another SCTP association, it stops all outgoing signaling from the UE-associated signaling connection by informing the higher layer. It is possible that the originating node may deliver S1AP messages that were pending transmission, buffered on SCTP layer or below, before the decision to move the signaling connection to a different SCTP instance was taken.

In step 2, after all related outgoing signaling has been stopped from the originating node, it transmits a UE-associated signal "S1 UE-ASSOCIATED MOVE REQUEST" through the old SCTP association to the destination node. This message has the role of a "stop marker", indicates the last message from the originating node transmitted on the old SCTP association for the specific UE-associated signaling connection identified by eNB S1AP ID and MME S1AP ID, before move. This stop marker also provides new "S1 connection bundle ID" informing to which SCTP association this connection shall be moved to. As this "stop marker" signal is transmitted after all pending S1AP messages, this "stop marker" message will be the last message received by the destination node before the outgoing messages is stopped for the signaling connection.

In step 3, after receiving "S1 UE-ASSOCIATED MOVE REQUEST" from the originating node, the destination node stops all outgoing signaling from the UE-associated signaling connections by informing the higher layer. It is possible that the destination node may deliver S1AP messages that were pending transmission, buffered on SCTP layer or below, before the decision to move the signaling connection to a different SCTP instance was taken.

In step 4, after all related outgoing signaling has been stopped from destination node, it transmits UE-associated signal "S1 UE-ASSOCIATED MOVE CONFIRM" through the old SCTP association to the originating node. This message has the role of a "stop marker", indicates the last message from MME transmitted on the old SCTP association for the specific UE-associated signaling connection identified by eNB S1AP ID and MME S1AP ID, before move. As this "stop marker" signal is transmitted after all pending S1AP messages, this "stop marker" message will be the last message received by the originating node before the outgoing messages is stopped for the signaling connection.

In step 5, after receiving S1 UE-ASSOCIATED MOVE CONFIRM, the originating node will inform higher layer that the corresponding UE-associated signaling connection may be resumed, and all the outgoing signals will be directed to the new SCTP association. The first UE-associated message over the new SCTP connection has a role of "start marker" for the S1AP signaling connection.

In step 5a, in case there is no immediate UE-associated message from higher layer, the originating node transmits S1 UE-ASSOCIATED MOVE COMPLETE, with parameters eNB S1AP ID and MME S1AP ID, through the new SCTP association as the "start marker" (5a).

In step 6, after receiving a first UE-associated message or S1 UE-ASSOCIATED MOVE COMPLETE from the new SCTP association, the destination node informs higher layer that the corresponding UE-associated signaling connections may be resumed, and all the outgoing signals will be directed to the new SCTP association.

An alternative procedure for decreasing the delay of moving is:

For the destination node, after transmitting UE-associated signal "S1 UE-ASSOCIATED MOVE CONFIRM" through the old SCTP association (step 4), it will directly inform higher layer that the corresponding UE-associated signaling connection may be resumed (step 6), and all the outgoing signals will be directed to the new SCTP association.

For the originating node, after transmitting UE-associated signal "S1 UE-ASSOCIATED MOVE REQUEST" through the old SCTP association to the destination node (step 2), if the originating node receives new messages from the destination node through the new SCTP association, it will not forward these new messages to higher layer until "S1 UE-ASSOCIATED MOVE CONFIRM" is received from the old SCTP association (step 4). Also in this procedure eventual transmission of (step 5a) S1 UE-ASSOCIATED MOVE COMPLETE is omitted.

2.3 Error Case, All Embodiments

Figure 25:
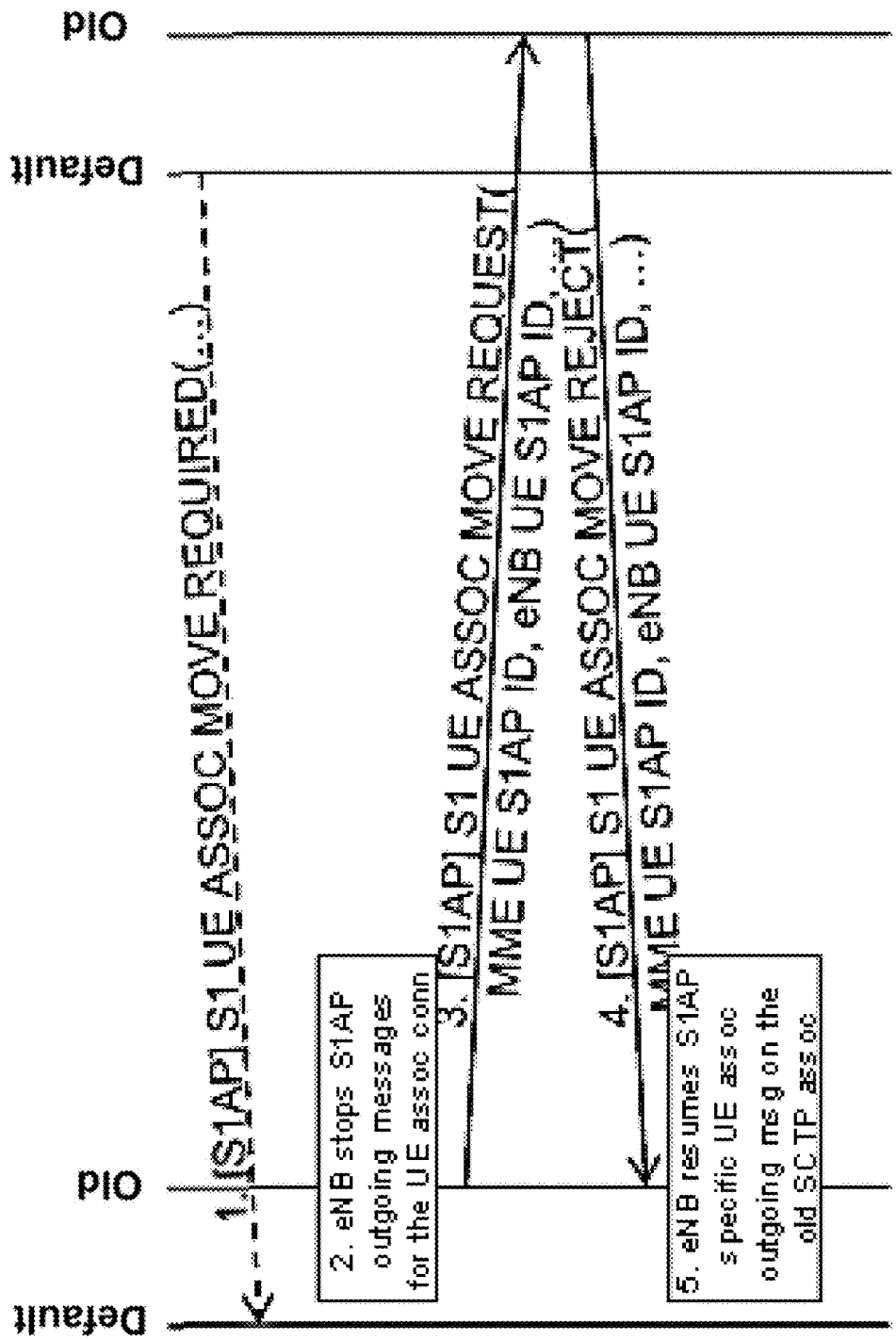
FIG. 25 is a signal diagram illustrating an example of a method for moving a single UE-associated signaling connection between SCTP associations (failure case), in accordance with certain embodiments of the present disclosure.

FIG. 25 shows an example of error case that can be used for both of the above-described embodiments. In particular, FIG. 25 illustrates moving a single UE-associated signaling between SCTP associations (failure case). Steps 1-3 are the same as discussed above with respect to the successful case (step 1 is omitted in the case of embodiment 2). In step 4, if error occurs for some reason, e.g. invalid MME S1 connection bundle ID, MME will transmit "S1 UE ASSOCIATED MOVE REJECT" to eNB, informing that the move is aborted. In step 5, after receiving "S1 UE ASSOCIATED MOVE REJECT", eNB will inform higher layer that the corresponding UE-associated signaling may be resumed, and all the outgoing signals will continue through the original SCTP association.

Figure 26:
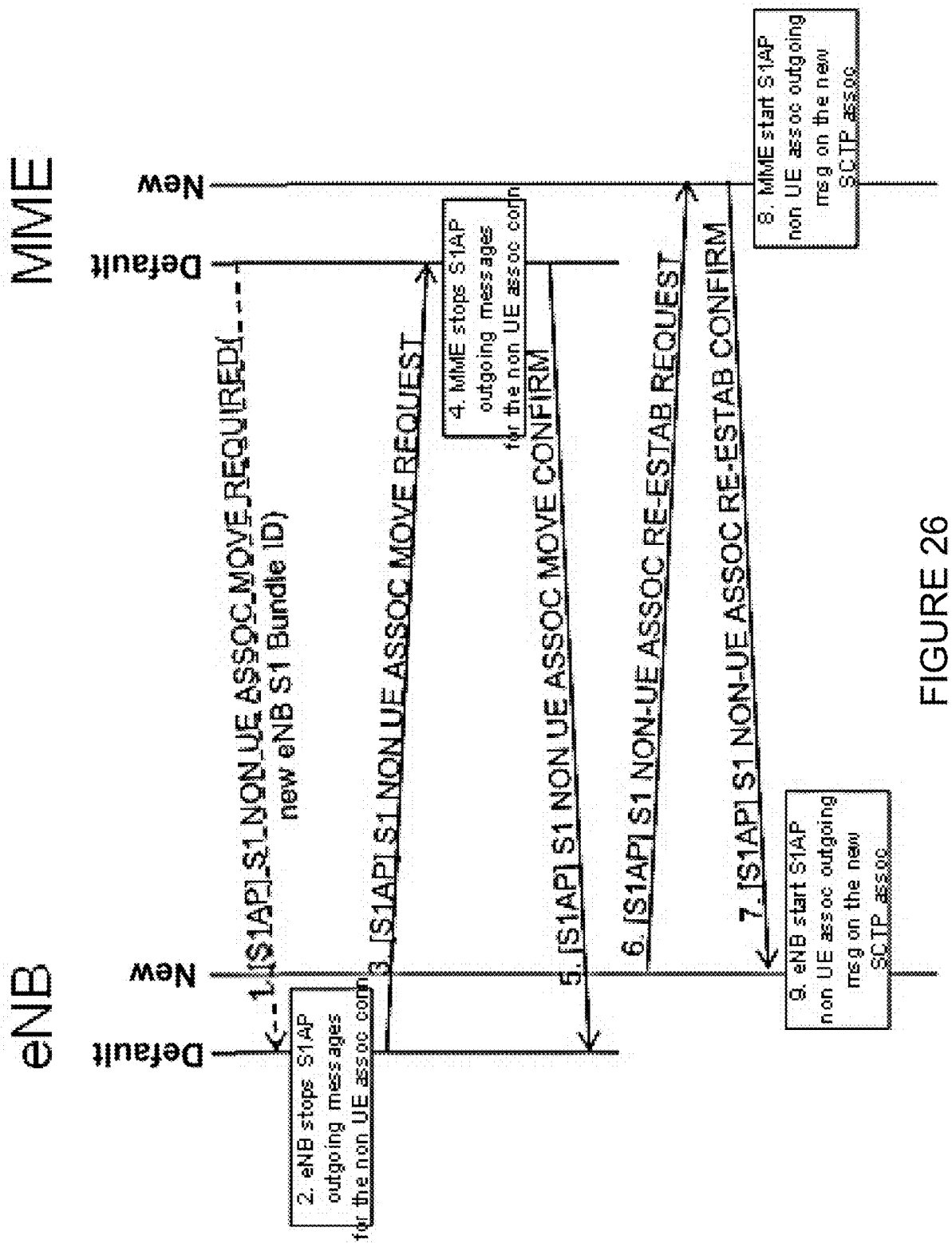
FIG. 26 is a signal diagram illustrating an example of a method for moving a non-UE associated signaling connection between SCTP associations (successful case), in accordance with certain embodiments of the present disclosure.

2.4 Moving Non UE-Associated Signaling Between SCTP Associations, Successful Case, First Embodiment A sequence diagram on how non UE-associated signaling is successfully moved between SCTP associations is shown in FIG. 26 (moving non UE-associated signaling between SCTP associations, successful case, first embodiment).

In step 1 of FIG. 26, in case MME wants to move the non UE-associated signaling to another SCTP association, it transmits a non UE-associated S1AP message "S1 NON UE-ASSOCIATED MOVE REQUIRED" to eNB, with parameter "new eNB S1 Signaling Bundle ID" identifies the SCTP association the non UE-associated signaling is moving to.

In step 2 of FIG. 26, in case eNB wants to move the non UE-associated signaling to another SCTP association, or after receiving "S1 NON UE-ASSOCIATED MOVE REQUIRED" from MME, eNB stops all outgoing signaling from the non UE-associated signaling connection by informing the higher layer. It is possible that the eNB may deliver S1AP messages that were pending transmission, buffered on SCTP layer or below, before the decision to move the signaling connection to a different SCTP instance was taken.

In step 3 of FIG. 26, after all related outgoing signaling has been stopped from eNB, eNB transmits a non UE-associated signal "S1 NON UE-ASSOCIATED MOVE REQUEST" to MME. This message has the role of a "stop marker", indicates the last message from eNB transmitted on the old SCTP association before move. As this "stop marker" signal is transmitted after all pending S1AP messages, this "stop marker" message will be the last message received by the destination before the outgoing messages is stopped for the signaling connection.

In step 4 of FIG. 26, after receiving "S1 NON UE-ASSOCIATED MOVE REQUEST" from eNB, MME stops all outgoing signaling from the non UE-associated signaling connection by informing the higher layer. It is however possible that the MME may deliver S1AP messages that were pending transmission before the decision to move the signaling connection to a different SCTP instance was taken.

In step 5 of FIG. 26, after all related outgoing signaling has been stopped from MME, MME transmits non UE-associated signal "S1 NON UE-ASSOCIATED MOVE CONFIRM" to eNB. This message has the role of a "stop marker", indicates the last message from MME transmitted on the old SCTP association before move. As this "stop marker" signal is transmitted after all pending S1AP messages, this "stop marker" message will be the last message received by the destination before the outgoing messages is stopped for the signaling connection.

In step 6 of FIG. 26, after receiving S1 NON UE-ASSOCIATED MOVE CONFIRM over the old SCTP association, eNB maps the non UE-associated signaling connection to a new SCTP association either decided by eNB or by MME via parameter "eNB S1 connection bundle ID" from step 1 if applicable, and transmit message S1 NON UE-ASSOCIATED RE-ESTABLISH REQUEST to MME through the new SCTP association. This signal has a role of "start marker" for the non UE-associated signaling connection.

In step 7 of FIG. 26, after receiving S1 NON UE-ASSOCIATED RE-ESTABLISH REQUEST, MME maps the non UE-associated signaling connection to the new SCTP association, and transmits S1 NON UE-ASSOCIATED RE-ESTABLISH CONFIRM through the new SCTP association.

In step 8 of FIG. 26, MME informs higher layer that the non UE-associated signaling connection may be resumed, and all the outgoing signals will be directed to the new SCTP association.

In step 9 of FIG. 26, after receiving S1 NON UE-ASSOCIATED RE-ESTABLISH CONFIRM, eNB informs higher layer that the non UE-associated signaling connection may be resumed, and all the outgoing signals will be directed to the new SCTP association.

2.5 Successful Case, Second Embodiment

Figure 27:
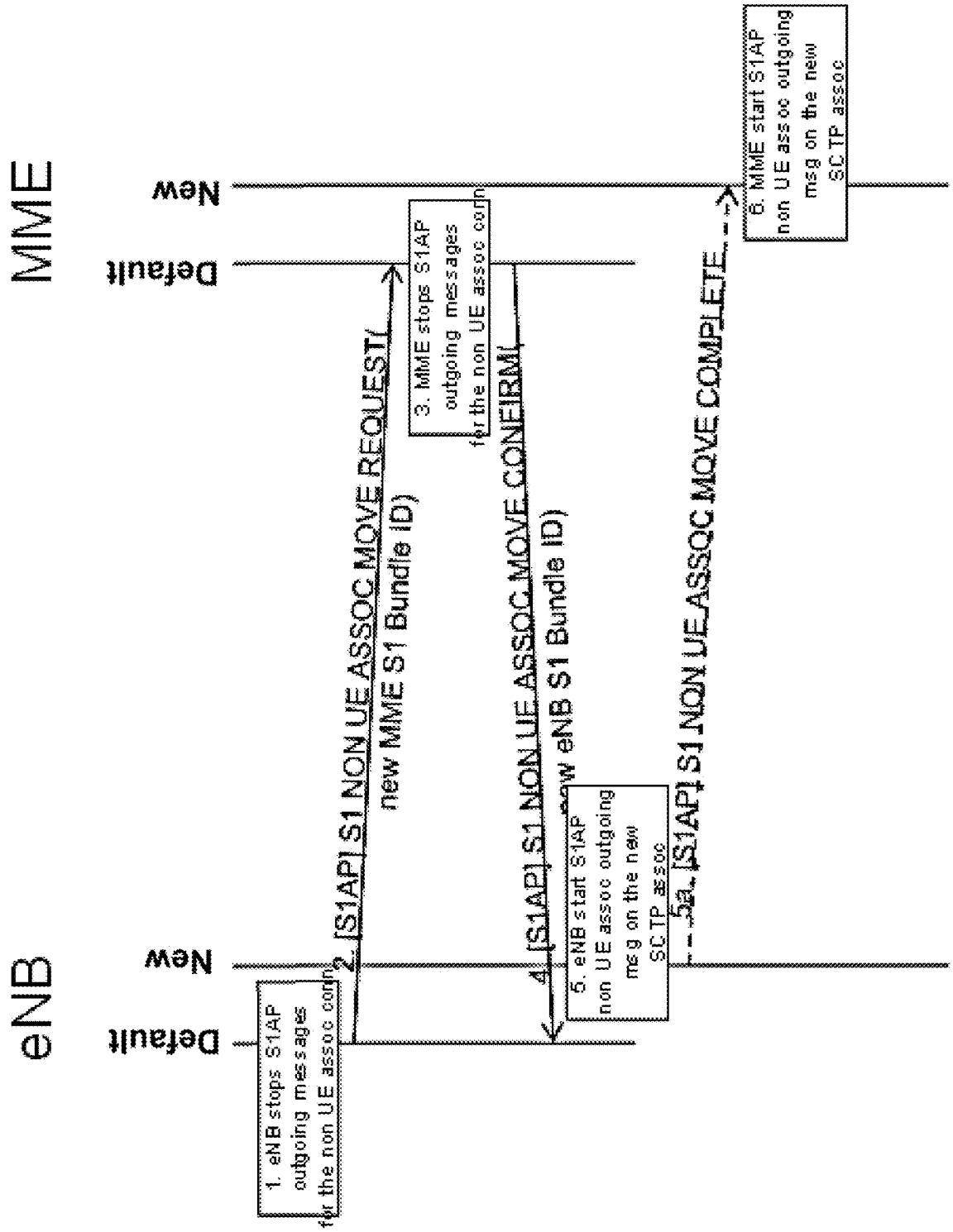
FIG. 27 is a signal diagram illustrating an example of an eNB-initiated method for moving a non-UE associated signaling connection between SCTP associations (successful case), in accordance with certain embodiments of the present disclosure.
Figure 28:
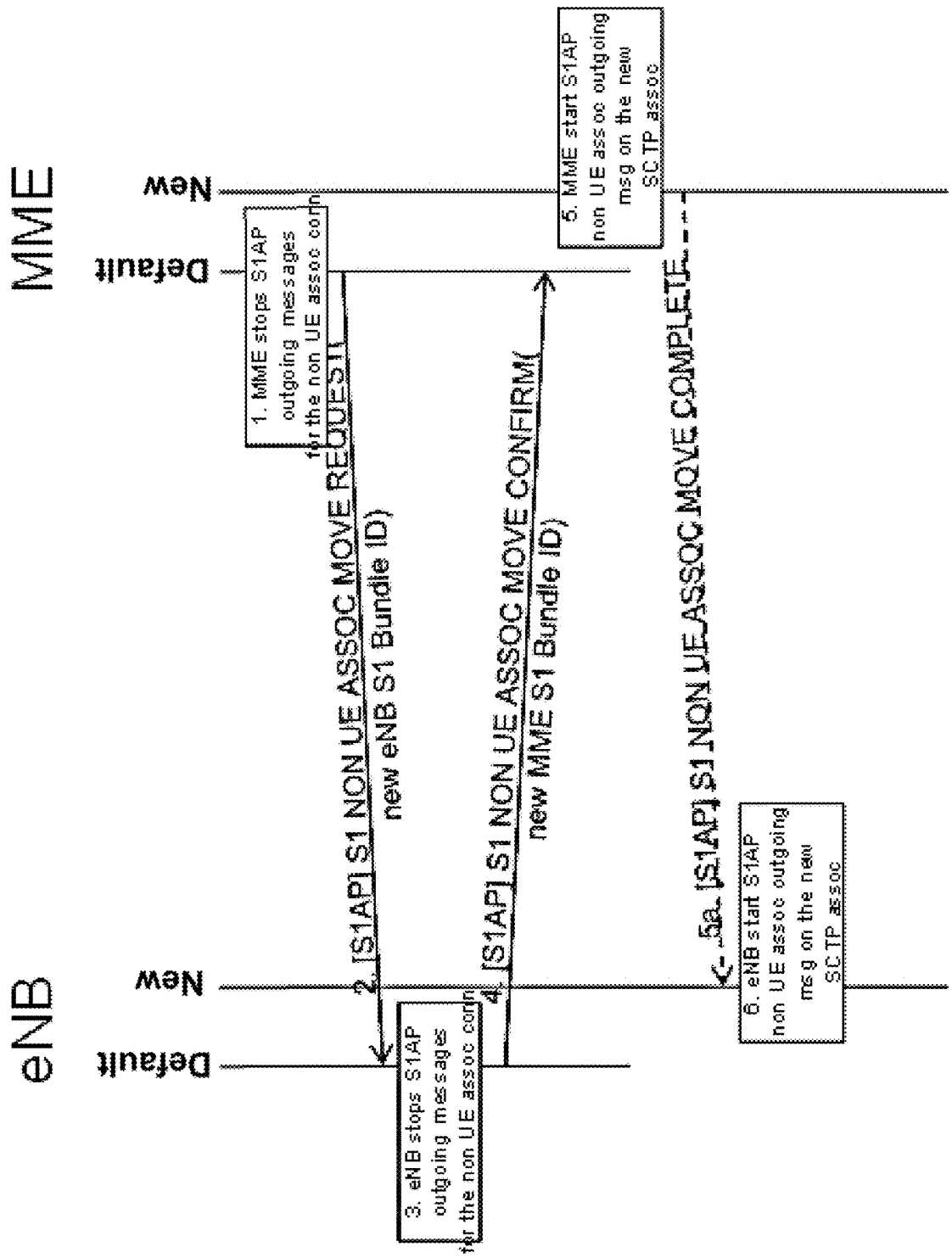
FIG. 28 is a signal diagram illustrating an example of an MME-initiated method for moving a non-UE associated signaling connection between SCTP associations (successful case), in accordance with certain embodiments of the present disclosure.

Sequence diagrams on how the non UE-associated signaling connection is successfully moved between SCTP associations are shown in FIG. 27 (eNB initiated) and FIG. 28 (MME initiated). That is, FIG. 27 illustrates moving a non UE-associated signaling connection between SCTP associations (second embodiment, successful case, eNB initiated). FIG. 28 illustrates moving a non UE-associated signaling connection between SCTP associations (second embodiment, successful case, MME initiated).

The below description is valid for both eNB initiated case and MME initiated case.

In step 1, if the originating node wants to move the non UE-associated signaling connection to another SCTP association, it stops all outgoing signaling from the non UE-associated signaling connection by informing the higher layer. It is possible that the originating node may deliver S1AP messages that were pending transmission, buffered on SCTP layer or below, before the decision to move the signaling connection to a different SCTP instance was taken.

In step 2, after all related outgoing signaling has been stopped from the originating node, it transmits a non UE-associated signal "S1 NON UE-ASSOCIATED MOVE REQUEST" through the old SCTP association to the destination node. This message has the role of a "stop marker", indicates the last message from the originating node transmitted on the old SCTP association for the non UE-associated signaling connection before move. This stop marker also provides new "S1 connection bundle ID" informing to which SCTP association this connection shall be moved to. As this "stop marker" signal is transmitted after all pending S1AP messages, this "stop marker" message will be the last message received by the destination node before the outgoing messages is stopped for the signaling connection.

In step 3, after receiving "S1 NON UE-ASSOCIATED MOVE REQUEST" from the originating node, the destination node stops all outgoing signaling from the non UE-associated signaling connections by informing the higher layer. It is possible that the destination node may deliver S1AP messages that were pending transmission, buffered on SCTP layer or below, before the decision to move the signaling connection to a different SCTP instance was taken.

In step 4, after all related outgoing signaling has been stopped from destination node, it transmits non UE-associated signal "S1 NON UE-ASSOCIATED MOVE CONFIRM" through the old SCTP association to the originating node. This message has the role of a "stop marker", indicates the last message from MME transmitted on the old SCTP association for the non UE-associated signaling connection before move. As this "stop marker" signal is transmitted after all pending S1AP messages, this "stop marker" message will be the last message received by the originating node before the outgoing messages is stopped for the signaling connection.

In step 5, After receiving S1 NON UE-ASSOCIATED MOVE CONFIRM, the originating node informs higher layer that the non UE-associated signaling connection may be resumed, and all the outgoing signals will be directed to the new SCTP association. The first non UE-associated message over the new SCTP connection has a role of "start marker" for the S1AP signaling connection.

In step 5a, in case there is no immediate non UE-associated message from higher layer, the originating node transmits S1 NON UE-ASSOCIATED MOVE COMPLETE through the new SCTP association as the "start marker."

In step 6, after receiving a first non UE-associated message or S1 NON UE-ASSOCIATED MOVE COMPLETE from the new SCTP association, the destination node informs higher layer that the non UE-associated signaling connections may be resumed, and all the outgoing signals will be directed to the new SCTP association An alternative procedure for decreasing the delay of moving is:

For the destination node, after transmitting non UE-associated signal "S1 NON UE-ASSOCIATED MOVE CONFIRM" through the old SCTP association (step 4), it directly informs higher layer that the non UE-associated signaling connection may be resumed (step 6), and all the outgoing signals will be directed to the new SCTP association.

For the originating node, after transmitting non UE-associated signal "S1 NON UE-ASSOCIATED MOVE REQUEST" through the old SCTP association to the destination node (step 2), if it receives new messages from the destination node through the new SCTP association, it will not forward these new messages to higher layer until "S1 NON UE-ASSOCIATED MOVE CONFIRM" is received from the old SCTP association (step 4). Also, eventual transmission of S1 NON UE-ASSOCIATED MOVE COMPLETE (step 5a) is omitted.

2.6 Error Case, All Embodiments

Figure 29:
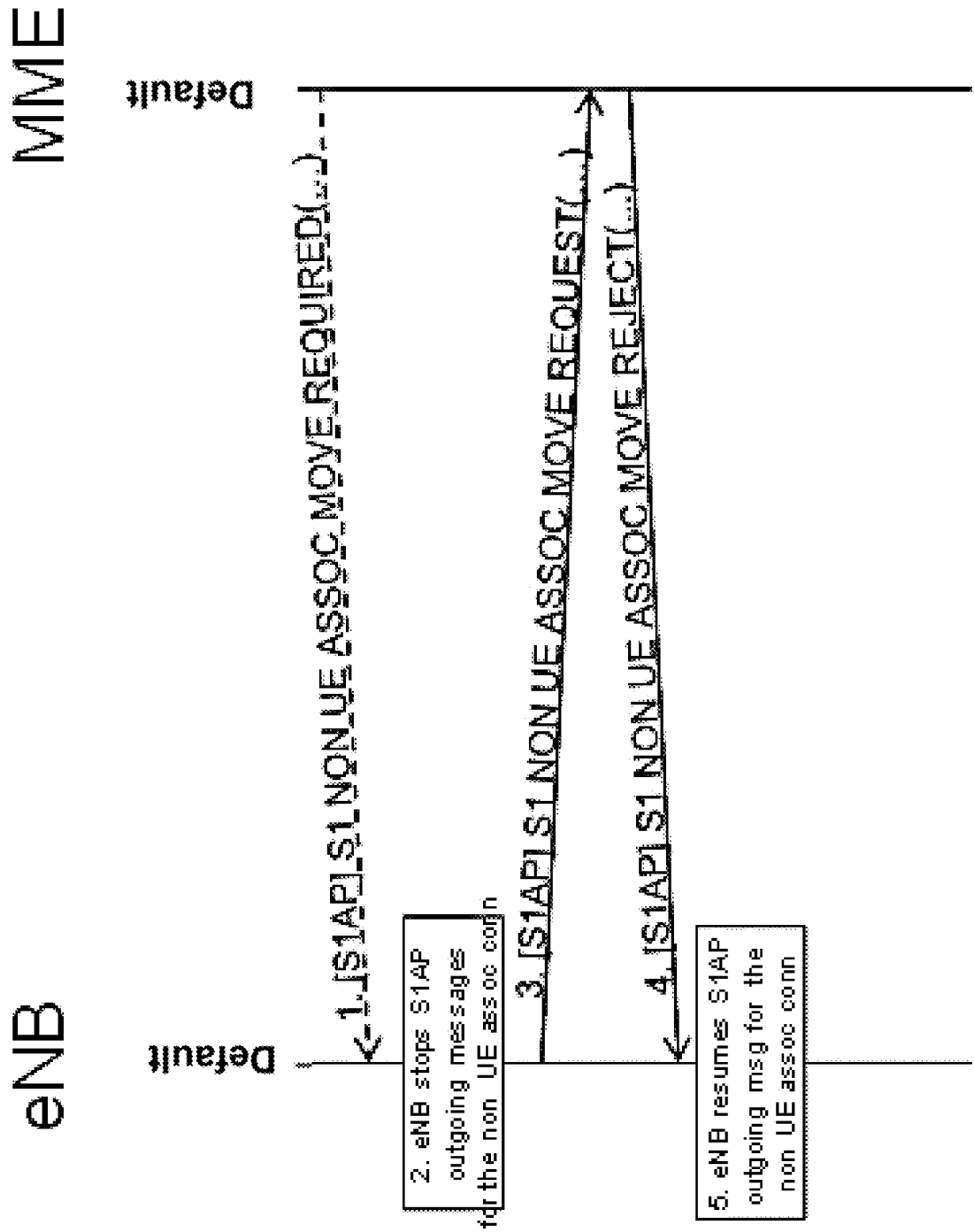
FIG. 29 is a signal diagram illustrating an example of a method for moving a non-UE associated signaling connection between SCTP associations (failure case), in accordance with certain embodiments of the present disclosure.

FIG. 29 illustrates an example of an error case for both of the above-discussed embodiments. That is, FIG. 29 illustrates an example of moving non UE-associated signaling between SCTP associations (failure case). Steps 1-3 are the same as the successful case described above (step 1 is omitted in the case of embodiment 2). In step 4, if error occurs due to some reason, e.g. invalid MME S1 connection bundle ID, MME transmits "S1 NON UE-ASSOCIATED MOVE REJECT" to eNB, informing that the move is aborted. In step 4, after receiving "S1 NON UE-ASSOCI- ATED MOVE REJECT", eNB informs higher layer that the non UE-associated signaling may be resumed, and all the outgoing signals will continue through the original SCTP association.

3 ADDITIONAL EXAMPLES

The solutions described above may be implemented in any suitable manner. FIGS. 30-39 provide additional examples.

Figure 30:
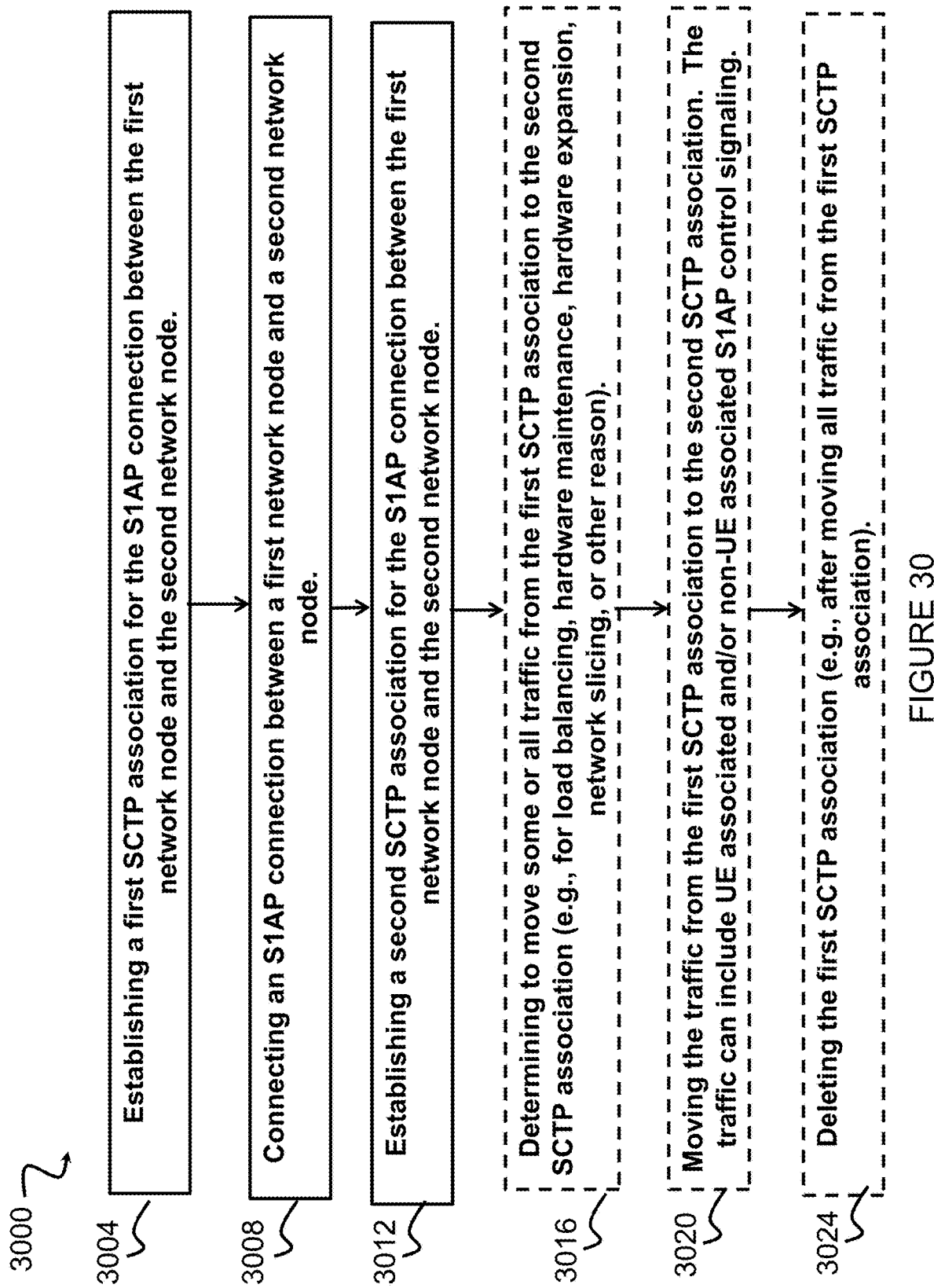
FIG. 30 is a flow chart illustrating an example of a method for establishing multiple SCTP associations per S1AP connection, in accordance with certain embodiments of the present disclosure.

FIG. 30 is a flow chart illustrating an example of a method for establishing multiple SCTP associations per S1AP connection, in accordance with certain embodiments of the present disclosure.

At step 3004 the method establishes a first SCTP association for an S1AP connection between a first network node and a second network node, at step 3008 the method connects the S1AP connection between the first network node and the second network node, and at step 3012 the method establishes a second SCTP association for the S1AP connection between the first network node and the second network node. Examples of adding an SCTP association are described above with respect to FIGS. 14-16. Examples of identifiers that can be used for the SCTP associations are described above with respect to FIG. 13 and Tables 1-3. For simplicity, FIG. 30 provides an example in which two SCTP associations are established for the S1AP connection. However, in other embodiments, more than two SCTP associations can be established (e.g., 3, 4, 5, ... N associations). In certain embodiments, connecting the S1AP connection in step 3008 can be performed according to procedures set forth in existing or future evolutions of 3GPP LTE or 5G.

Optionally, the method may include steps for moving traffic among SCTP associations. For example, at step 3016, the method determines to move some or all traffic from the first SCTP association to the second SCTP association. The determination to move the traffic may be for the purposes of load balancing, hardware maintenance, hardware expansion, network slicing, or other reason.

At step 3020, the method moves the traffic from the first SCTP association to the second SCTP association. The traffic can include UE associated and/or non-UE associated S1AP control signaling. Examples of methods for moving traffic are discussed above with respect to FIGS. 22-29.

At step 3024, the method optionally deletes the first SCTP association. As an example, all of the traffic may be moved from the first SCTP association in order to perform maintenance on hardware used by the first SCTP association. After the traffic has been moved, the first SCTP association can be deleted. Examples of methods for deleting an SCTP association are discussed above with respect to FIGS. 17-20. In other embodiments, the method need not delete the first SCTP association, for example, of some of the traffic stays on the first SCTP association for load-balancing or network slicing purposes.

Figure 31:
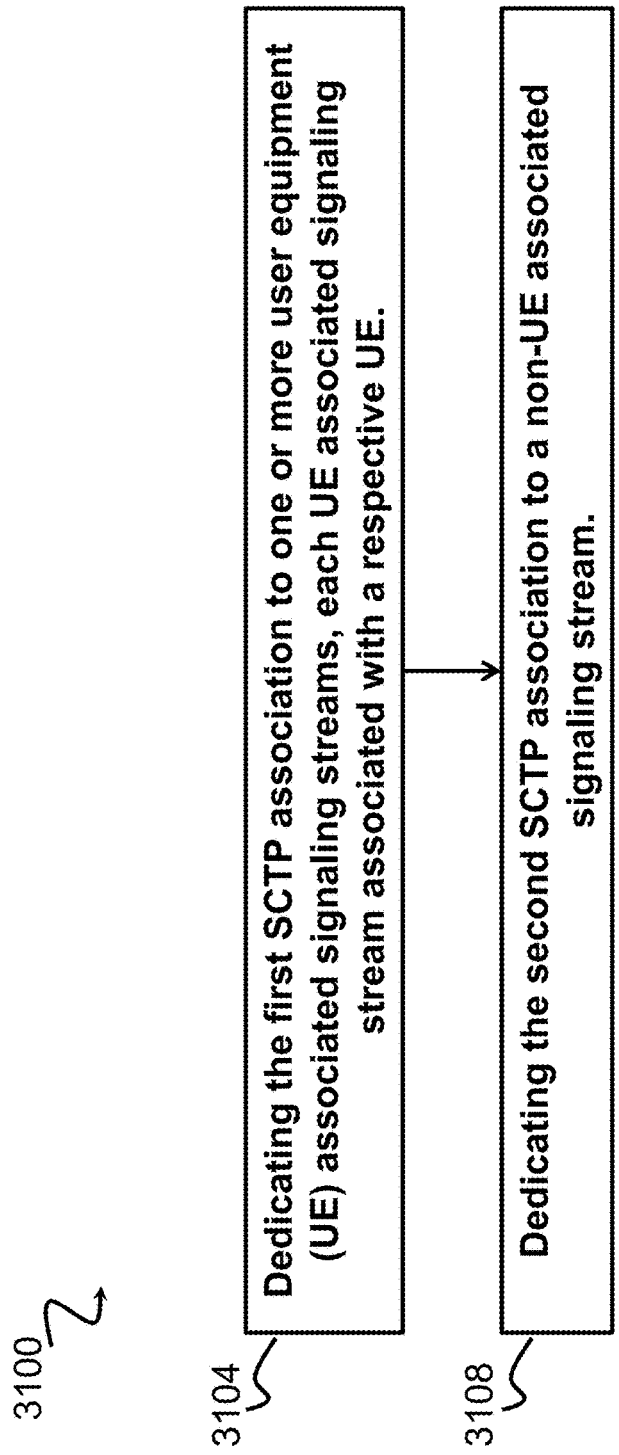
FIG. 31 is a flow chart illustrating an example of a method for associating UE-associated signaling streams and non-UE associated signaling streams with SCTP associations, in accordance with certain embodiments of the present disclosure.

FIG. 31 is a flow chart illustrating an example of a method for associating UE-associated signaling streams and non-UE associated signaling streams with SCTP associations, in accordance with certain embodiments of the present disclosure. At step 3104, the method dedicates the first SCTP association to one or more user equipment (UE) associated signaling streams, each UE associated signaling stream associated with a respective UE. At step 3108, the method dedicates the second SCTP association to a non-UE associated signaling stream. FIG. 12, discussed above, illustrates an example in which the SCTP association depicted at the top of the S1AP signaling connection has been dedicated to non-UE associated signaling and the SCTP association depicted at the bottom of the S1AP connection has been dedicated to UE-associated signaling.

FIG. 32 is a flow chart illustrating an example of a method for associating UE-associated signaling streams and non-UE associated signaling streams with SCTP associations, in accordance with certain embodiments of the present disclosure. At step 3204, the method associates a first set of one or more user equipment (UE) associated signaling streams with the first SCTP association and a second set of one or more UE associated signaling streams with the second SCTP association. Each UE associated signaling stream is associated with a respective UE. At step 3208, the method associates a first non-UE associated signaling stream with the first SCTP association and a second non-UE associated signaling stream with the second SCTP association. An example of such associations is illustrated in FIG. 11, discussed above.

Figure 33:
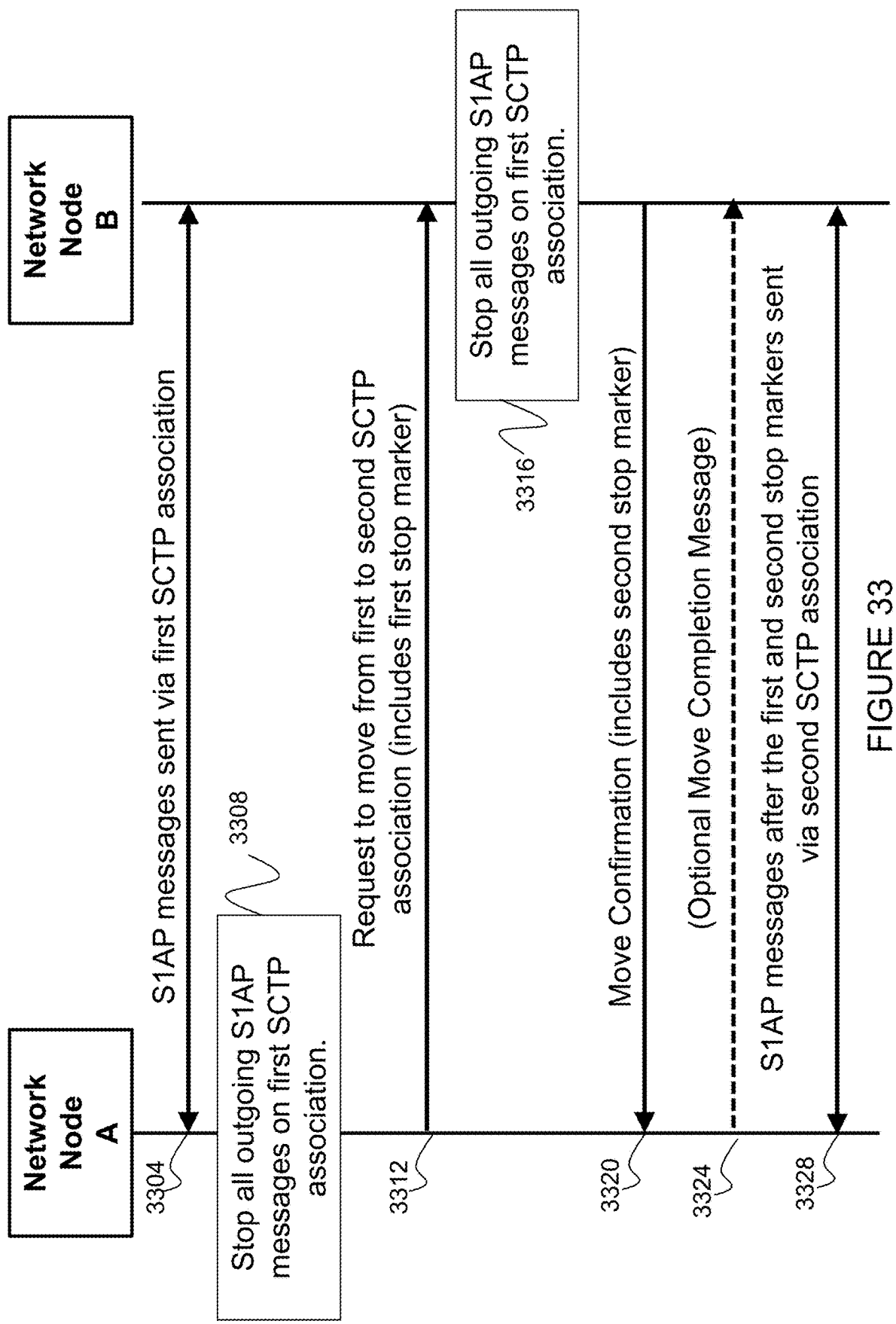
FIG. 33 is a signal diagram illustrating an example of a method for moving traffic between SCTP associations, in accordance with certain embodiments of the present disclosure.

FIG. 33 is a signal diagram illustrating an example of a method for moving traffic between SCTP associations, in accordance with certain embodiments of the present disclosure. The messages shown in FIG. 33 may be exchanged between network node A and network node B. The network nodes are given the non-limiting designations "A" and "B" for the purposes of explaining communications between the nodes. Thus, network node A may perform the functionality of a first network node and network node B may perform the functionality of a second network node, or vice versa. In certain embodiments, network node A may be an eNB and network node B may be an MME, or vice versa. FIGS. 22-24 and 26-28, discussed above, provide additional details of certain embodiments of the method for moving traffic between SCTP associations shown in FIG. 33.

At step 3304, network node A and network node B communicate S1AP messages via a first SCTP association. At step 3308, network node A stops all outgoing S1AP messages on the first SCTP association. For example, network node A may stop all outgoing S1AP messages in response to a determination to move traffic to a second SCTP association (see e.g., step 3016 of FIG. 30). All outgoing S1AP messages on the first SCTP association may refer to messages for a multiple UE-associated signaling connections (see e.g., FIG. 22), a single UE-associated signaling connection (see e.g., FIGS. 23-24), or a non-UE associated signaling connection (see e.g., FIGS. 26-28). Network node A may generate a first stop marker to identify the last message being transmitted by network node A on the first SCTP association.

At step 3312, network node A sends network node B a request to move from the first SCTP association to the second SCTP association. The request comprises the first stop marker indicating the last message being transmitted by network node A on the first SCTP association.

At step 3316, in response to receiving the request to move from the first SCTP association to the second SCTP association in step 3312, network node B stops all outgoing S1AP messages on the first SCTP association. Network node B may generate a second stop marker to identify the last message being transmitted by network node B on the first SCTP association.

At step 3320, network node B sends to network node A a confirmation to move the first SCTP association to the second SCTP association. The confirmation comprises the second stop marker indicating the last message being transmitted by network node B on the first SCTP association.

In response to receiving the confirmation from network node B, network node A sends network node B an indication that the move to the second SCTP association is complete.

The indication may optionally be sent explicitly (e.g., by sending a completion message, step 3324) or implicitly (e.g., by sending network node B S1AP messages occurring after the first stop marker via the second SCTP association, step 3328). After moving from the first to the second SCTP association, network nodes A and B may send outgoing S1AP messages and receive incoming S1AP messages via the second SCTP association (step 3328).

Figure 34:
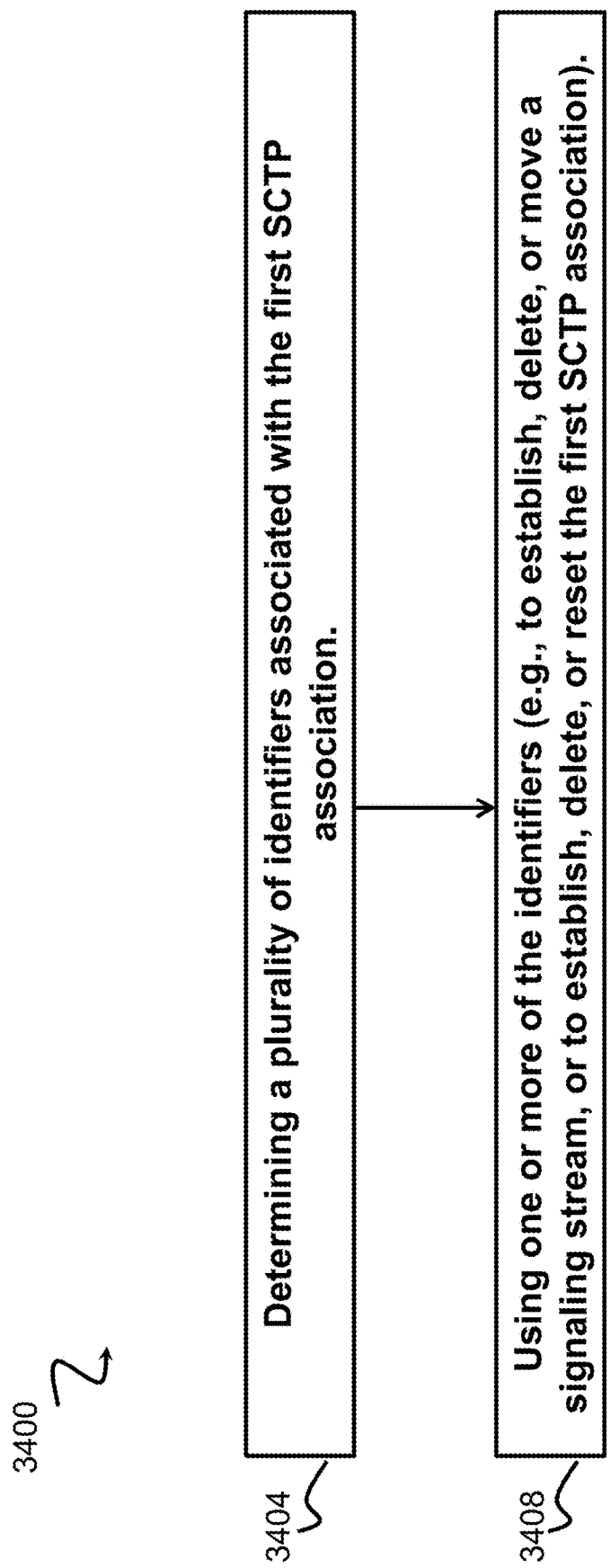
FIG. 34 is a flow chart illustrating an example of a method for identifying an SCTP association, in accordance with certain embodiments of the present disclosure.

FIG. 34 is a flow chart illustrating an example of a method for identifying an SCTP association, in accordance with certain embodiments of the present disclosure. At step 3404, the method determines a plurality of identifiers associated with the first SCTP association and at step one or more of the identifiers. For example, the identifiers may be used to establish, delete, or move a signaling stream, or to establish, delete, or reset the first SCTP association. Examples of identifiers that can be exchanged include one or more of: a first configuration identifier that a first network node (e.g., network node A) associates with an S1AP connection, a second configuration identifier that a second network node (e.g., network node B) associates with the S1AP connection, a first bundle identifier that the first network node associates with a first SCTP association (or with a signaling stream of the first SCTP association), and a second bundle identifier that the second network node associates with the first SCTP association (or with a signaling stream of the first SCTP association). Further details of the identifiers are discussed above, e.g., with respect to FIG. 13 and Tables 1-3. Example messaging using the identifiers is shown in FIGS. 14-29.

Figure 35:
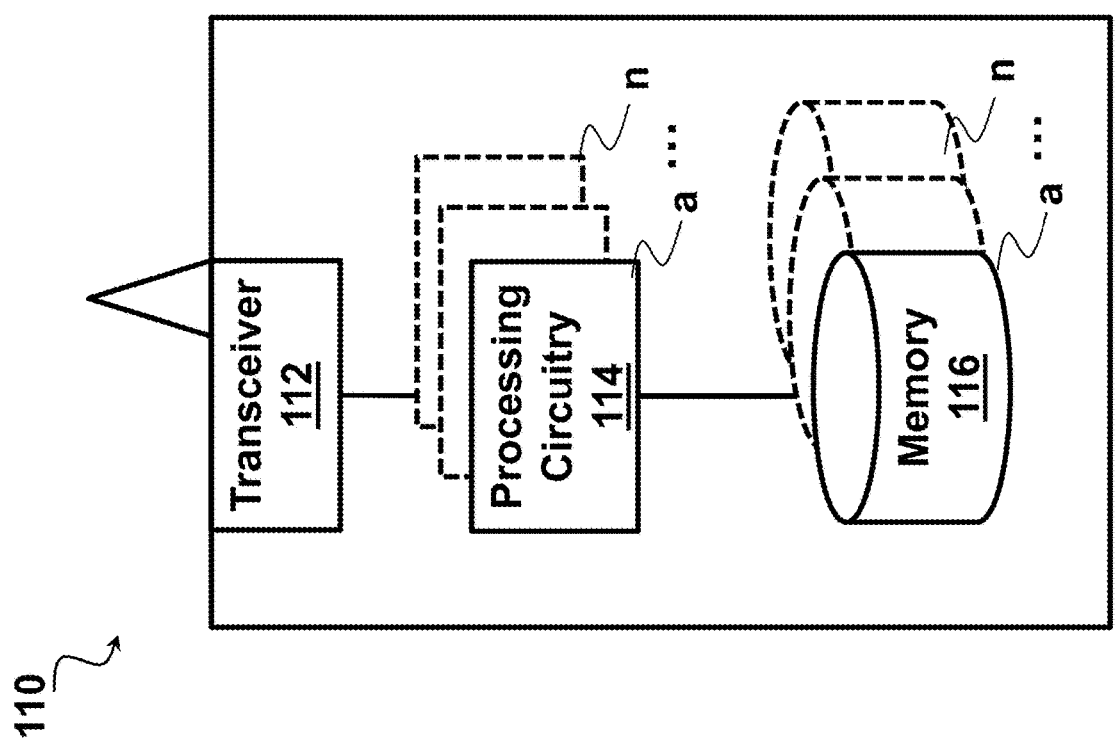
FIG. 35 is a block diagram illustrating an example of a wireless device (e.g., UE), in accordance with certain embodiments of the present disclosure.
Figure 36:
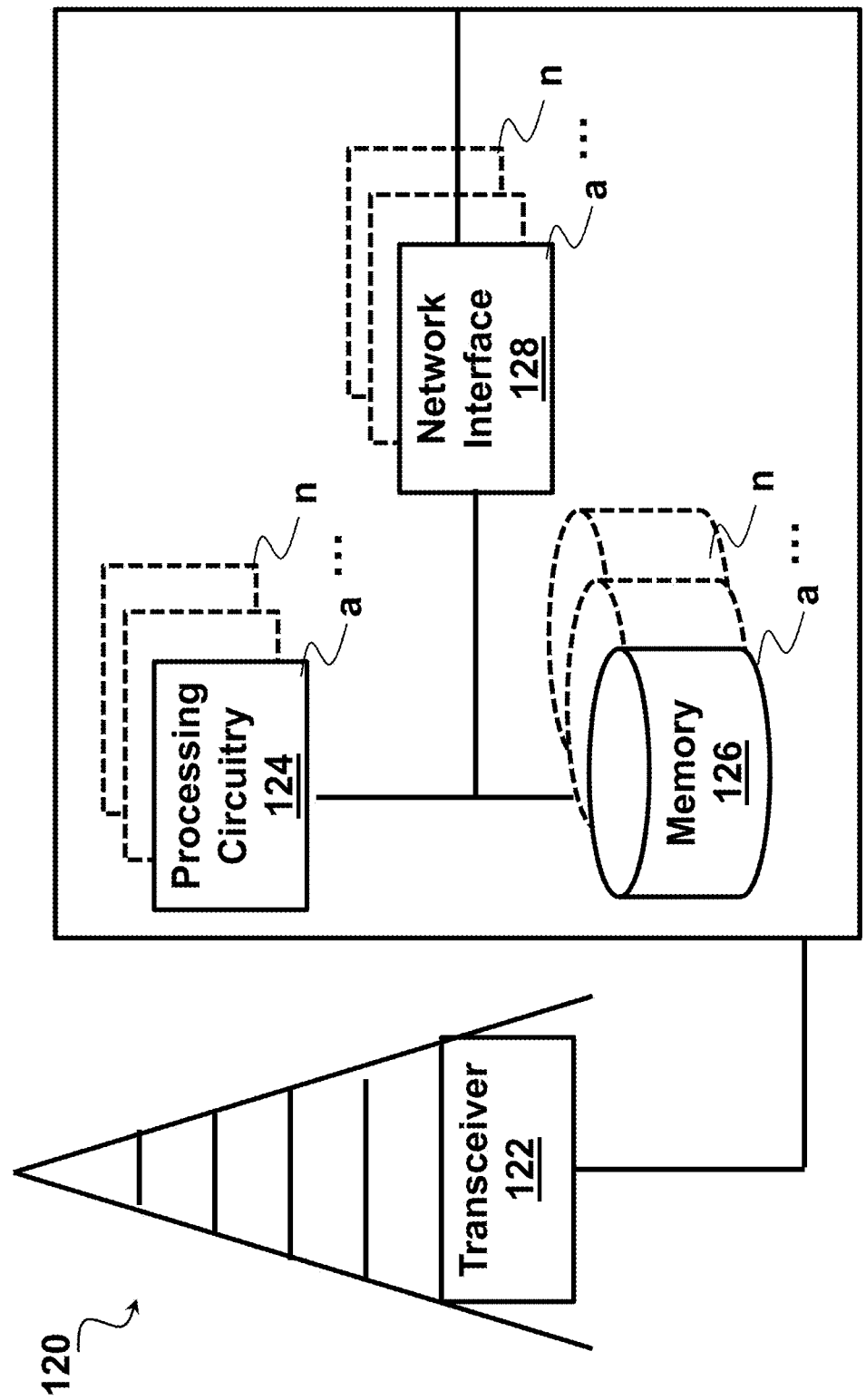
FIG. 36 is a block diagram illustrating an example of a network node (e.g., eNB), in accordance with certain embodiments of the present disclosure.
Figure 37:
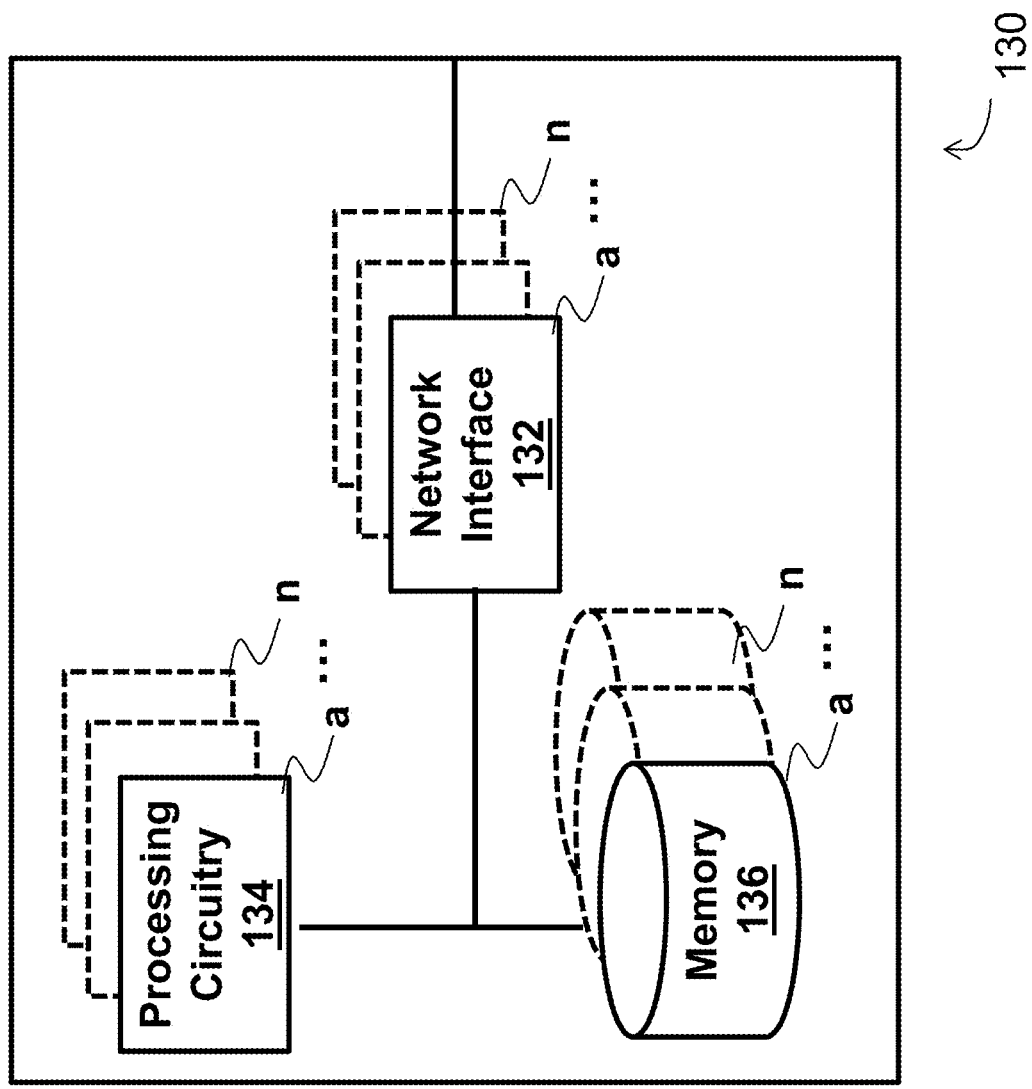
FIG. 37 is a block diagram illustrating an example of a network node (e.g., MME), in accordance with certain embodiments of the present disclosure.

FIG. 35 illustrates an example of a wireless device 110, and FIGS. 36-37 illustrate examples of network nodes, e.g., radio access node 120 and core network node 130, respectively, which may be suitably operative in accordance with certain embodiments. As discussed above, examples of the radio access nodes 120 include an access point, a radio access point, a base station, a base station controller, an eNodeB (eNB), a Home eNB (HeNB), a HeNB Gateway (HeNB GW). A radio access node 120 may comprise any entity capable of at least receiving or transmitting radio signals within a radio network and/or cell/sector, or both. As discussed above, examples of core network node 130 include a Mobile Management Entity (MME), Serving Gateway (S-GW), or other device that supports establishing and controlling one or more SCTP-S1AP connections between a radio access node and an evolved packet core node, either directly or indirectly, and interacting with radio access nodes to carry out embodiments of the proposed solution(s) described herein. A core network node 130 may comprise any entity capable of communicating and establishing connections with a radio access.

In general, wireless device 110 and network nodes (e.g., 120 and 130) may each comprise one or more interfaces (such as one or more transceivers that facilitate transmitting and receiving wireless signals and/or one or more network interfaces for wireline communication), processing circuitry (which may include one or more processors that execute instructions to provide some or all of the functionality described as being provided by the particular node), and memory that stores instructions executed by the processing circuitry. For example, FIG. 35 illustrates wireless device 110 as comprising transceiver 112, processing circuitry 114a-n, and memory 116a-n. FIG. 36 illustrates a network node (radio access node 120) as comprising transceiver 122, processing circuitry 124a-n, memory 126a-n, and network interface(s) 128a-n. FIG. 37 illustrates a network node (core network node 130) as comprising network interface(s) 132a-n, processing circuitry 134a-n, and memory 136a-n.

Processing circuitry (e.g., 114, 124, 134) may comprise one or more processors. A processor may comprise any suitable combination of hardware and software implemented in one or more modules to execute instructions and manipulate data to perform some or all of the described functions of the respective node. For example, processing circuitry 124 and/or 134 of network nodes 120 and/or 130 may be configured to perform some or all of the methods described with respect to FIGS. 14-34. In some embodiments, the processor may include, for example, one or more computers, one or more central processing units (CPUs), one or more microprocessors, one or more applications, processing circuitry, and/or other logic.

Memory (e.g., 116, 126, 136) is generally operable to store instructions, such as a computer program, software, an application comprising one or more of logic, rules, algorithms, code, tables, etc. and/or other instructions capable of being executed by a processor. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In an embodiment, a non-transitory computer-readable medium comprises machine-readable computer instructions. The machine-readable computer instructions are executed by a processor, which causes the network node (e.g., node 120 or 130) to support, for example, multiple SCTP associations per S1AP connection. In certain embodiments, the machine-readable computer instructions executed by the processor further cause the network node (e.g., node 120 or 130) to perform the methods described herein for moving a S1AP signaling connection between SCTP associations.

Embodiments of a network node 120 include multiple network interfaces 128a-n for multiple SCTP associations per S1AP connection. Similarly, embodiments of network node 130 include multiple network interfaces 132a-n for multiple SCTP associations per S1AP connection.

Embodiments of the nodes may include additional components beyond those shown in FIGS. 35-37 that may be responsible for providing certain aspects of the network node's functionality, including any of the functionality described herein and/or any additional functionality (including any functionality necessary to support the solution described herein). The various different types of network nodes may include components having the same physical hardware but configured (e.g., via programming) to support different functionality, or may represent partly or entirely different physical components.

Figure 38:
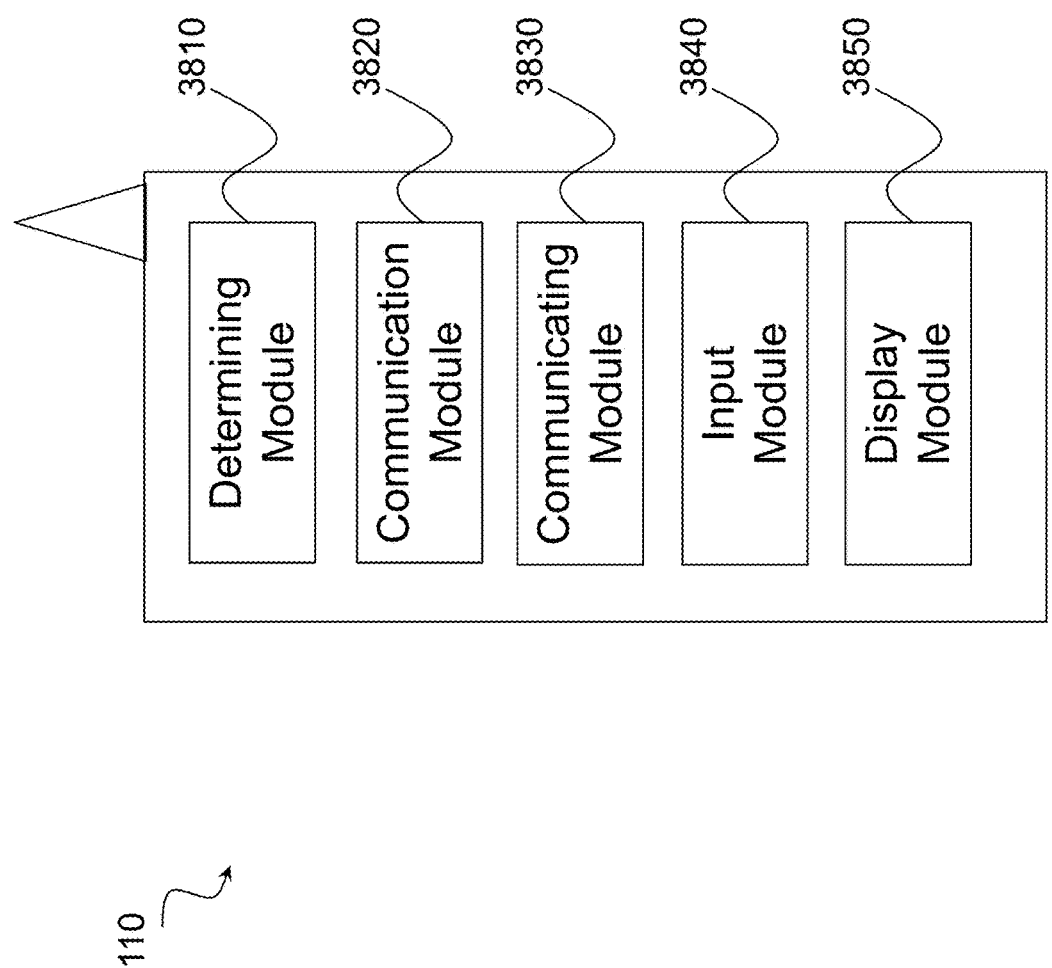
FIG. 38 is a block diagram illustrating an example of a components of a wireless device (e.g., UE), in accordance with certain embodiments of the present disclosure.

FIG. 38 provides examples of modules of a wireless device 110. In certain embodiments, wireless device 110 may include any one or more of: determining module 3810, communication module 3820, receiving module 3830, input module 3840, display module 3850, and/or other suitable modules. The functionality of the modules may be integrated in a single component or separated among several components in any suitable manner. In certain embodiments, one or more of the modules may be implemented using one or more processing circuitry 114 described with respect to FIG. 35.

Determining module 3810 may perform the processing functions of wireless device 110 (including any of the UE functionality to support the above-described embodiments). Determining module 3810 may include or be included in one or more processors, such as processing circuitry 114 described above in relation to FIG. 35. Determining module

3810 may include analog and/or digital circuitry configured to perform any of the functions of determining module 3810 and/or processing circuitry 114 described above. The functions of determining module 3810 described above may, in certain embodiments, be performed in one or more distinct modules.

Communication module 3820 may perform the transmission functions of wireless device 110. As one example, communication module 3820 may communicate signals to network node 120. Communication module 3820 may include a transmitter and/or a transceiver, such as transceiver 112 described above in relation to FIG. 35. Communication module 3820 may include circuitry configured to wirelessly transmit messages and/or signals. In particular embodiments, communication module 3820 may receive messages and/or signals for transmission from determining module 3810. In certain embodiments, the functions of communication module 3820 described above may be performed in one or more distinct modules.

Receiving module 3830 may perform the receiving functions of wireless device 110. For example, receiving module 3830 may receive signals from network node 120. Receiving module 3830 may include a receiver and/or a transceiver, such as transceiver 112 described above in relation to FIG. 35. Receiving module 3830 may include circuitry configured to wirelessly receive messages and/or signals. In particular embodiments, receiving module 3830 may communicate received messages and/or signals to determining module 3810. The functions of receiving module 3830 described above may, in certain embodiments, be performed in one or more distinct modules.

Input module 3840 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 3810. The functions of input module 3840 described above may, in certain embodiments, be performed in one or more distinct modules.

Display module 3850 may present signals on a display of wireless device 110. Display module 3850 may include the display and/or any appropriate circuitry and hardware configured to present signals on the display. Display module 3850 may receive signals to present on the display from determining module 3810. The functions of display module 3810 described above may, in certain embodiments, be performed in one or more distinct modules.

Determining module 3810, communication module 3820, receiving module 3830, input module 3840, and display module 3850 may include any suitable configuration of hardware and/or software. Wireless device 110 may include additional modules beyond those shown in FIG. 38 that may be responsible for providing any suitable functionality, including any of the functionality described above and/or any additional functionality (including any functionality necessary to support the various solutions described herein).

Figure 39:
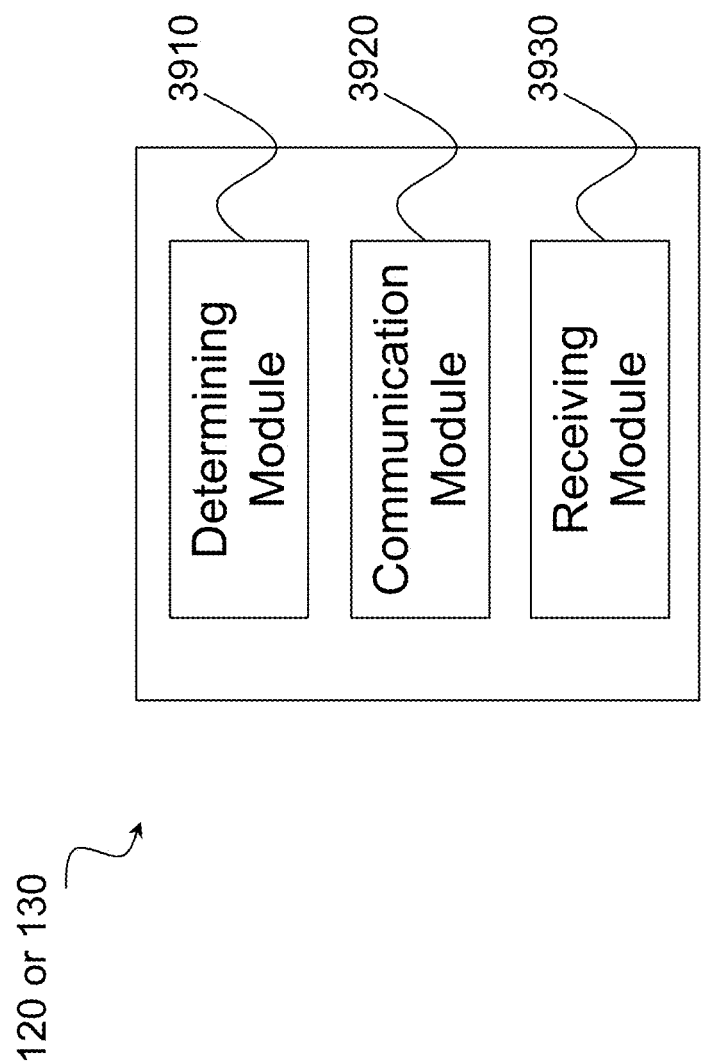
FIG. 39 is a block diagram illustrating an example of components of a network node (e.g., eNB or MME), in accordance with certain embodiments of the present disclosure.

FIG. 39 provides examples of modules of a network node, such as a radio access node 120 (e.g., eNB, gNB, etc.) or a core network node 130 (e.g., MME, S-GW, etc.). In certain embodiments, the network node may include any one or more of: determining module 3910, communication module 3920, receiving module 3930, and/or other suitable modules. The functionality of the modules may be integrated in a single component or separated among several components in any suitable manner. In certain embodiments, one or more of the modules may be implemented using one or more processing circuitry (e.g., 124 or 134) described with respect to FIGS. 36-37.

Determining module 3910 may perform the processing functions of the network node (including any of the eNB or MME functionality to support the above-described embodiments). Examples of processing functions that may be performed by determining module 3910 include determining to add/establish, delete, or reset an SCTP association for an S1AP connection or determining to add/establish, delete, or move an SCTP signaling stream. Determining module 3910 may make further determinations to support the preceding functionality, such as determining identifiers associated with the SCTP association. Determining module 3910 may include or be included in one or more processors, such as processing circuitry (e.g., 124 or 134) described above in relation to FIGS. 36-37. Determining module 3910 may include analog and/or digital circuitry configured to perform any of the functions of determining module 3910 and/or processing circuitry (e.g., 124 or 134) described above. The functions of determining module 3910 described above may, in certain embodiments, be performed in one or more distinct modules.

Communication module 3920 may perform the sending functions of a network node (e.g., 120 or 130). As one example, communication module 3920 may communicate signals to another network node, such as signals comprising any of the messages shown in one or more of FIGS. 14-29 and 33. Communication module 3920 may include any suitable interface for communicating signals, such as a network interface (e.g., 128 or 132) for wired communication and/or a transceiver (e.g., 122) for wireless communication, as described above in relation to FIGS. 36-37. Communication module 3920 may include circuitry configured to transmit messages and/or signals. In particular embodiments, communication module 3920 may receive messages and/or signals for transmission from determining module 3910. In certain embodiments, the functions of communication module 3920 described above may be performed in one or more distinct modules.

Receiving module 3930 may perform the receiving functions of the network node (e.g., 120 or 130). For example, receiving module 3930 may receive signals from another network node, such as signals comprising any of the messages shown in one or more of FIGS. 14-29 and 33. Receiving module 3930 may include any suitable interface for receiving signals, such as a network interface (e.g., 128 or 132) for wired communication and/or a transceiver (e.g., 122) for wireless communication, as described above in relation to FIGS. 36-37. In particular embodiments, receiving module 3930 may communicate received messages and/or signals to determining module 3910. The functions of receiving module 3930 described above may, in certain embodiments, be performed in one or more distinct modules.

Determining module 3910, communication module 3920, and receiving module 3930 may include any suitable configuration of hardware and/or software. The network node (e.g., 120 or 130) may include additional modules beyond those shown in FIG. 39 that may be responsible for providing any suitable functionality, including any of the functionality described above and/or any additional functionality (including any functionality necessary to support the various solutions described herein).

An advantage of certain embodiments is that they eliminate resetting of all UEs associated to S1AP in case of re-establishment of S1AP transport layer (SCTP), for example, during hardware maintenance/expansion, as the SCTP association may now be disconnected and reconnected to S1AP without removal of existing S1AP configuration data. An additional advantage is that certain embodiments increase S1AP robustness in the case of software failure (SW_failure). That is, the number of affected UEs will be decreased when a SCTP instance fails. A further advantage of certain embodiments is that they allow for S1AP signaling load distribution by spreading signaling load over multiple SCTP connections eventually served by different processors. Another advantage of certain embodiments is that they increase flexibility of load distribution capability in an S1AP with multiple SCTP associations, where a single S1AP signaling connection may be freely moved between SCTP association without causing any disturbance on the interface in terms of in-order delivery, lost message, or reset of any SCTP association. Certain embodiments may have all, some, or none of these advantages. Other advantages may be apparent to one of ordinary skill in the art.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

Modifications, additions, or omissions may be made to the above embodiments and other methods disclosed herein without departing from the scope of the invention. The methods may include more, fewer, or other steps. Additionally, steps may be performed in any suitable order. In certain embodiments, the methods disclosed herein may be implemented using a computer program product. The computer program product comprises a non-transitory computer readable storage medium having computer readable program code embodied in the medium, the computer readable program code comprising computer readable program code to perform the steps of the methods.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Although this disclosure has been described in terms of certain embodiments, alterations and permutations of the embodiments will be apparent to those skilled in the art. The embodiments described herein may be combined with each other in any way. Although some embodiments have been described with reference to certain radio access technologies, any suitable radio access technology (RAT) may be used, such as 5G, long term evolution (LTE) (FDD or TDD), LTE-Advanced, UTRA, UMTS, HSPA, GSM, cdma2000, WiMax, and WiFi. Moreover, various embodiments may support single-RAT or multi-RAT configurations. Accordingly, the above description of the embodiments does not constrain this disclosure. Other changes, substitutions, and alterations are possible without departing from the spirit and scope of this disclosure.

The invention claimed is:

1. A method for use in a first network node, the method comprising:
    establishing a first Stream Control Transmission Protocol (SCTP) association for an application protocol connection between the first network node and a second network node, wherein the first network node is a core network node or a radio access node, and wherein the second network node is a core network node or a radio access network node;
    connecting the application protocol connection between the first network node and the second network node, the connecting including sending a setup request to the second network node and receiving a response to the setup request from the second network node;
    establishing a second SCTP association for the application protocol connection between the first network node and the second network node in a Radio Access Network (RAN); and
    moving traffic from the first SCTP association to the second SCTP association, wherein the traffic includes at least one of user equipment (UE) associated application protocol control signaling or non-UE associated application protocol control signaling, and wherein moving the traffic includes:
        the first network node sending, to the second network node, a stop marker that indicates a last message transmitted by the first network node on the first SCTP association, and
        the first network node receiving, from the second network node, a stop marker that indicates a last message transmitted by the second network node on the first SCTP association.

2. The method of claim 1, further comprising:
    dedicating the first SCTP association to one or more user equipment (UE) associated signaling streams, each UE associated signaling stream associated with a respective UE; and
    dedicating the second SCTP association to a non-UE associated signaling stream.

3. The method of claim 1, further comprising:
    associating a first set of one or more user equipment (UE) associated signaling streams with the first SCTP association and a second set of one or more UE associated signaling streams with the second SCTP association, each UE associated signaling stream associated with a respective UE; and
    associating a first non-UE associated signaling stream with the first SCTP association and a second non-UE associated signaling stream with the second SCTP association.

4. The method of claim 1, wherein moving the traffic from the first SCTP association to the second SCTP association is performed in response to at least one of: a load balancing determination; hardware maintenance; hardware expansion; or a determination to perform network slicing.

5. The method of claim 1, wherein moving the traffic from the first SCTP association to the second SCTP association comprises:
    sending outgoing application protocol messages on the second SCTP association after stopping outgoing application protocol messages on the first SCTP association and confirming that incoming application protocol messages on the first SCTP association have stopped.

6. The method of claim 1, wherein all of the traffic from the first SCTP association is moved to at least one of the second SCTP association or other SCTP association(s) between the first network node and the second network node.

7. The method of claim 6, further comprising deleting the first SCTP association after moving all of the traffic from the first SCTP association.

8. The method of claim 1, wherein the traffic comprises a plurality of streams and messaging between the first network node and the second network node identifies one or more of the streams to move from the first SCTP association to the second SCTP association.

9. The method of claim 1, wherein the traffic comprises a plurality of user equipment (UE) associated signaling streams and messaging between the first network node and the second network node comprises a list identifying at least two of the UE associated signaling streams to move from the first SCTP association to the second SCTP association.

10. The method of claim 1, wherein the traffic is moved from the first SCTP association to the second SCTP association without tearing down the application protocol connection.

11. The method of claim 1, further comprising:
determining a plurality of identifiers associated with the first SCTP association, the identifiers comprising:
a first configuration identifier that the first network node associates with the application protocol connection;
a second configuration identifier that the second network node associates with the application protocol connection;
a first bundle identifier that the first network node associates with the first SCTP association; and
a second bundle identifier that the second network node associates with the first SCTP association; and
using one or more of the identifiers to establish, delete, or reset the first SCTP association.

12. The method of claim 1, further comprising:
determining a plurality of identifiers associated with the first SCTP association, the identifiers comprising:
a first configuration identifier that the first network node associates with the application protocol connection;
a second configuration identifier that the second network node associates with the application protocol connection;
a first bundle identifier that the first network node associates with a signaling stream of the first SCTP association; and
a second bundle identifier that the second network node associates with the signaling stream of the first SCTP association; and
using one or more of the identifiers to establish, delete, or move the signaling stream.

13. The method of claim 1, wherein the second SCTP association is established using a Transport Network (TN) address that the first network node receives from the second network node.

14. A first network node, comprising:
an interface to facilitate communications with a second network node, a memory to store instructions, and processing circuitry to execute the instructions to perform operations comprising:
establishing a first Stream Control Transmission Protocol (SCTP) association for an application protocol connection between the first network node and the second network node, wherein the first network node is a core network node or a radio access node, and wherein the second network node is a core network node or a radio access network node;
connecting the application protocol connection between the first network node and the second network node, the connecting including sending a setup request to the second network node and receiving a response to the setup request from the second network node;
establishing a second SCTP association for the application protocol connection between the first network node and the second network node in a Radio Access Network (RAN); and
moving traffic from the first SCTP association to the second SCTP association, wherein the traffic includes at least one of user equipment (UE) associated application protocol control signaling or non-UE associated application protocol control signaling, and wherein moving the traffic includes:
the first network node sending, to the second network node, a stop marker that indicates a last message transmitted by the first network node on the first SCTP association, and
the first network node receiving, from the second network node, a stop marker that indicates a last message transmitted by the second network node on the first SCTP association.

15. The first network node of claim 14, wherein the second SCTP association is established using a Transport Network (TN) address that the first network node receives from the second network node.

16. A non-transitory computer readable storage medium having computer readable program code, the computer readable program code executed by a first network node to perform operations comprising:
establishing a first Stream Control Transmission Protocol (SCTP) association for an application protocol connection between the first network node and a second network node, wherein the first network node is a core network node or a radio access node, and wherein the second network node is a core network node or a radio access network node;
connecting the application protocol connection between the first network node and the second network node, the connecting including sending a setup request to the second network node and receiving a response to the setup request from the second network node;
establishing a second SCTP association for the application protocol connection between the first network node and the second network node in a Radio Access Network (RAN); and
moving traffic from the first SCTP association to the second SCTP association, wherein the traffic includes at least one of user equipment (UE) associated application protocol control signaling or non-UE associated application protocol control signaling, and wherein moving the traffic includes:
the first network node sending, to the second network node, a stop marker that indicates a last message transmitted by the first network node on the first SCTP association, and
the first network node receiving, from the second network node, a stop marker that indicates a last message transmitted by the second network node on the first SCTP association.

17. The non-transitory computer readable storage medium of claim 16, wherein the second SCTP association is established using a Transport Network (TN) address that the first network node receives from the second network node.

* * * * *